US011601158B2

(12) United States Patent
Wala et al.

(10) Patent No.: US 11,601,158 B2
(45) Date of Patent: Mar. 7, 2023

(54) REDUCE, IN A RECEIVE SIGNAL, INTERFERENCE CAUSED BY A SIMULTANEOUS TRANSMIT SIGNAL IN A SAME FREQUENCY BAND AS THE RECEIVE SIGNAL

(71) Applicant: CommScope Technologies LLC, Hickory, NC (US)

(72) Inventors: Philip M. Wala, Savage, MN (US); Alfons Dussmann, Gansheim (DE); Thomas Kummetz, Kissing (DE); Massimiliano Mini, Forli (IT); Dean Zavadsky, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 74 days.

(21) Appl. No.: 17/119,675

(22) Filed: Dec. 11, 2020

(65) Prior Publication Data
US 2021/0184722 A1    Jun. 17, 2021

Related U.S. Application Data

(60) Provisional application No. 62/948,024, filed on Dec. 13, 2019.

(30) Foreign Application Priority Data

Sep. 21, 2020   (IT) .................. 102020000022204

(51) Int. Cl.
*H04B 1/525* (2015.01)
*H04B 17/12* (2015.01)
(Continued)

(52) U.S. Cl.
CPC ............ *H04B 1/525* (2013.01); *H01Q 1/523* (2013.01); *H04B 1/44* (2013.01); *H04B 1/48* (2013.01);
(Continued)

(58) Field of Classification Search
CPC . H04B 1/525; H04B 1/44; H04B 1/48; H04B 7/0413; H04B 17/12; H04B 1/123;
(Continued)

(56) References Cited

U.S. PATENT DOCUMENTS 6,757,265 B1 *  6/2004  Sebastian ............. H04B 7/2612
                                                  370/334
9,178,635 B2    11/2015  Ben-Shlomo
(Continued)

FOREIGN PATENT DOCUMENTS

KR      20190035046 A     4/2019
WO      2012174047 A2    12/2012
(Continued)

OTHER PUBLICATIONS

International Searching Authority, "International Search Report and Written Opinion from PCT Application No. PCT/US2020/064588", from Foreign Counterpart to U.S. Appl. No. 17/119,675, filed Mar. 26, 2021, pp. 1 through 10, Published: WO.
(Continued)

*Primary Examiner* — Fitwi Y Hailegiorgis
(74) *Attorney, Agent, or Firm* — Fogg & Powers LLC

(57) ABSTRACT

In an embodiment, a remote antenna unit includes a transmitter, a receiver, an antenna array, and first and second interference circuits. The transmitter is configured to generate at least one transmit signal, and the receiver is configured to process at least one receive signal. The antenna array includes one or more antennas, each of at least one of the one or more antennas coupled to the transmitter and configured to radiate a respective downlink signal in response to a respective one of the at least one transmit signal, and each of at least one of the one or more antennas coupled to the receiver and configured to generate a respective one of the at least one receive signal in response to an
(Continued)

uplink signal. And the first and second interference circuits are each coupled to the transmitter and to the receiver and are each configured to reduce interference in each of the at least one receive signal.

29 Claims, 19 Drawing Sheets

(51) Int. Cl.
*H04L 5/14* (2006.01)
*H04B 1/48* (2006.01)
*H01Q 1/52* (2006.01)
*H04B 1/44* (2006.01)
*H04B 7/0413* (2017.01)

(52) U.S. Cl.
CPC .......... *H04B 7/0413* (2013.01); *H04B 17/12* (2015.01); *H04L 5/1461* (2013.01)

(58) Field of Classification Search
CPC .... H04B 17/345; H04B 17/354; H01Q 1/523; H04L 5/1461
USPC .......................................................... 375/267
See application file for complete search history.

(56) References Cited

U.S. PATENT DOCUMENTS

| | | | |
|---|---|---|---|
| 9,496,904 | B2 | 11/2016 | Cyzs et al. |
| 9,698,861 | B2 | 7/2017 | Braithwaite |
| 10,020,837 | B2 | 7/2018 | Braithwaite |
| 10,243,631 | B2 | 3/2019 | Abdel Khalek et al. |
| 10,340,995 | B2 | 7/2019 | Liang et al. |
| 2002/0132643 | A1 | 9/2002 | Chang et al. |
| 2009/0268642 | A1 | 10/2009 | Knox |
| 2013/0102254 | A1* | 4/2013 | Cyzs ........................ H04B 1/10 455/63.1 |
| 2013/0163488 | A1 | 6/2013 | Kwon et al. |
| 2016/0049972 | A1* | 2/2016 | Moher ................. H04B 1/0475 370/277 |
| 2017/0170903 | A1 | 6/2017 | Jain et al. |
| 2017/0222687 | A1 | 8/2017 | Wyville |
| 2017/0301972 | A1 | 10/2017 | Dakhiya et al. |
| 2018/0375566 | A1 | 12/2018 | Hong et al. |
| 2020/0229031 | A1 | 7/2020 | Jain et al. |
| 2020/0252115 | A1 | 8/2020 | Paramesh et al. |

FOREIGN PATENT DOCUMENTS

| | | |
|---|---|---|
| WO | 2017178644 A1 | 10/2017 |
| WO | 2020013827 A1 | 1/2020 |

OTHER PUBLICATIONS

Nwankwo et al., "A Survey of Self-Interference Management Techniques for Single Frequency Full Duplex Systems", Nov. 20, 2017, pp. 1 through 25, IEEE.
IEEE, "802.11 Full Duplex", IEEE 802.11-18/0191r0, Jan. 15, 2018, pp. 1 through 19, GenXComm, Inc.
Bharadia et al., "Full Duplex Radios", at least as early as Sep. 6, 2013, pp. 1 through 12.
Italian Ministry of Economic Development, "Search Report and Communication from IT Application No. 102020000022204", from Foreign Counterpart to U.S. Appl. No. 17/119,675, filed Jun. 1, 2021, pp. 1 through 23, Published: IT.
Italian Ministry of Economic Development, "Search Report and Communication from IT Application No. 102021000030107, dated Jun. 1, 2022", from Foreign Counterpart to U.S. Appl. No. 17/119,675, pp. 1 through 16, Published: IT.

* cited by examiner

REDUCE, IN A RECEIVE SIGNAL, INTERFERENCE CAUSED BY A SIMULTANEOUS TRANSMIT SIGNAL IN A SAME FREQUENCY BAND AS THE RECEIVE SIGNAL

CROSS-REFERENCE TO RELATED APPLICATIONS

This application claims the benefit of U.S. Provisional Patent Application Ser. No. 62/948,024, filed on Dec. 13, 2019, and titled "REDUCE, IN A RECEIVE SIGNAL, INTERFERENCE CAUSED BY SIMULTANEOUS TRANSMIT SIGNAL IN A SAME FREQUENCY BAND AS THE RECEIVE SIGNAL," which is hereby incorporated herein by reference in its entirety.

SUMMARY

FIG. 1 is a block diagram of a distributed antenna system (DAS) 10, which is configured for coupling to one or more base stations 12, and which includes one or more remote antenna units 14. Typically, each base station 12 corresponds to, and is controlled by, a particular cellular operator such as T-Mobile®, Verizon®, or ATT®, and is configured to receive uplink signals, and to transmit downlink signals, via one or more of the remote antenna units 14. For example, each base station 12 may be configured to receive uplink signals and to transmit downlink signals via all of the remote antenna units 14 such that each cellular operator is afforded the full signal-coverage area that the DAS 10 is configured to serve.

When operated according to a standard, such as the 5G New Radio (5GNR) standard, that calls for the DAS 10 to operate in a radio access network (RAN), in which the uplink-downlink patterns of the multiple signals change dynamically and may not be synchronized with one another, an antenna 16 of one remote antenna unit 14 may receive an uplink signal at the same time that the antenna, or another antenna on the same, or on a different, remote antenna unit, is transmitting a downlink signal in the same frequency band, or even at one or more same carrier frequencies, as the uplink signal. In a traditional TDD mode, the DAS 10 would be switching between Tx and Rx. That is, the uplink-downlink patterns of all TDD signals in the band are static and synchronized such that the DAS 10 could operate in a traditional TDD mode, switching between Tx/Rx in synch with the predictable pattern of the synchronized TDD signals that the DAS 10 is carrying. In contrast, in newer standards such as 5GNR, the TDD signals within a band are dynamically changing and are not necessarily synchronized with one another; therefore, in this case, it would be, at best, difficult for the DAS 10 to operate in a traditional TDD Mode because there is no predictable Tx/Rx pattern to follow that will applies to all channels.

Unfortunately, if an antenna 16 of a remote antenna unit 14 is receiving an uplink signal at the same time that the antenna, or another antenna on the same or a different remote antenna unit, is transmitting a downlink signal, then the receive signal that the antenna generates in response to the uplink signal may include interference (for example, non-linear-distortion such as adjacent-channel noise and amplifier noise) resulting from the transmit signal driving the antenna, or from one or more downlink signals transmitted by one or more other nearby antennas.

Because the transmit signal exciting the receiving antenna 16, and the one or more downlink signals transmitted by one or more other antennas, are much more powerful at the receiving antenna than the uplink signal, the transmit interference in the receive signal typically "swamps" the uplink component of the receive signal.

To achieve, for example, a noise figure of 5 dB for the receive signal at the receiver coupled to a receiving antenna 16 over an uplink-channel bandwidth of 5 MHz while a 100 milliwatt (mW) signal with a channel-leakage ratio (ACLR) of −45 dBc is being simultaneously transmitted on an adjacent channel, it is anticipated that the remote antenna unit 14 will need to be configured to reduce the total effective transmit-interference power in the uplink channel by about 77 dB.

Therefore, a need has arisen for isolation circuitry and interference-cancelling circuitry configured to reduce, to an acceptable level, transmit interference in a receive signal generated by a remote antenna unit 14 of a DAS 10 operating in a radio access network; and a need also has arisen for a remote antenna unit incorporating such circuitry.

In an embodiment, a remote antenna unit that can meet the above-described features includes a transmitter or a portion thereof, a receiver or a portion thereof, an antenna array, and first and second interference circuits. The transmitter, or portion thereof, is configured to generate at least one transmit signal, and the receiver, or portion thereof, is configured to process at least one receive signal. For example, as used herein, "transmitter" and "receiver" are understood to mean at least a portion of the transmit or receive chain that can be split between a host location (e.g., a base station 12 or the master unit 18) and a remote antenna unit 14. For example, the generation (modulation) and processing (demodulation) can take place back at a base station 12, not in a remote antenna unit 14. In an example, the remote antenna unit 14 includes the RF front-end circuitry, which can include, e.g., a digital-to-analog converter (DAC), an upconverter, and a power amplifier on the downlink path, and which can include a low-noise amplifier, a down-converter, and an analog-to-digital converter (ADC) on the uplink path. The antenna array includes one or more antennas, each of at least one of the one or more antennas coupled to the transmitter and configured to radiate a respective downlink signal in response to a respective one of the at least one transmit signal, and each of the at least one or more antennas coupled to the receiver and configured to generate a respective one of the at least one receive signal in response to an uplink signal. And the first and second interference circuits are each coupled to the transmitter and to the receiver and are each configured to reduce, in each of the at least one receive signal, interference caused by one or more of the at least one transmit signal, the at least one downlink signal radiated by one of the one or more antennas on the same remote antenna unit, and the at least one interfering downlink signal radiated by one of one or more other antennas on one or more other remote antenna units.

For example, such a remote antenna unit may include multiple different interference-reducing circuits that together provide a suitable level of interference reduction in the receive signal.

Further in example, one of the interference-reducing circuits may be an isolation circuit configured to isolate the transmitter from the receiver so as to reduce the interference that a transmit signal to an antenna causes to a receive signal from the same antenna, where the transmit signal and receive signal at least partially overlap in time, and even where the interference includes passive intermodulation (PIM).

Still further in example, one of the interference-reducing circuits may be an analog interference-cancellation circuit configured to provide first-order linear correction by cancelling, from a receive signal, a transmit signal to the same antenna or a downlink signal from an adjacent antenna on the same, or on a different, remote antenna unit, where the transmit signal or downlink signal at least partially overlaps the receive signal in time.

Yet further in example, one of the interference-cancellation circuits may be a digital interference-cancellation circuit configured to provide first-order linear correction, and non-linear correction, to a receive signal. The digital interference-cancellation circuit may provide first-order linear correction to a receive signal in the same manner as the analog interference-cancellation circuit as described above, and may provide non-linear correction, for example, by cancelling, from the receive signal, out-of-band distortion (also called frequency side bands and frequency "skirts") that still may be close enough to the frequency of the receive signal such that it is difficult to reduce this distortion to an acceptable level with traditional filtering.

And yet still further in example, each of one or more of the interference-reducing circuits may include one or more control loops, and two or more of the interference-reducing circuits may form, or otherwise be part of, a control loop. For example, a digital interference-cancellation circuit may use negative feedback to control the parameters of an isolation circuit to further reduce a level of transmit interference in a receive signal.

DRAWINGS

Figure 1:
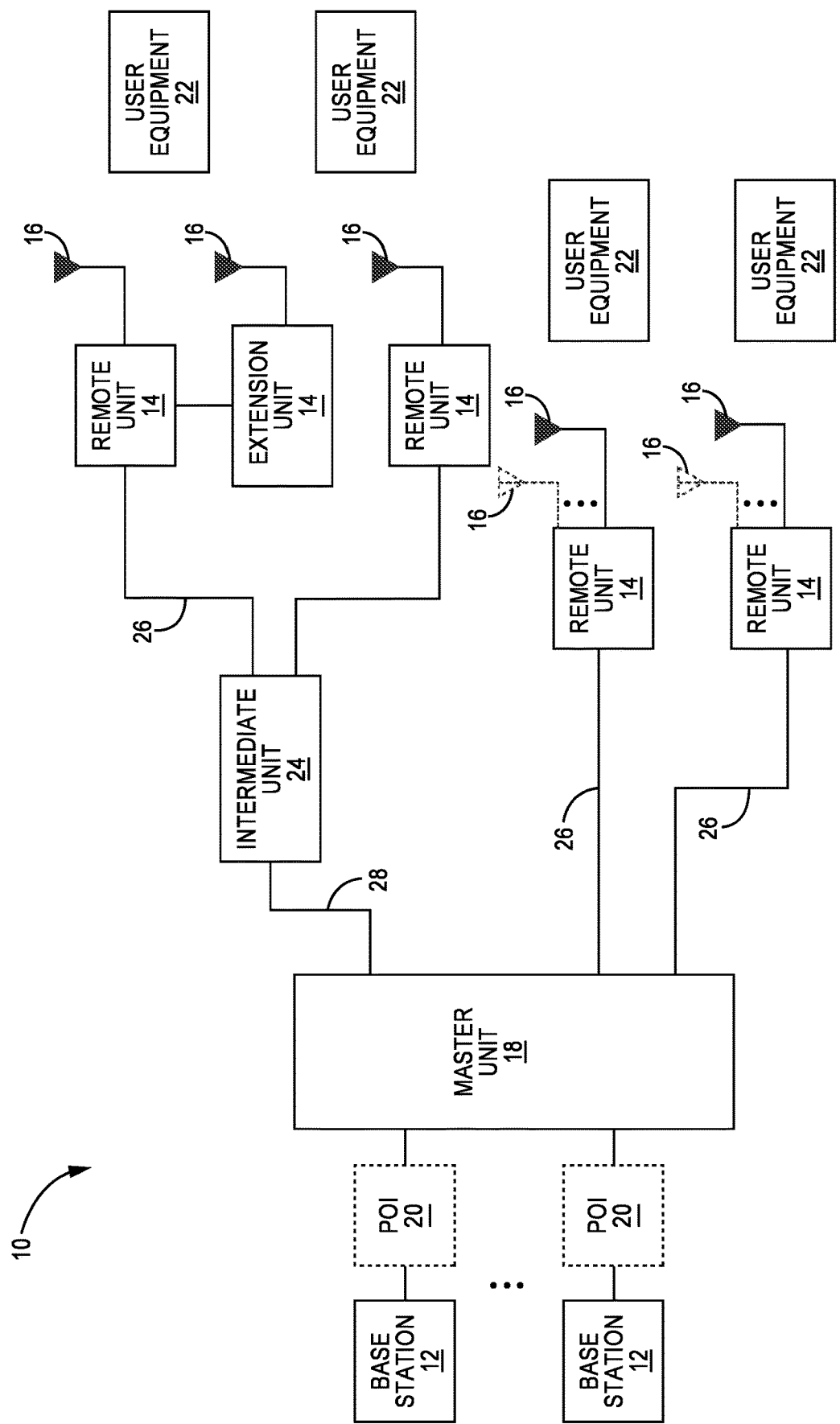
FIG. 1 is a diagram of a distributed antenna system (DAS), base stations coupled to the DAS, and user equipment configured for communicating with the DAS and with the base stations via the DAS.
Figure 6:
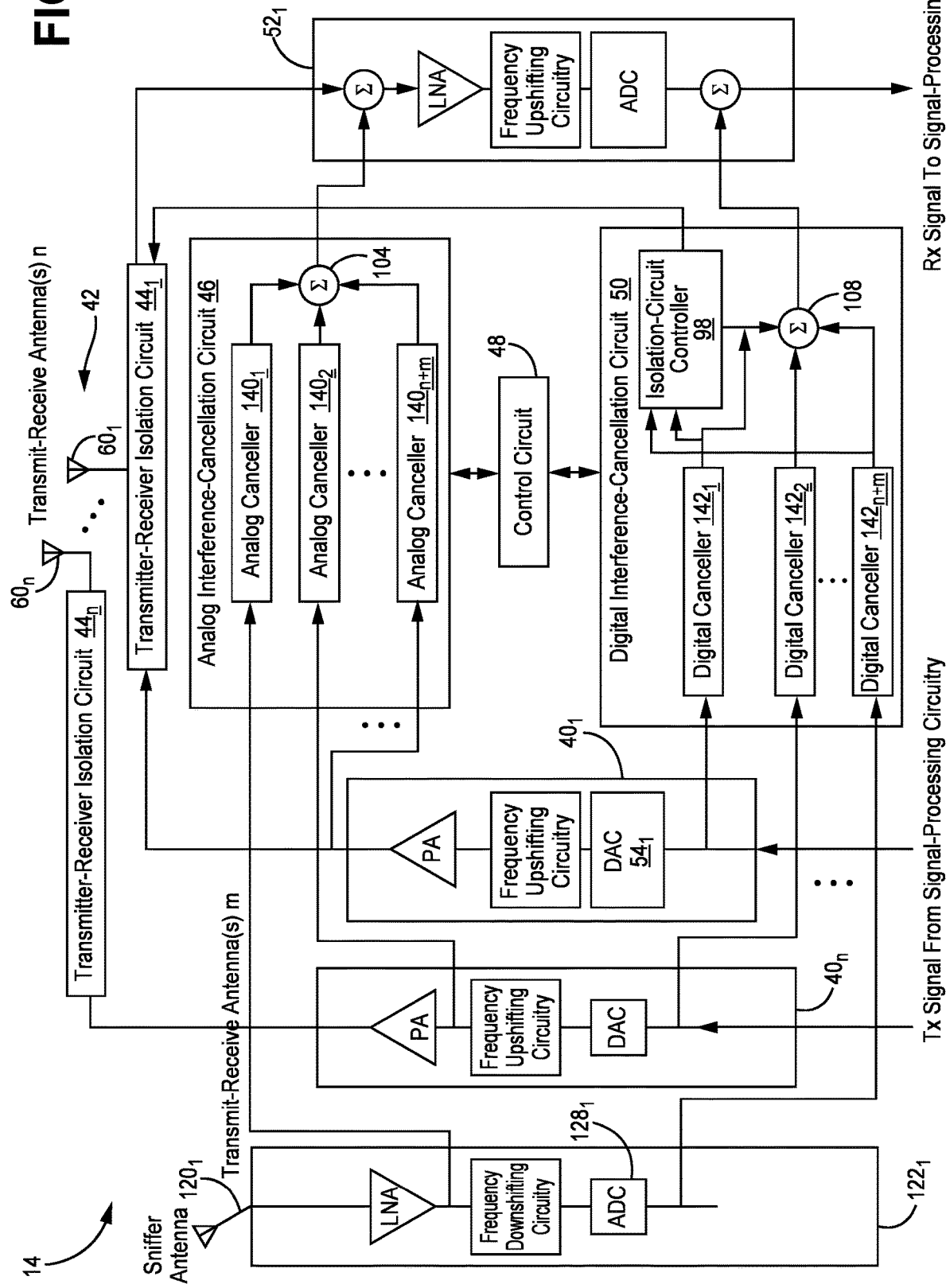

FIG. 6 is a diagram of a portion of a remote antenna unit of FIG. 1, where the portion includes circuitry configured to reduce, in a receive signal from an antenna, interference caused by a simultaneous transmit signal to the same antenna, and caused by one or more downlink signals from one or more other antennas on the same, or on one or more different, remote antenna unit(s), according to an embodiment.

Figure 7:
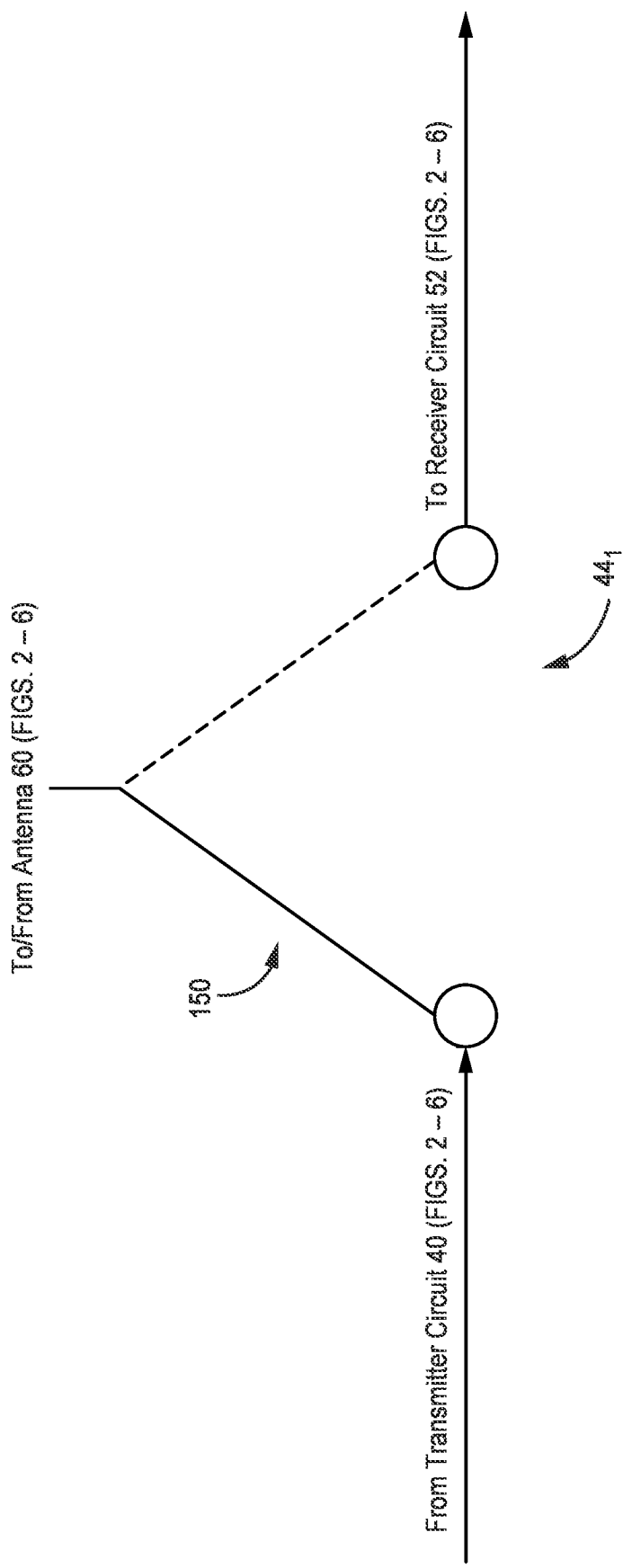

FIG. 7 is a diagram of the transmitter-receiver isolation circuit of FIGS. 2-6, according to an embodiment.

Figure 8:
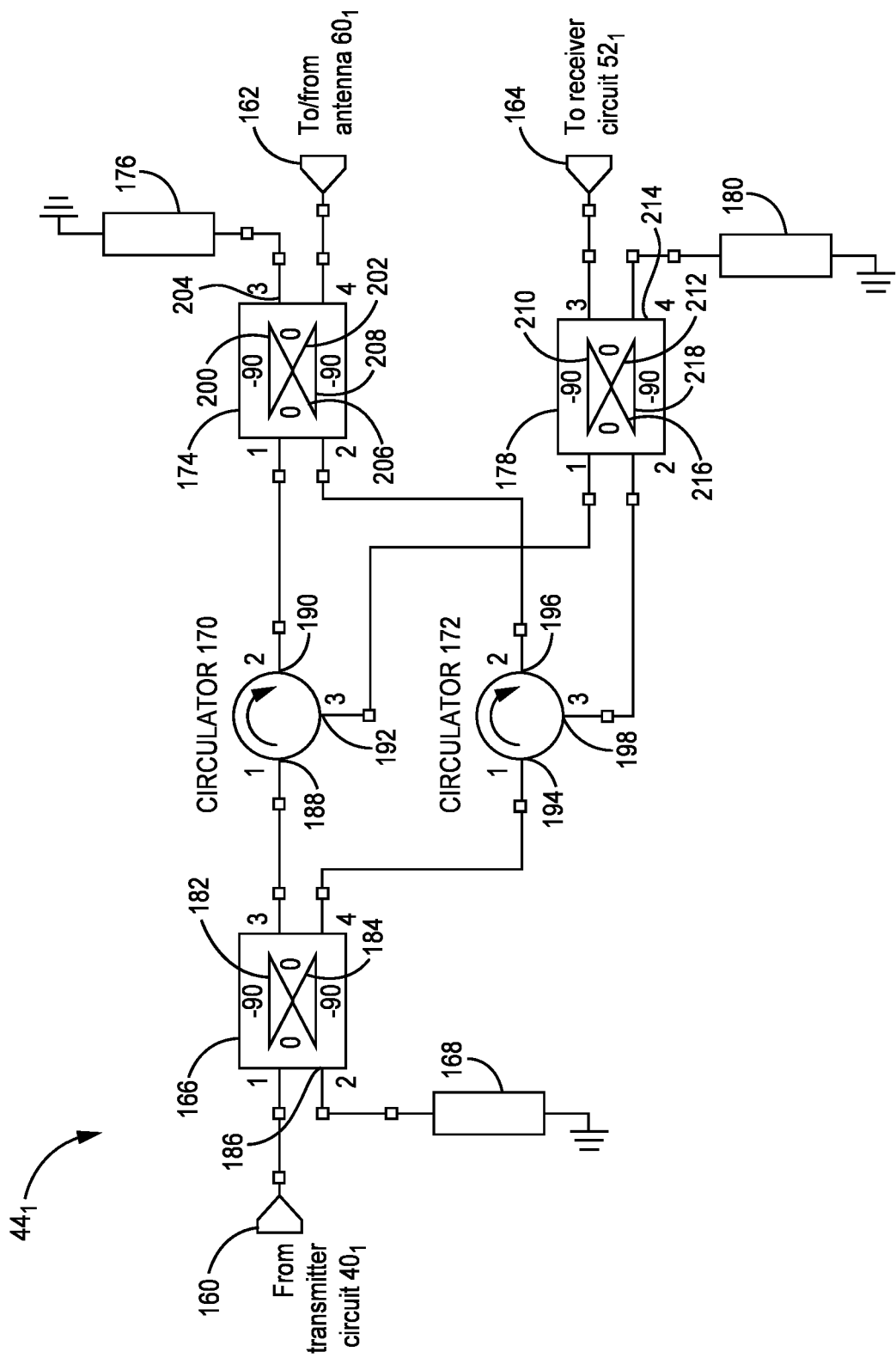

FIG. 8 is a diagram of the transmitter-receiver isolation circuit of FIGS. 2-6, according to an embodiment.

Figure 9:
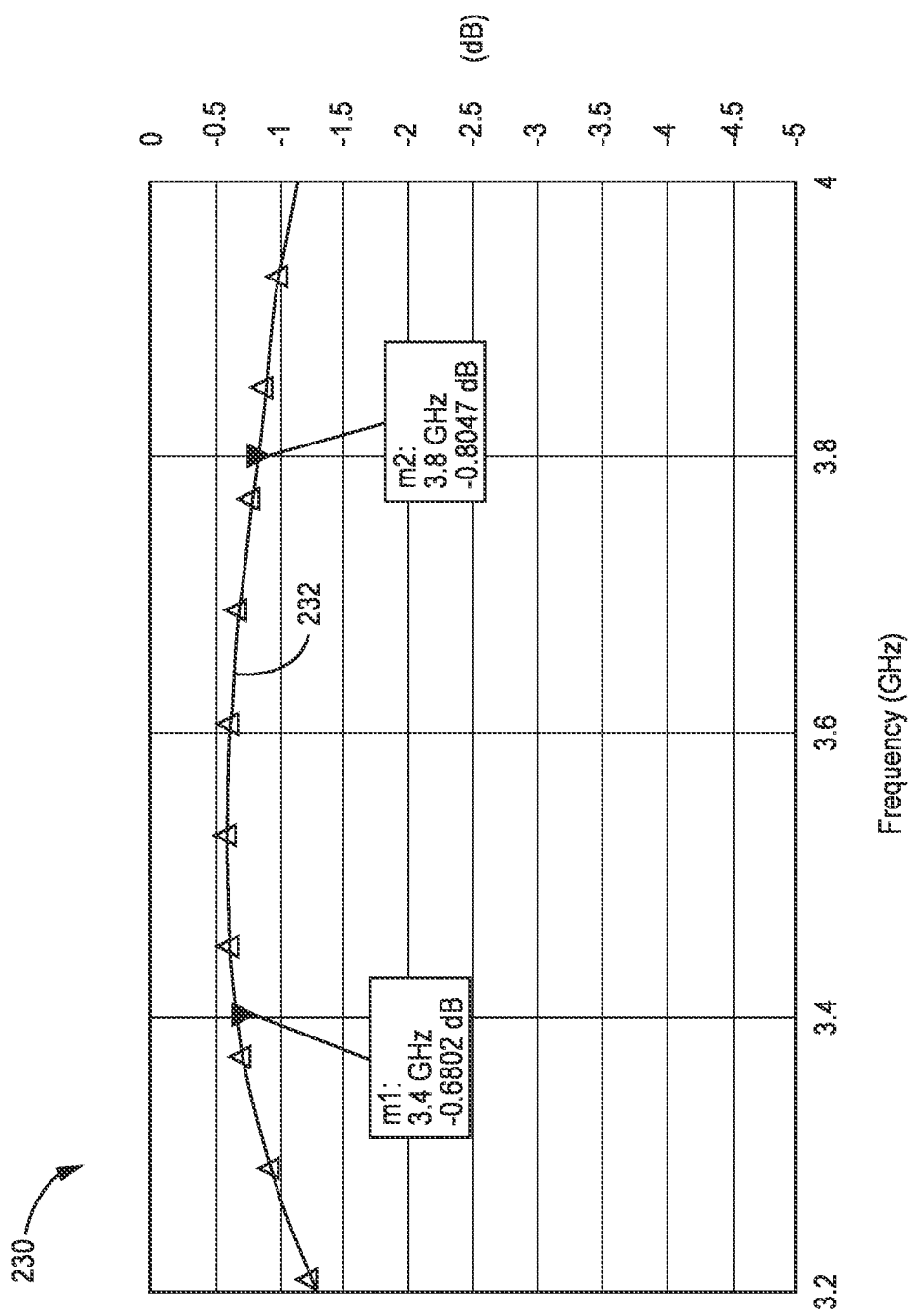

FIG. 9 is a plot of the transmit insertion loss versus frequency of the transmitter-receiver isolation circuit of FIG. 8, according to an embodiment.

Figure 10:
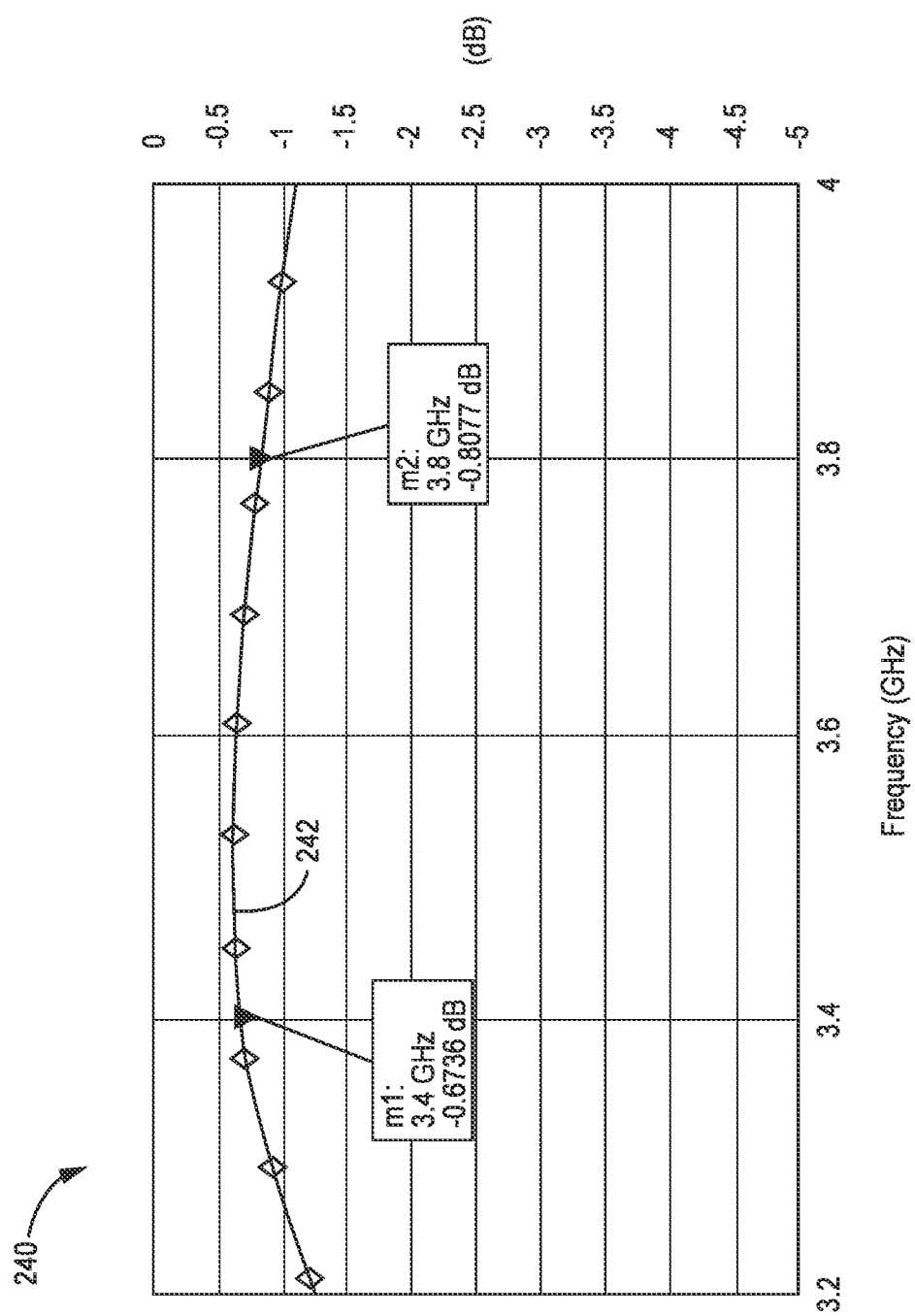

FIG. 10 is a plot of the receive insertion loss versus frequency of the transmitter-receiver isolation circuit of FIG. 8, according to an embodiment.

Figure 11:
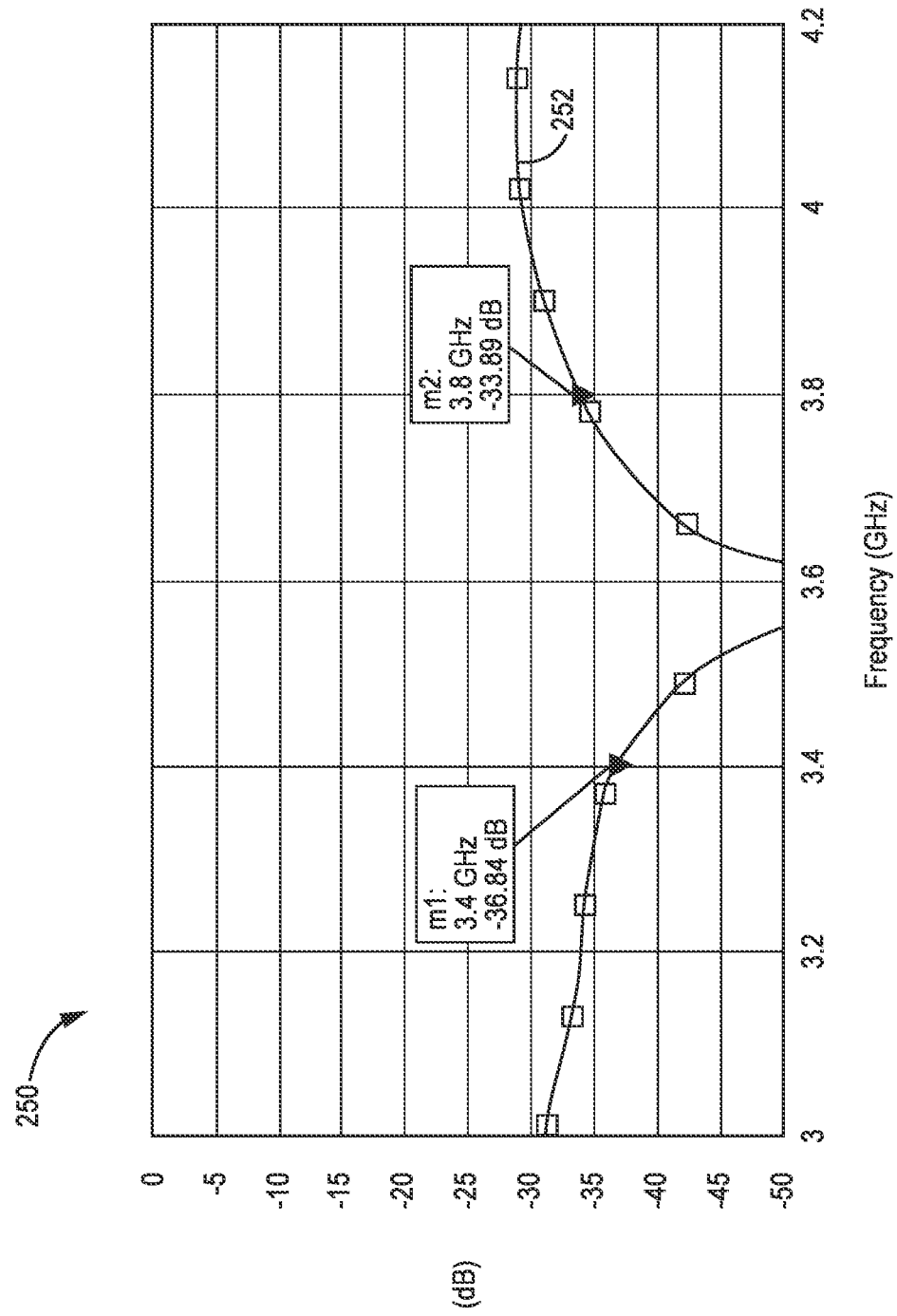

FIG. 11 is a plot, versus frequency, of the isolation provided by the transmitter-receiver isolation circuit of FIG. 8 between the transmitter and receiver of FIGS. 2-6, according to an embodiment.

Figure 12:
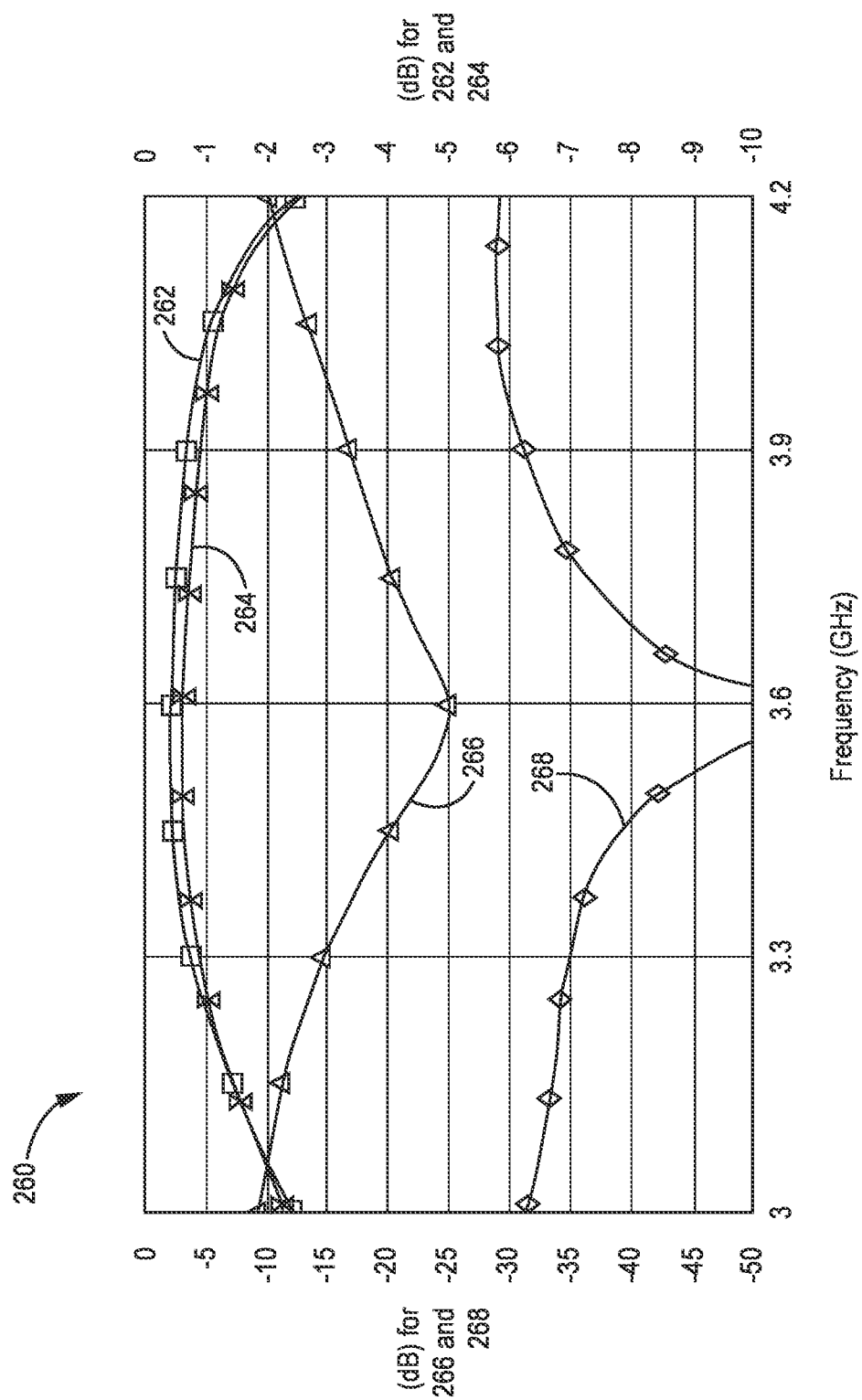

FIG. 12 is a plot comparing the transmitter-to-antenna insertion loss and the transmitter-receiver isolation provided by the transmitter-to-receiver isolation circuit of FIG. 8 to the transmitter-to-antenna insertion loss and the transmitter-to-receiver isolation that would be provided by one of the circulators of FIG. 8, according to an embodiment.

Figure 13:
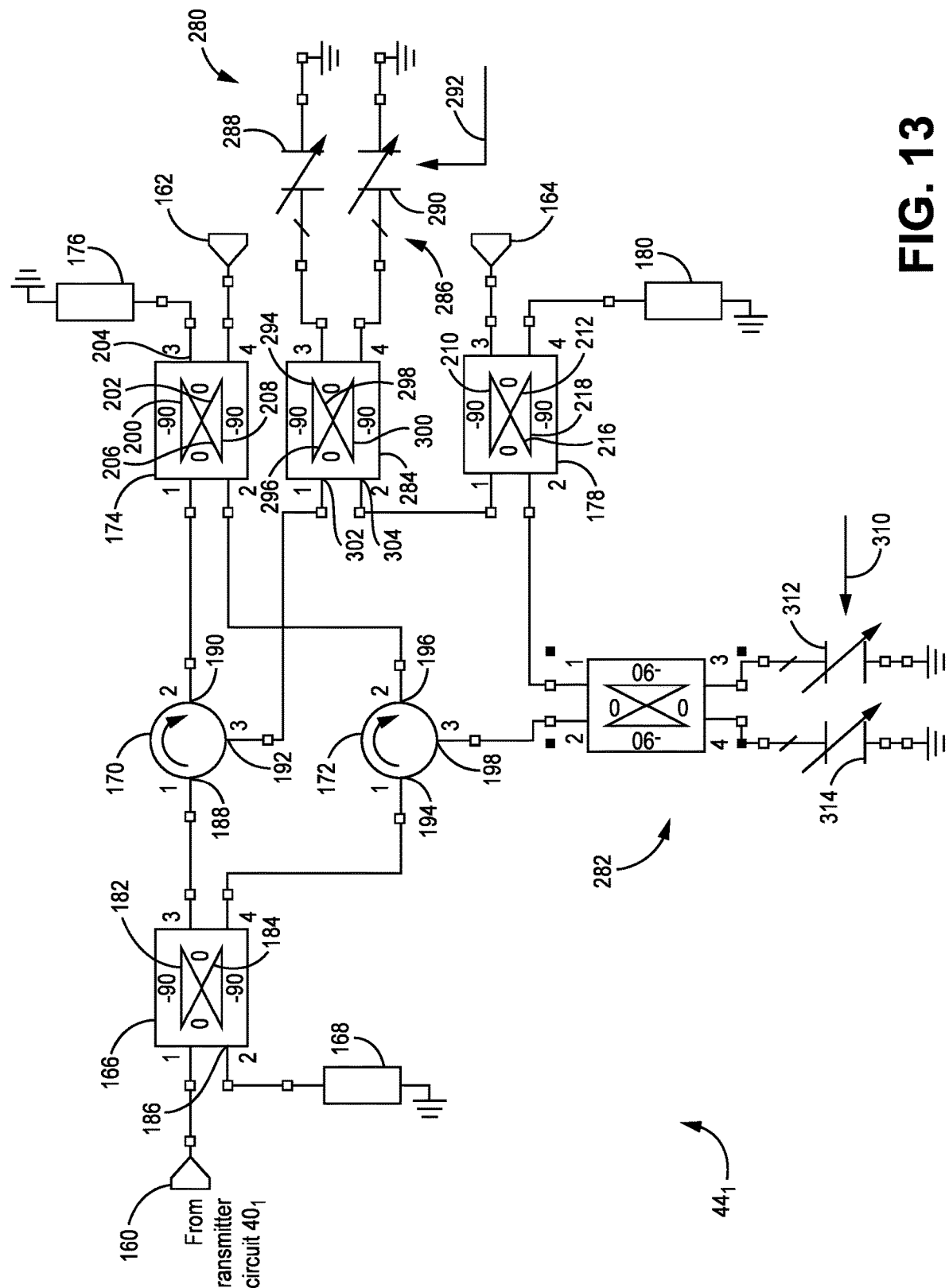

FIG. 13 is a diagram of the transmitter-receiver isolation circuit of FIGS. 2-6, according to an embodiment.

Figure 14:
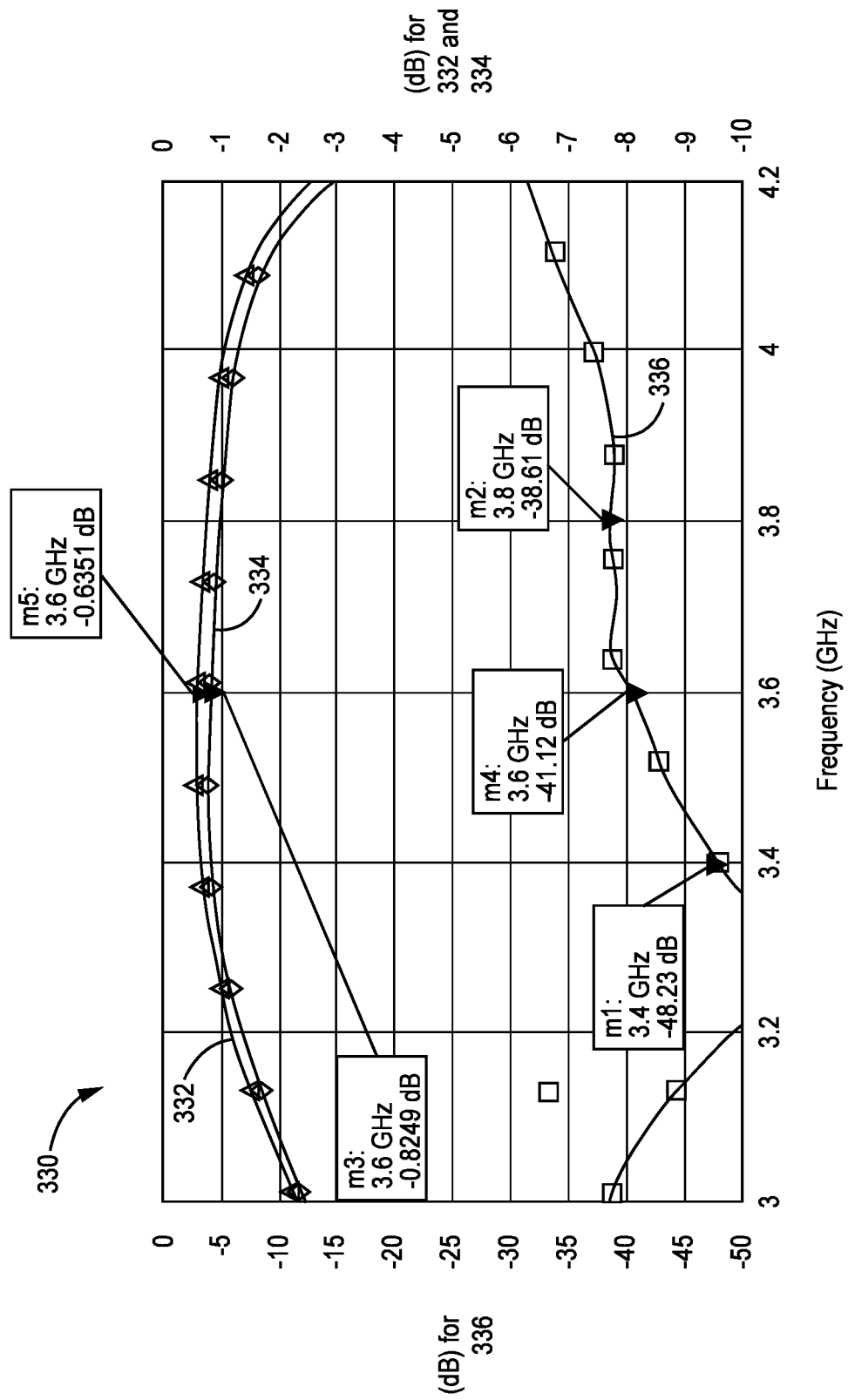

FIG. 14 is a plot of the transmitter-to-antenna insertion loss, antenna-to-receiver insertion loss, and transmitter-to-receiver isolation provided by the transmitter-receiver isolation circuit of FIG. 13, according to an embodiment.

Figure 15:
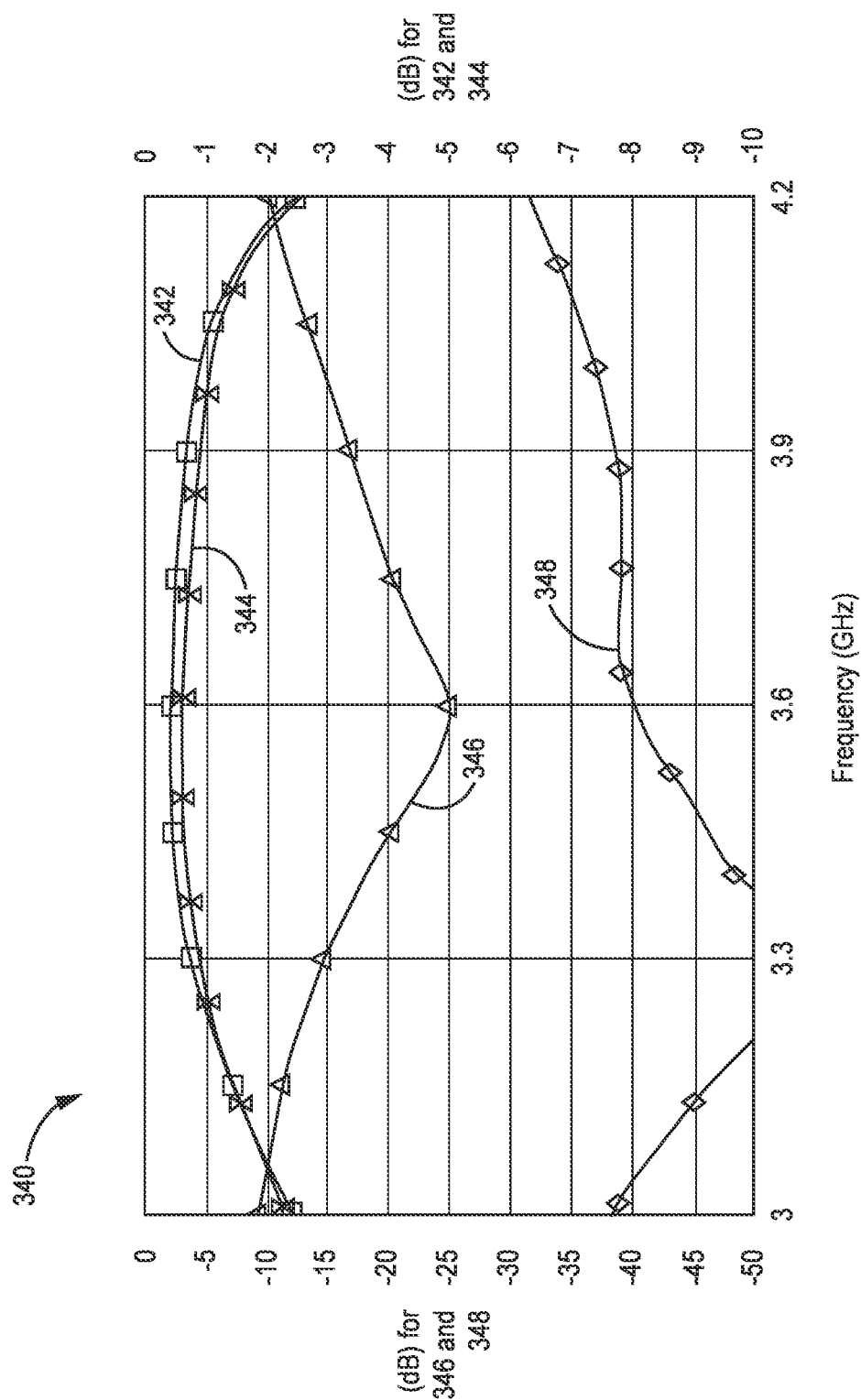

FIG. 15 is a plot comparing the transmitter-to-antenna insertion loss and the transmitter-receiver isolation provided by the transmitter-to-receiver isolation circuit of FIG. 13 to the transmitter-to-antenna insertion loss and the transmitter-to-receiver isolation that would be provide by one of the circulators of FIG. 13, according to an embodiment.

Figure 16:
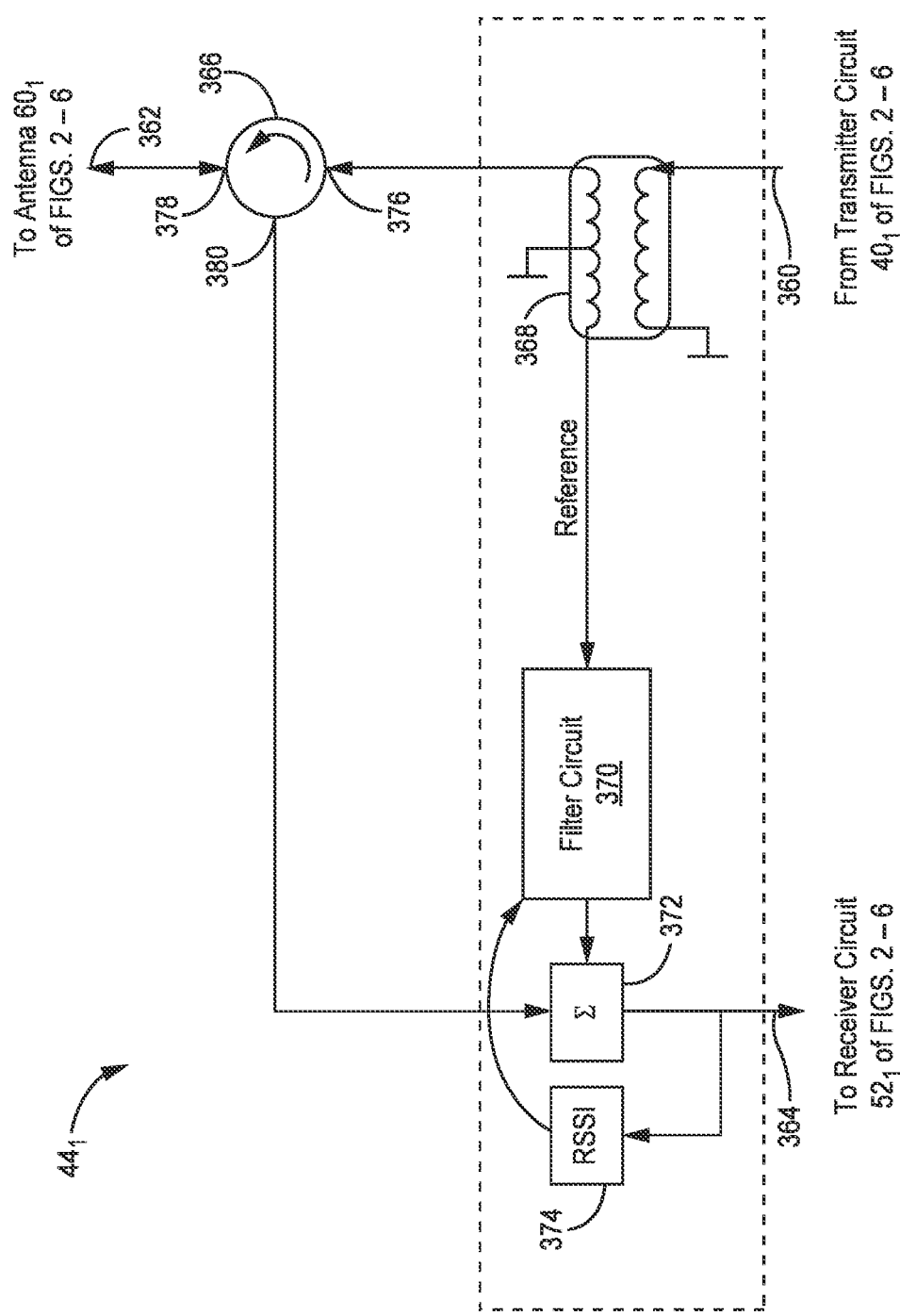

FIG. 16 is a diagram of the transmitter-receiver isolation circuit of FIGS. 2-6, according to an embodiment.

Figure 17:
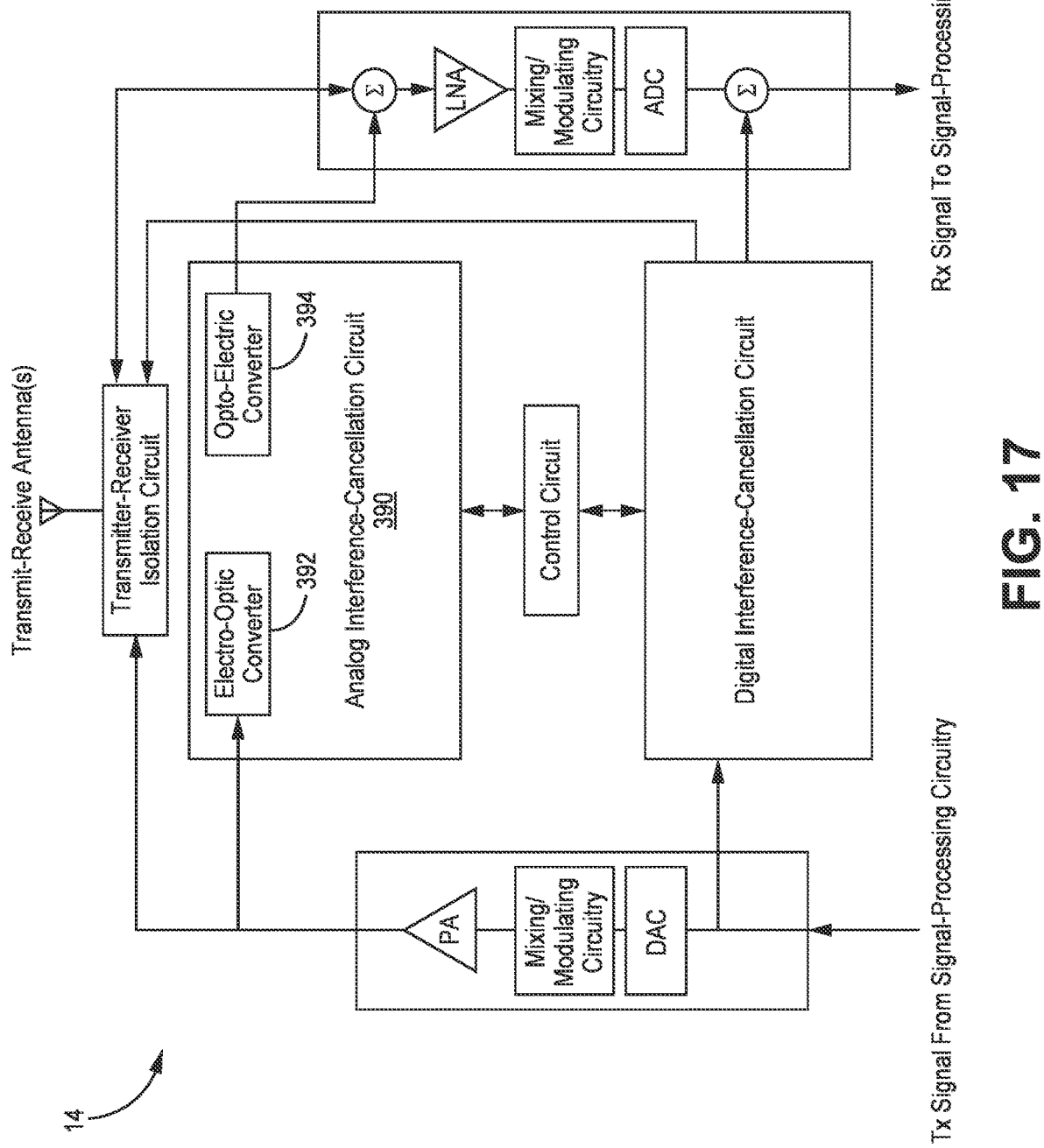

FIG. 17 is a diagram of a portion of a remote antenna unit of FIG. 1, where the portion includes circuitry configured to reduce, in a receive signal from an antenna, interference caused by a simultaneous transmit signal to the same antenna, according to an embodiment.

Figure 18:
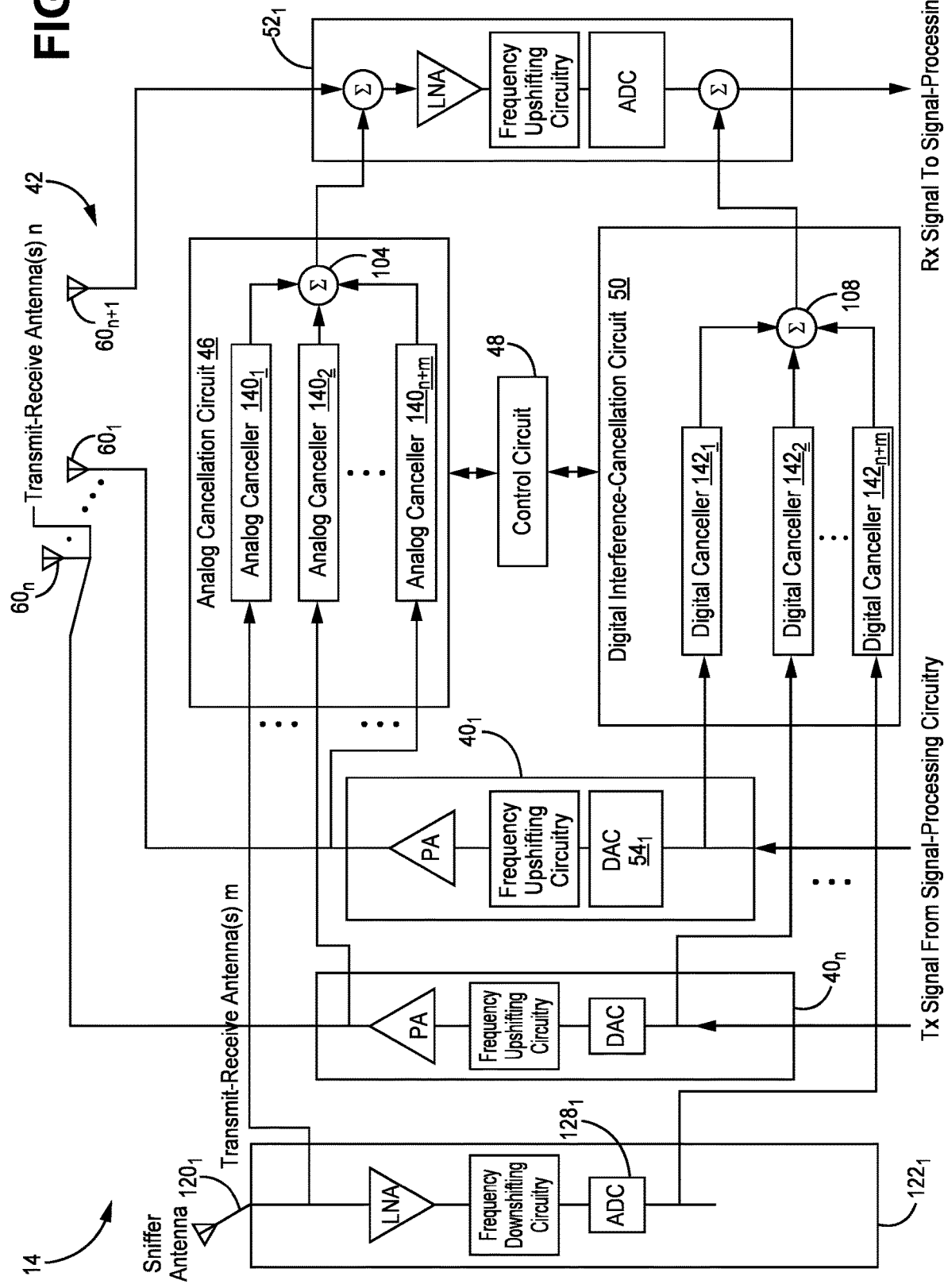

FIG. 18 is a diagram of a portion of a remote antenna unit of FIG. 1, where the remote antenna unit includes separate transmit and receive antennas, according to an embodiment.

Figure 19:
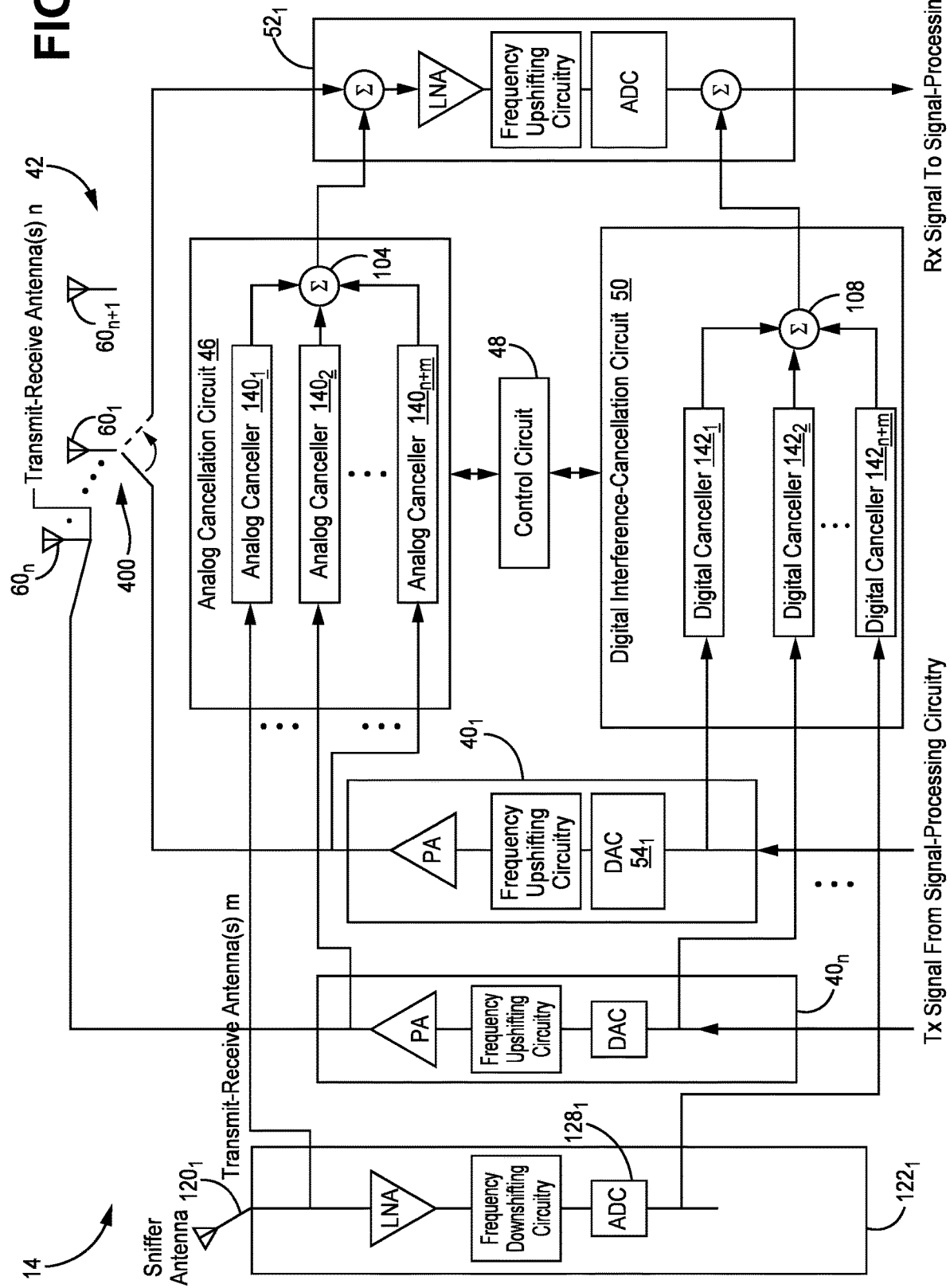

FIG. 19 is a diagram of a portion of a remote antenna unit of FIG. 1, where the remote antenna unit includes, for each of one or more operators, a respective transmit-and-receive antenna coupled to a transmitter and to a receiver with a switch, according to an embodiment.

DETAILED DESCRIPTION

"Approximately," "substantially," and similar words, as used herein, indicate that a given quantity b can be within a range b±10% of b, or b±1 if |10% of b|<1. "Approximately," "substantially," and similar words, as used herein, also indicate that a range b–c can be from b−0.10(c−b) to c+0.10(c−b). Regarding the planarity of a surface or other region, "approximately," "substantially," and similar words, as used herein, indicate that a difference in thickness between a highest point and a lowest point of the surface/region does not exceed 0.20 millimeters (mm).

As described above, FIG. 1 is a diagram of a DAS 10, which is coupled to one or more base stations 12 and which includes one or more remote antenna units 14.

In an embodiment, one or more of the remote antenna units 14 can be configured to reduce, in one or more receive signals, interference caused by one or more respective transmit signals to the same antenna and caused by one or more downlink signals from antennas on the same remote antenna unit or on one or more different remote antenna units.

The remote antenna units 14 of the DAS 10 typically are distributed within a structure (e.g., an office building, warehouse, mall, sports complex) or within or around an outdoor area (e.g., a stadium, a downtown, an outdoor event venue, a park, a beach) to provide wireless-communication coverage so that people can use their wireless devices (e.g., smart phones, tablets, laptops) while within the structure or outdoor area. Examples of the types of wireless coverage that a DAS can provide include Wi-Fi®, cellular service, and data service over one of the many available long-term-evolution (LTE) frequency bands (e.g., B1, B3, B7, B25, and B66). And the frequency range over which the DAS 10 can be configured to operate is, for example, approximately 600 MHz-71 GHz. For example, the DAS 10 can be configured to operate in the 5GNR frequency band of approximately 3.4 GHz-3.8 GHz.

In addition to the remote antenna units 14, the DAS 10 is coupled to, or includes, one or more master units 18, which are communicatively coupled to the remote antenna units 14. Further in an embodiment, the DAS 10 includes a digital DAS, in which DAS traffic is distributed between the master unit(s) 18 and the remote antenna units 14 in digital form. In other embodiments, the DAS 10 is implemented, at least in part, as an analog DAS, in which DAS traffic is distributed at least part of the way between the master unit(s) 18 and the remote antenna units 14 in analog form.

Each master unit 18 also is communicatively coupled to the one or more base stations 12. One or more of the base stations 12 can be co-located with the respective master unit 18 to which it is coupled (for example, where the base station 12 is dedicated to providing base-station capacity to the DAS 10). Also, one or more of the base stations 12 can be located remotely from the respective master unit 18 to which it is coupled (for example, where the base station 12 is a macro base station providing base-station capacity to a macro cell in addition to providing capacity to the DAS 10). In this latter case, a master unit 18 can be coupled to a donor antenna (not shown in FIG. 1) in order to wirelessly communicate with the remotely located base station 12. Furthermore, one or more of the one or more base stations 12 each can be coupled to the master unit 18 using a respective network of attenuators, combiners, splitters, amplifiers, filters, cross-connects, etc., which respective network is referred to as a respective point-of-interface (POI) circuit 20. This is done so that, in the downlink, the desired set of RF carriers output by the base station(s) 12 can be extracted, combined, and routed to the appropriate master unit 18, and so that, in the uplink, the desired set of carriers output by the master unit 18 can be extracted, combined, and routed to the appropriate interface of each base station.

The base station(s) 12 each can be implemented as a respective traditional monolithic base station. Also, the base station(s) 12 each can be implemented using a distributed base-station architecture in which a base-band unit (BBU) (not shown in FIG. 1) is coupled to one or more remote radio heads (RRHs) (not shown in FIG. 1), where the front haul between the BBU and the RRH uses streams of digital IQ samples. Examples of such an approach are described in the Common Public Radio Interface (CPRI), Open Base Station Architecture Initiative (OBSAI), and Open RAN (O-RAN) families of specifications, which are incorporated by reference herein.

The master unit(s) 18 each can be configured to use wideband interfaces or narrowband interfaces to the base station(s) 12. Also, the master unit(s) 18 each can be configured to interface with the base station(s) 12 using analog radio frequency (RF) interfaces or digital interfaces (for example, using a CPRI, OBSAI, or O-RAN digital interfaces).

Traditionally, each master unit 18 interfaces with each base station 12 using the analog radio frequency signals that each base station communicates to and from user equipment (e.g., smart phone, tablet, laptop) 22 using a suitable air-interface standard. The DAS 10 operates as a distributed repeater for such radio frequency signals. RF signals transmitted from each base station 12 (also referred to herein as "downlink RF signals") are received at one or more master units 18. Each master unit 18 uses the downlink RF signals to generate a downlink transport signal that is distributed to one or more of the remote antenna units 14. Each such remote antenna unit 14 receives the downlink transport signal and reconstructs a version of the downlink RF signals based on the downlink transport signal and causes the reconstructed downlink RF signals to be radiated from at least one antenna array 16 included in, or otherwise coupled to, that remote antenna unit.

A similar process is performed in the uplink direction. RF signals transmitted from user equipment 22 (also referred to herein as "uplink RF signals") are received at one or more remote antenna units 14. Each remote antenna unit 14 uses the uplink RF signals to generate an uplink transport signal that is transmitted from the remote antenna unit 14 to a master unit 18. Each master unit 18 receives uplink transport signals transmitted from one or more remote antenna units 14 coupled to it. The master unit 18 combines data or signals communicated via the uplink transport signals received at the master unit and reconstructs a version of the uplink RF signals received at the remote antenna units 14. The master unit 18 communicates the reconstructed uplink RF signals to one or more base stations 12. In this way, the signal and communication coverage of the base station(s) 12 can be expanded using the DAS 10.

One or more intermediate units 24 (some of which are also referred to here as "expansion units") can be placed between the master unit(s) 18 and one or more of the remote antenna units 14. This can be done, for example, to increase the number of remote antenna units 14 that a single master unit 18 can feed, to increase the master-unit-to-remote-unit distance, and/or to reduce the amount of cabling needed to couple a master unit to its associated remote antenna units.

As noted above, the DAS 10 can be implemented as a "digital" DAS. In a "digital" DAS, signals received from and provided to the base station(s) 12 and user equipment 22 are used to produce digital in-phase (I) and quadrature (Q) samples, which are communicated between the master unit(s) 18 and the remote antenna units 14. It is noted that this digital IQ representation of the original signals received from the base station(s) 12 and from the user equipment 22 still maintains the original modulation (that is, the change in the amplitude, phase, or frequency of a carrier) used to convey telephony or data information pursuant to the cellular air-interface protocol used for wirelessly communicating between the base station(s) and the user equipment. Examples of such cellular air-interface protocols include, for example, 5GNR, the Global System for Mobile Communication (GSM), Universal Mobile Telecommunications System (UMTS), and Long-Term Evolution (LTE) air-interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

Furthermore, one or more of the master units 18 can be configured to interface with one or more base stations 12 using an analog RF interface (for example, either a traditional monolithic base station 12 or via the analog RF interface of an RRH). As described above, the base station(s) 12 can be coupled to the master units 18 using a network of attenuators, combiners, splitters, amplifiers, filters, cross-connects, etc., (sometimes referred to collectively as a "point-of-interface" or "POI" 20). This is done so that, in the downlink, the desired set of RF carriers output by the base station(s) 12 can be extracted, combined, and routed to the appropriate master unit 18, and so that, in the uplink, the desired set of carriers output by the master unit can be extracted, combined, and routed to the appropriate interface of each base station.

Each master unit 18 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples also can be filtered, amplified, attenuated, and/or re-sampled or decimated to a lower sample rate. The digital samples can be produced in other ways. Each stream of digital IQ samples represents a portion of wireless radio frequency spectrum output by one or more base stations 12. Each portion of wireless radio frequency spectrum can include, for example, a band of wireless spectrum, a sub-band of a given band of wireless spectrum, or an individual wireless carrier.

Likewise, in the uplink, each master unit 18 can produce an uplink analog wireless signal from one or more streams of digital IQ samples received from one or more remote antenna units 14 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

One or more of the master units 18 can be configured to interface with one or more base stations 12 using a digital interface (in addition to, or instead of) interfacing with one or more base stations via an analog RF interface. For example, the master unit 18 can be configured to interact directly with one or more BBUs using the digital IQ interface that is used for communicating between the BBUs and an RRHs (for example, using the CPRI serial digital IQ interface).

In the downlink, each master unit 18 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 14 used in the DAS 10. In the uplink, each master unit 18 receives uplink streams of digital IQ samples from one or more remote antenna units 14, digitally combines streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into uplink streams of digital IQ samples compatible with the one or more BBUs that are coupled to that master unit.

Each master unit 18 also can be implemented in other ways.

In the downlink, each remote antenna unit 14 receives streams of digital IQ samples from one or more master units 18, where each stream of digital IQ samples represents a portion of wireless radio frequency spectrum output by one or more base stations 12.

Each remote antenna unit 14 is communicatively coupled to one or more master units 18 using, for example, one or more optical fibers or cables, one or more ETHERNET-compatible cables 26 (for example, one or more CAT-6A cables), or any other suitable coupling medium. For example, in this embodiment, each remote antenna unit 14 can be directly connected to a master unit 18 via a single ETHERNET cable 26 or indirectly via multiple ETHERNET-compatible cables 26 such as where a first ETHERNET cable connects the remote antenna unit to a patch panel or expansion/intermediate unit 24 and a second optical fiber cable 28 connects the patch panel or expansion/intermediate unit to the master unit. Each remote antenna unit 14 can be coupled to one or more master units 18 in other ways. And the master unit 18 or expansion/intermediate unit(s) 24 can include one or more instances of power-supply equipment (PSE) that are configured to provide power to the remote antenna units 14.

In the example DAS 10 shown in FIG. 1, a remote antenna unit 14 is shown having another co-located extension unit 14 (also referred to herein as an "extension remote antenna unit") communicatively coupled to it. Subtending a co-located extension remote antenna unit 14 from another remote antenna unit 14 can be done in order to expand the number of frequency bands that are radiated from that same location and/or to support MIMO service (for example, where different co-located remote antenna units radiate and receive different MIMO streams for a single MIMO frequency band). The remote antenna unit 14 is communicatively coupled to the extension remote antenna units 14 using a fiber optic cable, a multi-conductor cable, coaxial cable, or the like. In such an implementation, the extension remote antenna units 14 are coupled to the master unit 18 of the DAS 10 via the remote antenna unit 14.

Figure 2:
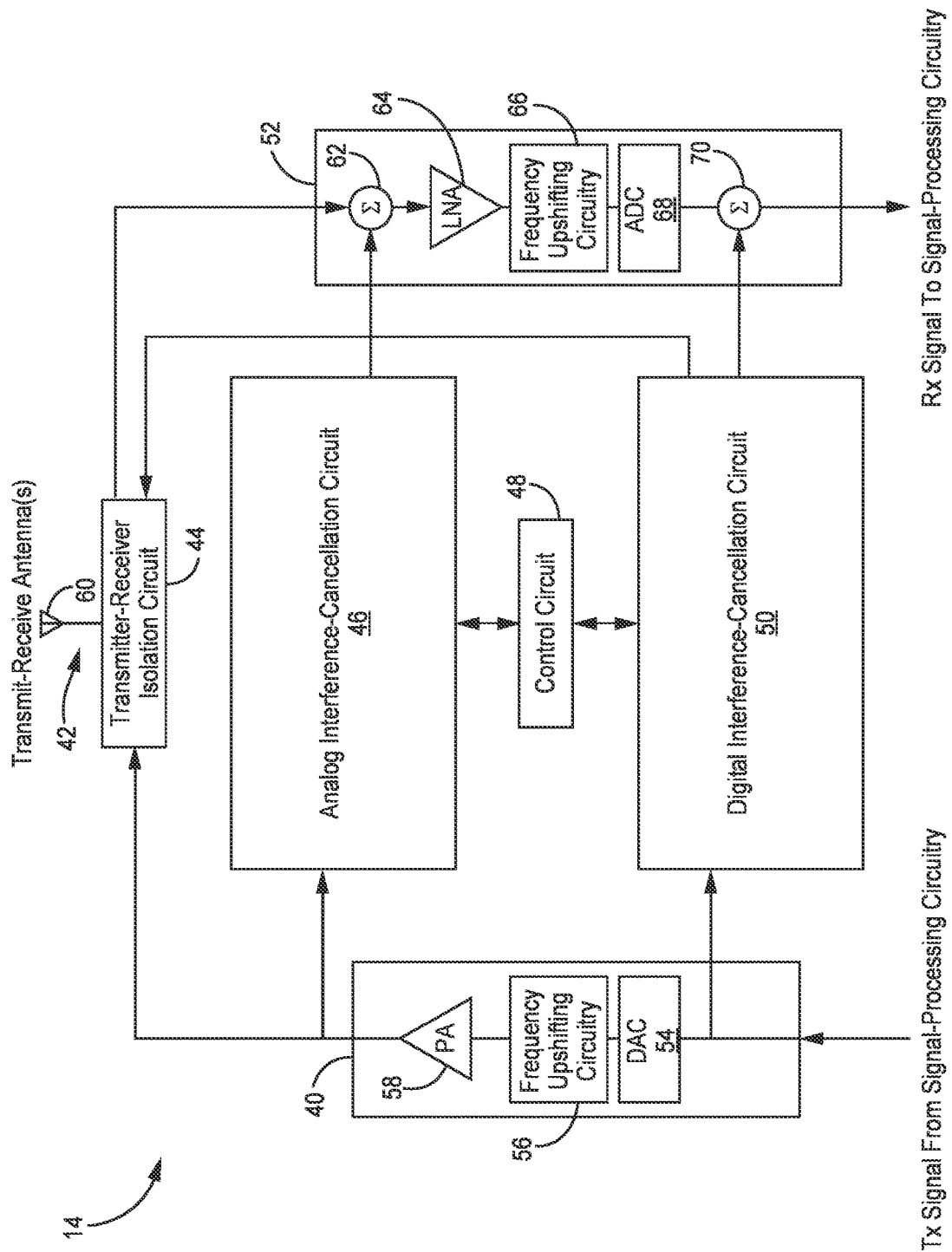
FIG. 2 is a diagram of a portion of a remote antenna unit of FIG. 1, where the portion includes circuitry configured to reduce, in a receive signal from an antenna, interference caused by a simultaneous transmit signal to the same antenna, according to an embodiment.

FIG. 2 is a diagram of a portion of a remote antenna unit 14 of FIG. 1, according to an embodiment in which the portion of the remote antenna unit includes one or more interference-reducing circuits. The word "reducing," as used herein, includes reducing interference to a non-zero value, as well as reducing interference to approximately a zero value, where the latter also can be referred to as "eliminating" interference.

The remote antenna unit 14 includes one or more transmitter circuits 40, an antenna array 42, a transmitter-receiver isolation circuit 44, an analog interference-cancellation circuit 46, a control circuit 48, a digital interference-cancellation circuit 50, and one or more receiver circuits 52. Although the circuit diagram of FIG. 2 includes a single transmitter circuit 40 and a corresponding single receiver circuit 52, it is understood that the diagrammed circuit can be repeated for each additional interference-related pair of a corresponding transmitter circuit and receiver circuit, except that regardless of the number of transmitter circuits and receiver circuits 52, the remote antenna unit 14 may include a single antenna array 42 and a single control circuit 48. Furthermore, the antenna array 42 includes a number of antennas 60. For a non-multiple-input-multiple-output (non-MIMO) configuration, each antenna 60 is operated, at any given time, to transmit, to receive, or both to transmit and to receive, a single downlink signal or a single uplink signal, and each antenna can include one or more antenna elements configured to transmit or receive the same signal but possibly with respective phase shifts or respective amplitude attenuations (for example, where the antenna is a phased-array antenna). In a MIMO configuration, each group of multiple antennas 60 in the antenna array 42 is configured to transmit or to receive a downlink signal or an uplink signal; during at least a transmit period in a MIMO configuration, each antenna in the group of multiple antennas is configured to transmit a respective separate component of the MIMO downlink signal. Moreover, each transmitter circuit 40 also can be referred to as a downlink circuit, a downlink path, a transmit path, a partial transmitter, or the like; similarly, each receiver circuit 52 also can be referred to as an uplink circuit, an uplink path, a receive path, a partial receiver, or the like.

Each transmitter circuit 40 located on the remote antenna unit 14 includes a digital-to-analog converter (DAC) 54, frequency upshifting circuitry 56, and a power amplifier 58. The DAC 54 is configured to receive a digital baseband information signal that a signal-processing circuit (not shown in FIG. 2) onboard the remote antenna unit 14 generated to include data (or other information) from a base station 12 (FIG. 1), and is configured to convert the digital baseband information signal into an analog baseband information signal. The frequency upshifting circuitry 56 is configured to modulate a carrier signal with the analog signal, where the carrier signal has a carrier frequency that is within the frequency band (for example, 3.4 GHz-3.8 GHz) at which the DAS 10 (FIG. 1) is configured to operate. For example, the portion of each transmitter circuit 40 on the remote antenna unit 14 may upshift the respective DAC output signal using a different carrier frequency within the same frequency band. The power amplifier 58 is configured to amplify the modulated carrier signal to generate a transmit signal and to drive one or more antennas of the antenna array 42 with the transmit signal. It is noted that the digital baseband information signal may itself include, or be modulated with, one or more carrier signals; therefore, the carrier signal that the frequency upshifting circuitry 56 may use to upshift the DAC output signal (hereinafter called an upshift carrier signal) would be in addition to such other one or more carrier signals. Furthermore, the circuitry for transmitting a downlink signal may be entirely included on the remote antenna unit 14 as the transmitter circuit 40, or may be included on both the remote antenna unit and the base station 12 or the master unit 18 (FIG. 1). Therefore, the transmitter circuit 40 may include the entire transmit circuitry, or may include only a portion of the transmit circuitry. In a related embodiment, the transmitter circuit 40 implements a DAC with digital up-conversion (DUC). In such an embodiment, a digital up converter (not shown in FIG. 2) is located on the input side of the DAC 54, receives a baseband IQ stream, digitally up converts (up shifts) the IQ stream to a higher frequency band, and provides the upshifted IQ stream to the DAC 54, which converts the upshifted IQ stream from a digital signal to an analog signal.

The antenna array 42 includes one or more antennas 60, each of which is configured to operate as both a transmit antenna and a receive antenna (other embodiments, such as one or more embodiments described below, can include one or more transmit antennas configured for transmitting only and one or more receive antennas configured for receiving only). For example, the antenna array 42 may be a multiple-input-multiple-output (MIMO) antenna array that includes two or more antennas 60. Alternatively, the antenna array 42 may include only a single antenna 60. In operation during a transmit mode, each antenna 60 of the array 42 is configured to convert a transmit signal from a respective transmitter circuit 40 into a respective downlink signal; that is, in response to being excited by a transmit signal, each antenna radiates a respective downlink signal to, for example, user equipment 22 of FIG. 1. Where the antenna array 42 is a MIMO array, the combination of signals radiated by the antennas 60 of the array may be considered a single downlink signal although, as described below, each MIMO component transmit signal is considered separately for purposes of interference cancellation. In operation during a receive mode, each antenna 60 of the array 42 receives an uplink signal, for example from a user equipment 22 of FIG. 1, and converts the uplink signal into a respective receive signal. Where the antenna array 42 is a MIMO array, the combination of signal components received by the antennas 60 of the array may be considered a single uplink signal although, as described below, each MIMO component receive signal is processed by a respective receiver circuit and is considered separately for purposes of interference cancellation.

The transmitter-receiver isolation circuit 44 is configured to reduce, in a receive signal from an antenna 60 of the antenna array 42, interference caused by a transmit signal from the transmitter circuit 40, particularly where the transmit signal and receive signal are simultaneous, or otherwise overlap in time. Because the transmit-signal path along which the transmit signal propagates from the transmitter circuit 40 to the antenna array 42 may overlap, at least partially, with the receive-signal path along which the receive signal propagates from the antenna array to the corresponding receiver circuit 52, a portion, or component, of the transmit signal may "leak" into the receive signal. And because the transmit signal is typically significantly more powerful than the receive signal, even with a small amount of such leakage the transmit signal may "swamp" the receive signal at the receiver circuit 52. To limit such leakage to a level that is acceptable for the application, the transmitter-receiver isolation circuit 44 is configured to electrically isolate the receiver circuit 52 from the transmitter circuit 40. For example, the transmitter-receiver isolation circuit 44 may provide, for example, approximately 10 dB-20 dB more isolation than a conventional isolation circuit (for example, a circulator). Furthermore, one or more parameters of the transmitter-receiver isolation circuit 44 may be tunable by the digital interference-cancellation circuit 50, particularly when the transmitter-receiver isolation circuit and the digital interference-cancellation circuit are part of a closed feedback-control loop that operates to reduce, to a lowest-achievable level, transmitter interference in the receive signal. Additional embodiments of the transmitter-receiver isolation circuit 44 are described in detail below in conjunction with FIGS. 7-16.

The analog interference-cancellation circuit 46 is configured to reduce further, in a corresponding receive signal to the receiver circuit 52, interference from a transmit signal coupled to the same antenna 60 that is configured to generate the receive signal. That is, the transmitter-receiver isolation circuit 44 and the analog interference-cancellation circuit 46 together can reduce the transmit interference in the receive signal to a level that is lower than the level of interference reduction that either of the two circuits 44 and 46 can provide alone.

The analog interference-cancellation circuit 46 can be configured to provide a first-order correction to the receive signal by removing, or otherwise cancelling, from the receive signal a component of the transmit signal that the transmitter-receiver isolation circuit 44 allows to leak into the receive signal. The analog interference-cancellation circuit 46 may perform such first-order correction by generating, as an analog correction signal, an estimated first-order representation of the leaked component of the transmit signal as it appears at the corresponding receiver circuit 52, and by providing the analog correction signal to the receiver circuit 52, which is configured to reduce the transmit interference by combining the correction signal with the receive signal. For example, the receiver circuit 52 can be configured to subtract the analog correction signal from the receive signal to remove, or otherwise to cancel, from the received signal some or all of the leaked component of transmit signal. Alternatively, the analog interference-cancellation circuit 46 can be configured to correct for other than leakage of the transmit signal into the receive signal. For example, if the impedance of the corresponding antenna 60 of the antenna array 42 is not well-matched to the effective output impedance of the transmit-receiver isolation circuit 44, then this impedance mismatch may cause the antenna 60 to redirect a portion of the transmit signal, and, therefore, to superimpose, onto the receive signal, the redirected portion of the transmit signal. Furthermore, a portion of the downlink signal radiated by the antenna 60 of the array 42 in response to the transmit signal may reflect from objects external to the remote antenna unit 14 back to the antenna 60. The analog interference-cancellation circuit 46, therefore, can be configured to generate the first-order analog correction signal also to account for the redirected portion of the transmit signal and the redirected portion of the downlink signal superimposed on the receive signal at the antenna 60. Moreover, the analog interference-cancellation circuit 46 can include, or can be part of, one or more control loops configured to reduce transmit interference in the receive signal to a lowest-achievable value. The analog interference-cancellation circuit 46 is further described below in conjunction with FIGS. 3-6 and 17-19.

The control circuit 48 is configured to control operation of the analog and digital interference-cancellation circuits 46 and 50, and also can be configured to control operation of one or more other circuits onboard the remote antenna unit 14. For example, the control circuit 48 can be, or can include, one or more microprocessors or microcontrollers. Furthermore, the control circuit 48 may implement part or all of one or both of the analog and digital interference-cancellation circuits 46 and 50. For example, the control circuit 48 can be, can include, or can be disposed on or implemented by a digital signal processor (DSP) or field-programmable gate array (FPGA) that is configured to implement the digital interference-cancellation circuit 50.

The digital interference-cancellation circuit 50 is configured to reduce further, in a corresponding receive signal to the receiver circuit 52, interference from a transmit signal coupled to the antenna 60 that is configured to generate the receive signal. That is, the transmitter-receiver isolation circuit 44, the analog interference-cancellation circuit 46, and the digital interference-cancellation circuit 50 together can reduce the level of transmit interference in the receive signal more than can either of the three circuits 44, 46, and 50 alone.

The digital interference-cancellation circuit 50 can be configured to provide a first-order linear correction, and a non-linear correction, to the receive signal by removing, or otherwise cancelling, from the receive signal a component of the transmit signal that the transmitter-receiver isolation circuit 44 allows to leak into the receive signal.

The digital interference-cancellation circuit 50 can be configured to perform such first-order linear correction by generating, as a digital correction signal, an estimated first-order linear representation of the leaked component of the transmit signal as the component appears at the corresponding receiver circuit 52, and by providing the digital correction signal to the receiver circuit, which is configured to reduce the transmit interference by combining the correction signal with the receive signal. For example, the receiver circuit 52 can be configured to subtract the digital correction signal from the analog-corrected and digitized receive signal to remove, from the receive signal, some or all of the leaked component of the transmit signal that "gets through" the isolation circuit 44 and that "gets by" the analog interference-cancellation circuit 46. Alternatively, the digital interference-cancellation circuit 50 can be configured to correct for other than leakage of the transmit signal into the receive signal. For example, the digital interference-cancellation circuit 50 can be configured to generate the first-order digital correction signal also to account for the redirected portion of the transmit signal, and for the redirected portion of the downlink signal, superimposed on the receive signal at the antenna 60 as described above in conjunction with the analog interference-cancellation circuit 46.

The digital interference-cancellation circuit 50 also can be configured to perform non-linear correction by generating, as part of the digital correction signal, an estimated representation of the non-linear leaked components of the transmit signal as they appear at the corresponding receiver circuit 52. For example, one or more of the DAC 54, the frequency upshifting circuitry 56, and the power amplifier 58 of the transmitter circuit 40 may introduce, to the transmit signal, non-linear components, such as harmonic distortion. Such non-linear components often give rise to a "skirt" signal that manifests as frequency side bands that "skirt" the transmit signal and corresponding downlink signal.

The digital interference-cancellation circuit 50 can be configured to perform non-linear correction by generating, as part of the digital correction signal, an estimated representation of non-linear components that the receiver circuit 52 may introduce into the receive signal. For example, one or more of low-noise amplifier 64, frequency downshifting circuitry 66, and an analog-to-digital converter (ADC) 68, of the receiver circuit 52 may introduce to the receive signal non-linear components, such as harmonic distortion. Such non-linear components may combine with the non-linear components of the transmit signal to form, at the output of the receiver ADC, the skirt signal described above.

Each receiver circuit 52 located on the remote antenna unit 14 is configured to condition a receive signal from a respective antenna 60 of the antenna array 42, and to provide the conditioned receive signal to signal-processing circuitry on the remote antenna unit 14, which signal-processing circuitry is configured to provide the processed receive signal to a base station 12 (FIG. 1) of the DAS 10. The receiver circuit 52 includes a first signal combiner 62, for example, a summer, a low-noise amplifier (LNA) 64, frequency downshifting circuitry 66, an ADC 68, and a second signal combiner 70, for example, a summer. The signal combiner 62 is configured to combine the analog correction signal from the analog interference-cancellation circuit 46 with the receive signal from the respective antenna 60 of the antenna array 42; for example, the signal combiner 62 is a summer configured to subtract the analog cancellation signal from the receive signal. The LNA 64 is configured to amplify the once-corrected receive signal, and the frequency downshifting circuitry 66 is configured to downshift the once-corrected receive signal to a base-band frequency range. The ADC 68 is configured to convert the analog baseband receive signal into a digital baseband receive signal, and the combiner 70 is configured to combine the digital correction signal from the digital interference-cancellation circuit 50 with the once-corrected digital receive signal; for example, the combiner 70 is a summer that is configured to subtract the digital correction signal from the once-corrected digital receive signal to generate a twice-corrected digital receive signal. And signal-processing circuitry onboard the remote antenna unit 14 or elsewhere (e.g., the master unit 18, a base station 12 of FIG. 1) is configured to convert the twice-corrected digital receive signal into a number of modulated subcarriers from which the signal-processing circuitry is configured to recover the data carried by the received signal. The signal-processing circuitry may include error-correction circuitry, and other circuitry, to effect the data recovery. Furthermore, the circuitry for receiving an uplink signal may be entirely included on the remote antenna unit 14 as the receiver circuit 52 or may be included on both the remote antenna unit 14 and the base station 12 or the master unit 18 (FIG. 1). Therefore, the receiver circuit 52 may include the receive circuitry in its entirety or may include only a portion of the receive circuitry.

Still referring to FIG. 2, operation of the remote antenna unit 14 is described, according to an embodiment in which the remote antenna unit transmits a downlink signal with an antenna 60 at the same time that the remote antenna unit 14 receives an uplink signal with the same antenna 60.

A base station 12 (FIG. 1) sends a signal to signal-processing circuitry (not shown in FIGS. 1-2) onboard the master unit 18 or the remote antenna unit 14, and the signal-processing circuitry modulates one or more baseband carrier frequencies with data in the digital domain, and generates, from the modulated one or more carrier frequencies, a digital time-domain signal. For example, the signal-processing circuitry may use sixteen or sixty-four quadrature amplitude modulation (16-QAM, 64-QAM) to modulate the baseband carriers. Alternatively, the base station 12 performs this modulation.

Then, the DAC 54 converts the digital time-domain signal from the signal-processing circuitry into an analog time-domain signal.

Next, the frequency upshifting circuitry 56 upshifts, in frequency, the analog time-domain signal to the broadcast frequency band (for example, 3.4 GHz-3.8 GHz) for which the remote antenna unit 14 is configured. The frequency upshifting circuitry 56 may perform this frequency upshifting in any suitable manner, such as by modulating a carrier signal with the analog time-domain signal.

Then, the power amplifier 58 amplifies the frequency-upshifted analog time-domain signal (for example, amplifies the modulated carrier signal) to generate the transmit signal.

Next, the transmit-receiver isolation circuit 44 couples the transmit signal to the antenna 60 while reducing the magnitude of a component of the transmit signal that "leaks" into the receiver circuit 52.

Then, in response to being excited by the transmit signal, the antenna 60 radiates a downlink signal that includes the data in the transmit signal.

While the antenna 60 is radiating the downlink signal, the control circuit 48 controls the analog and digital interference-cancellation circuits 46 and 50 to generate, respectively, an analog correction signal and a digital correction signal. The analog interference-cancellation circuit 46 generates the analog correction signal from, or otherwise in response to, the transmit signal, and the digital interference-cancellation circuit 50 generates the digital correction signal from, or otherwise in response to, the digital time-domain signal from the signal-processing circuitry. Furthermore, the control circuit 48 may control the digital interference-cancellation circuit 50 to generate an adjustment signal that causes the transmitter-receiver isolation circuit 44 to reduce leakage of the transmit signal to the receiver circuit 52 to a lowest-achievable level. For example, the digital interference-cancellation circuit 50 may be coupled to the receiver circuit 52 in a control-loop configuration, may monitor a level of the transmit leakage component in the receive signal or in a signal derived therefrom, may dither the adjustment signal to determine the lowest achievable level of transmit-signal leakage in the receive signal or in a signal derived therefrom, and then may set a value of the adjustment signal to maintain the level of transmit-signal leakage at or near the determined lowest achievable level.

The antenna 60 also receives an uplink signal while radiating the downlink signal and converts the uplink signal into a receive signal.

The signal combiner 62 combines the analog correction signal with the receive signal to generate a once-corrected receive signal. For example, if the signal combiner 62 is a summer, then the signal combiner 62 subtracts the analog correction signal from the receive signal to generate the once-corrected receive signal.

The low-noise amplifier 64 amplifies the once-corrected receive signal, and the frequency downshifting circuitry 66 frequency shifts (for example, demodulates) the once-corrected receive signal down to an analog time-domain receive signal.

The ADC 68 converts the analog time-domain receive signal into a digital time-domain receive signal.

The signal combiner 70 combines the digital correction signal with the digital time-domain receive signal to generate a twice-corrected digital time-domain receive signal. For example, if the signal combiner 70 is a summer, then the signal combiner 70 subtracts the digital correction signal from the digital time-domain receive signal to generate a twice-corrected digital time-domain receive signal.

The signal-processing circuitry (not shown in FIG. 2) decomposes the twice-corrected digital time-domain receive signal into its data-modulated frequency components, and recovers, from the data-modulated frequency components, the data carried by the uplink signal.

The reduction of the first-order linear transmit interference and the non-linear transmit interference in the data-modulated frequency components, as afforded by the transmitter-receiver isolation circuit 44 and the analog and digital interference-cancellation circuits 46 and 50, typically allows the signal-processing circuitry (not shown in FIG. 2) to recover the data more accurately than the signal-processing circuitry would were the isolation circuit and the interference-cancellation circuits omitted from the remote antenna unit 14.

Still referring to FIG. 2, alternate embodiments of the remote antenna unit 14 are contemplated. For example, one or two of the transmitter-receiver isolation circuit 44, the analog interference-cancellation circuit 46, and the digital interference-cancellation circuit 50 can be omitted from the remote antenna unit 14. Furthermore, the control circuit 48 may include, or otherwise implement, the digital interference-cancellation circuit 50; for example, the control circuit 48 may be a microprocessor, microcontroller, FPGA, or a combination or subcombination of a microprocessor, microcontroller, and FPGA, configured to implement the function and operation of the digital interference-cancellation circuit 50. Moreover, the analog and digital interference-cancellation circuits 46 and 50 may incorporate circuitry, or implement techniques, disclosed in one or more of the following references, which are incorporated herein by reference: U.S. Patent Publication 2017/0170903 to Jain et al., U.S. Pat. No. 9,698,861 to Braithwaite, U.S. Pat. No. 10,020,837 to Braithwaite, Full Duplex Radios, Bharadia et al. (2013), and IEEE 802.11-18/0191r0. In addition, each of the analog and digital interference-cancellation circuits 46 and 50 may incorporate circuitry that is a modified version of circuitry disclosed in one or more of the aforementioned references, and may implement one or more techniques that are each a modified version of a technique disclosed in one or more of the aforementioned references. Furthermore, the portion of the transmitter circuit 40 located on the remote antenna unit 14 may be modified from what is described. For example, the frequency upshifting circuitry 56 may be omitted, and the base station 12, master unit 18, or transmitter circuit 40 may perform all frequency upshifting before the DAC 54, which is configured to generate, and to provide to the power amplifier 58, the frequency-upshifted analog time-domain signal. Or, the DAC 54 may be configured to perform some or all of the frequency upshifting of the analog time-domain signal. For example, the DAC 54 and frequency upshifting circuitry 56 may be combined into a DAC frequency-upshifting circuit. Moreover, the portion of the receiver circuit 52 located on the remote antenna unit 14 may be modified from what is described. For example, the frequency downshifting circuitry 66 may be omitted, and the ADC 68, the base station 12, master unit 18, or a combination or subcombination thereof, may perform all frequency downshifting of the signal from the low-noise amplifier 64 to generate a downshifted digital receive signal. For example, the ADC 68 and frequency downshifting circuitry 66 may be combined into an ADC frequency-downshifting circuit. In addition, the topologies (for example, the order of serially coupled components) of the portions of the transmitter circuit 40 and the receiver circuit 52 located on the remote antenna unit 14 can be arranged in any suitable configuration. Furthermore, in the receiver circuit 52, the LNA 64 can be located between the transmitter-receiver isolation circuit 44 and the signal combiner 62 instead of being located between the summer and the frequency downshifting circuitry 66, there can be multiple serially coupled LNAs, and other circuit topologies are contemplated. Moreover, although described as operating in open-loop mode, the analog interference-cancellation circuit 46 can operate in a closed-loop mode, or in both an open-loop and a closed-loop mode, even having one or more simultaneously functioning open loops and closed loops. Similarly, although described as operating in open-loop and closed-loop modes, the digital interference-cancellation circuit 50 can operate in only one or more closed-loop modes or in only one or more open-loop modes. In addition, embodiments described above in conjunction with FIG. 1 or below in conjunction with FIGS. 3-19 may be applicable to the remote antenna unit 14 of FIG. 2.

Figure 3:
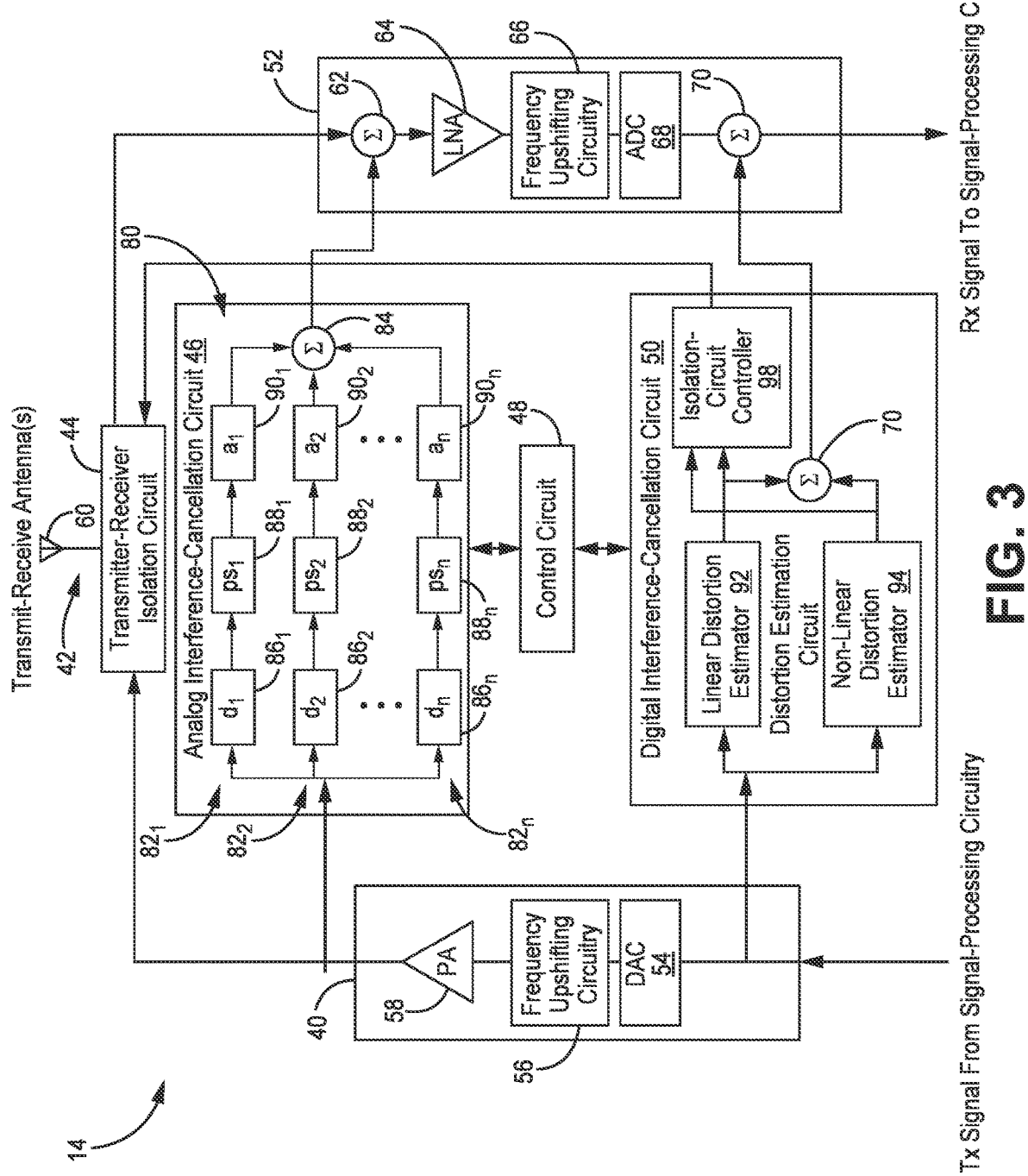
FIG. 3 is a diagram of a portion of a remote antenna unit of FIG. 1, where the portion includes circuitry configured to reduce, in a receive signal from an antenna, interference caused by a simultaneous transmit signal to the same antenna, according to an embodiment.

FIG. 3 is a diagram of the remote antenna unit 14 of FIG. 1, and of the analog and digital interference-cancellation circuits 46 and 50, according to an embodiment. In FIG. 3, like numbers reference items common to FIGS. 1-3.

In the example shown in FIG. 3, the analog interference-cancellation circuit 46 includes a finite-impulse-response (FIR) filter 80, which includes one or more filter paths $82_1$-$82_n$, and a signal combiner 84, for example, a summer.

Each filter path 82 includes a respective delay circuit 86, a respective phase-shift circuit 88, and a respective gain circuit 90. The respective delay d that each delay circuit 86 is configured to apply to the transmit signal can be determined and set ahead of time in response to any suitable calculation algorithm or during a calibration procedure that takes place while the remote antenna unit 14 is not being used to transmit or to receive downlink and uplink signals. Alternatively, the respective delay d can be dynamically adjusted by one or more control loops onboard the remote antenna unit 14. Similarly, the respective phase shift ps and the respective gain a that each phase-shift circuit 88 and gain circuit 90 is respectively configured to impart to the delayed transmit signal can be determined and set ahead of time in response to any respective suitable calculation algorithm or during a respective calibration procedure that takes place while the remote antenna unit 14 is not being used to transmit or receive downlink and uplink signals. Alternatively, each of the phase shifts ps and respective gains a may be dynamically adjusted by one or more control loops onboard the remote antenna unit 14. Furthermore, the respective gain a of each amplifier 90 can be less than, equal to, or greater than, one.

The signal combiner 84 is configured to generate the analog correction signal in response to the output signals from the paths $82_1$-$82_n$. For example, where the signal combiner 84 is a summer, then the signal combiner 84 is configured to generate the analog correction signal equal to the sum of the output signals from the paths $82_1$-$82_n$.

Still referring to FIG. 3, the digital interference-cancellation circuit 50 includes a linear-distortion estimator circuit 92, a non-linear-distortion estimator circuit 94, a signal combiner 96, and an isolation-circuit controller 98.

The linear-distortion estimator circuit 92 is configured to generate a first-order-linear correction signal in response to the digital time-domain signal from the signal-processing circuitry, and the non-linear-distortion estimator circuit 94 is configured to generate a non-linear correction signal in response to the same digital time-domain signal.

The signal combiner 96 is configured to generate the digital correction signal in response to the first-order-linear and non-linear correction signals; for example, where the signal combiner 96 is a summer, then the signal combiner 96 is configured to generate the digital correction signal equal to the sum of the first-order-linear and non-linear correction signals.

The isolation-circuit controller 98 is configured to generate, in response to the first-order-linear and non-linear correction signals, a control signal for adjusting one or more isolation characteristics or parameters of the transmitter-receiver isolation circuit 44.

Still referring to FIG. 3, operation of the remote antenna unit 14 is described, according to an embodiment in which the remote antenna unit 14 transmits a downlink signal with an antenna 60 at the same time that the remote antenna unit 14 receives an uplink signal with the same antenna 60.

The remote antenna unit 14 operates as described above in conjunction with FIG. 2 and performs the following operations in addition to the operations described above in conjunction with FIG. 2, or in place of one or more of the operations described above in conjunction with FIG. 2.

The analog interference-cancellation circuit 46 operates as follows.

Each delay circuit 86 imparts a respective delay d to the transmit signal from the transmitter circuit 40.

Each phase-shift circuit 88 imparts a respective phase shift ps to the delayed transmit signal from the respective delay circuit 86 in the same path 82.

Each gain circuit 90 amplifies or attenuates, by a respective gain a, the phase-shifted-and-delayed transmit signal from the respective phase-shift circuit 88.

The signal combiner 84 generates the analog correction signal in response to the amplified or attenuated, phase-shifted, and delayed versions of the transmit signal output from the amplifiers $90_1$-$90_n$. For example, where the signal combiner 84 is a summer, then the signal combiner 84 generates the digital correction signal equal to the sum of the amplified or attenuated, phase-shifted, and delayed versions of the transmit signal output from the amplifiers $90_1$-$90_n$.

The digital interference-cancellation circuit 50 operates as follows.

The linear-distortion estimator circuit 92 generates a linear correction signal in response to the digital time-domain signal from the signal-processing circuitry, which is not shown in FIG. 3 but is onboard or offboard the remote antenna unit 14.

The non-linear-distortion estimator circuit 94 generates a non-linear correction signal in response to the digital time-domain signal.

The signal combiner 96 generates the digital correction signal in response to the linear and non-linear correction signals from the estimator circuits 92 and 94, respectively. For example, if the signal combiner 96 is a summer, then the signal combiner 96 generates the digital correction signal equal to the sum of the linear and non-linear correction signals.

Furthermore, the isolation-circuit controller 98 generates, in response to the first-order-linear and non-linear correction signals, a control signal for adjusting one or more isolation characteristics or parameters of the transmitter-receiver isolation circuit 44. For example, the controller 98 can dither the control signal to determine, and to maintain the transmitter-receiver isolation circuit 44 operating, at a point at which the transmitter-receiver isolation circuit 44 achieves the highest level of isolation between the transmitter circuit 40 and the receiver circuit 52, and, therefore, achieves the lowest level of leakage of the transmit signal into the receive signal.

Still referring to FIG. 3, alternate embodiments of the remote antenna unit 14 are contemplated. For example, each of one or more of the paths 82 of the analog interference-cancellation circuit 46 may lack a phase shifter 88. Furthermore, the digital interference-cancellation circuit 50 may lack the isolation-circuit controller 98. Moreover, the analog interference-cancellation circuit 46 may include circuitry such as disclosed in Full Duplex Radios, Bharadia et al., which is incorporated herein by reference, or may include the disclosed circuitry modified for inclusion in a remote antenna unit 14 configured to operate in a TDD mode. Similarly, the digital interference-cancellation circuit 50 may include circuitry disclosed in Full Duplex Radios, Bharadia et al., or may include the disclosed circuitry modified for inclusion in a remote antenna unit 14 configured to operate in a TDD mode. In addition, circuitry on the remote antenna unit 14 can notify one or more base stations 12 (FIG. 1) that the transmitter circuit 40 is generating a transmit signal while the antenna 60 is receiving an uplink signal so that the one or more base stations 12 can coordinate the transmitter circuit's generation of the transmit signal so that it does not coincide with the antenna 60 receiving an uplink signal. Moreover, embodiments described above in conjunction with FIGS. 1-2 or below in conjunction with FIGS. 4-19 may be applicable to the remote antenna unit 14 of FIG. 3.

Figure 4:
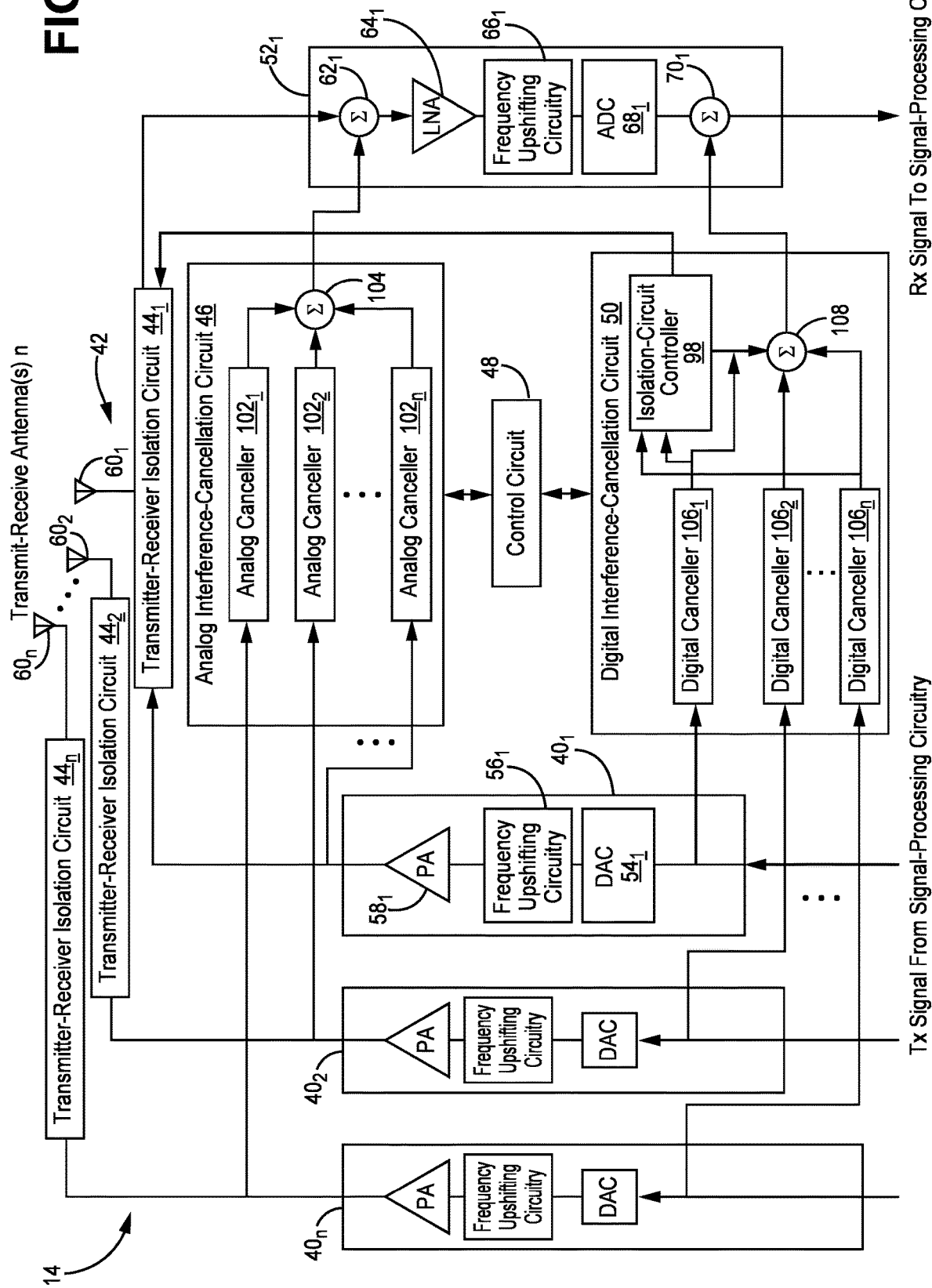
FIG. 4 is a diagram of a portion of a remote antenna unit of FIG. 1, where the portion includes circuitry configured to reduce, in a receive signal from an antenna, interference caused by a simultaneous transmit signal to the same antenna, and interference caused by one or more downlink signals from one or more other antennas on the same remote antenna unit, according to an embodiment.

FIG. 4 is a diagram of the remote antenna unit 14 of FIG. 1, according to an embodiment in which the remote antenna unit 14 is configured to reduce, in a receive signal generated by an antenna $60_1$ of the antenna array 42, transmit interference from one or more other antennas $60_2$-$60_n$ of the same antenna array. In FIG. 4, like numbers reference items common to FIGS. 1-4.

In addition to the transmitter circuit $40_1$, which is similar to the transmitter circuit 40 of FIGS. 2-3, the remote antenna unit 14 includes one or more other transmitter circuits $40_2$-$40_n$, which are each coupled to a respective antenna $60_2$-$60_n$ of the antenna array 42, but which are otherwise similar to the transmitter circuit $40_1$.

In addition to the transmitter-receiver isolation circuit $44_1$, which is similar to the transmitter-receiver isolation circuit 44 of FIGS. 2-3, the remote antenna unit 14 includes one or more other transmitter-receiver isolation circuits $44_2$-$44_n$, which are each coupled between a respective one of the transmitter circuits $40_2$-$40_n$ and a respective one of the antennas $60_2$-$60_n$, but which are otherwise similar to the transmitter-receiver isolation circuit $44_1$.

And in addition to the receiver circuit $52_1$, which is similar to the receiver circuit 52 of FIGS. 2-3, the remote antenna unit 14 includes one or more other receiver circuits $52_2$-$52_n$ (not shown in FIG. 4), which are each coupled to a respective one of the other antenna $60_2$-$60_n$ of the antenna array 42, but which are otherwise similar to the receiver circuit $52_1$.

If the antenna $60_1$ is receiving an uplink signal at the same time that one or more of the other antennas $60_2$-$60_n$ are radiating respective downlink signals, because a downlink signal is typically much more powerful than the uplink signal, the one or more downlink signals will "swamp" the uplink signal such that the receive signal generated by the antenna $60_1$ will include transmit interference that is much more powerful than the component of the receive signal corresponding to the received uplink signal.

Therefore, the analog interference-cancellation circuit 46 is not only configured to reduce, in the receive signal from the antenna $60_1$, transmit interference from the transmit signal generated by the transmitter circuit $40_1$, but is also configured to reduce transmit interference from the downlink signals transmitted by the one or more other antennas $60_2$-$60_n$. The analog interference-cancellation circuit 46, therefore, includes a respective analog canceller circuit $102_1$-$102_n$ for each transmitter circuit $40_1$-$40_n$; for example, each analog canceller circuit may be the same as the FIR filter 80 of FIG. 3. Each analog canceller circuit $102_1$-$102_n$ is configured to generate a respective component of the analog correction signal, and a signal combiner 104 is configured to generate the analog correction signal in response to the components. For example, if the signal combiner 104 is a summer, then the signal combiner 104 generates the analog correction signal equal to the sum of the component signals from the analog canceller circuits $102_1$-$102_n$.

Similarly, the digital interference-cancellation circuit 50 is not only configured to reduce, in the receive signal from the antenna $60_1$, transmit interference from the transmit signal generated by the transmitter circuit $40_1$, but is also configured to reduce transmit interference from the downlink signals transmitted by the one or more other antennas $60_2$-$60_n$ in the same antenna array 42 to which the antenna $60_1$ belongs. The digital interference-cancellation circuit 50, therefore, includes a respective digital canceller circuit $106_1$-$106_n$ for each transmitter circuit $40_1$-$40_n$; for example, each digital canceller circuit may include a respective linear-distortion estimator circuit 92, a respective non-linear-distortion estimator circuit 94, and a respective signal combiner 96 arranged as shown in FIG. 3. Each digital canceller circuit 106 is configured to generate a respective component of the digital correction signal, and a signal combiner 108 is configured to generate the digital correction signal in response to the components. For example, if the signal combiner 108 is a summer, then the signal combiner 108 generates the digital correction signal equal to the sum of the component signals from the digital canceller circuits $106_1$-$106_n$. Furthermore, the isolation-circuit controller 98 generates the control signal to the transmitter-receiver isolation circuit $44_1$ in response to either the component signals from the digital canceller circuits $106_1$-$106_n$, or from the signals output by the respective linear and non-linear-distortion estimator circuits 92 and 94 of each of the digital canceller circuits.

Still referring to FIG. 4, operation of the remote antenna unit 14 while each of one or more of the transmitter circuits $40_1$-$40_n$ generates a respective transmit signal at the same time that the antenna $60_1$ receives an uplink signal is similar to the operation described above in conjunction with FIG. 2, and also can be similar to the operation described above in conjunction with FIG. 3, with the following operations added, or with one or more of the following operations replacing one or more operations described above in conjunction with FIGS. 2-3.

The analog interference-cancellation circuit 46 generates the analog correction signal in response to each of the one or more transmit signals generated by a respective one of the transmitter circuits $40_1$-$40_n$.

The digital interference-cancellation circuit 50 generates the digital correction signal, and the isolation control signal, in response to the one or more digital time-domain signals respectively generated by the signal-processing circuitry.

Although not shown, in some examples, the analog interference-cancellation circuit 46 includes a respective set of analog canceller circuits 102 for each of the other receiver circuits $52_2$-$52_n$, where each set of analog canceller circuits is similar in topology and operation to the set of analog canceller circuits $102_1$-$102_n$. In other examples, the analog correction signal from the signal combiner 104 can be provided to each respective receiver circuit 52.

Similarly, although not shown, in some examples, the digital interference-cancellation circuit 50 includes a respective set of digital canceller circuits 106 for each of the other receiver circuits $52_2$-$52_n$, where each set of digital canceller circuits is similar in topology and operation to the set of digital canceller circuits $106_1$-$106_n$. In other examples, the digital correction signal from the signal combiner 108 can be provided to each respective receiver circuit 52.

Although not shown, in some examples, the digital interference-cancellation circuit 50 includes a respective isolation-circuit controller 98 for each of the other transmitter-receiver isolation circuits $44_2$-$44_n$, where each isolation-circuit controller is similar in topology and operation to the isolation-circuit controller 98. In other examples, the control signal from an isolation-circuit controller 98 can be provided to multiple transmitter-receiver isolation circuits 44.

Still referring to FIG. 4, in an alternate embodiment, instead of, or in addition to, reducing transmit-interference in the receive signal, the remote antenna unit 14 includes circuitry that is configured to detect that each of one or more of the transmitter circuits $40_1$-$40_n$ is generating a respective transmit signal while each of one or more receiver circuits 52 is receiving a receive signal, and is configured to take a corresponding action in response to such detection. Said another way, the remote antenna unit 14 includes circuitry that is configured to detect that each of one or more of the antennas $60_1$-$60_n$ is transmitting a respective downlink signal while at least one of the antennas is also receiving an uplink signal. For example, the remote antenna unit 14 can be configured to send a notification to one or more of the base stations 12 (FIG. 1) that the remote antenna unit 14 is experiencing simultaneous downlink transmit and uplink receive; in response to the notification, the one or more base stations 12 can coordinate transmissions of downlink signals by the remote antenna unit 14 with reception of uplink signals by the remote antenna unit 14 to reduce, or to eliminate, simultaneous transmission and reception by the remote antenna unit 14. Or, the remote antenna unit 14 can cause each of one or more of the transmitter-receiver isolation circuits $44_1$-$44_n$ to uncouple the respective transmit signal from the respective one of the antennas $60_1$-$60_n$ while each of one or more of the antennas is receiving an uplink signal. Because this latter action could cause loss of data, the remote antenna unit 14 is also configured to notify the one or more base stations 12 of the uncoupled transmit signal(s) so that the one or more base stations 12 can resend the blocked, or otherwise lost, data for retransmission.

Still referring to FIG. 4, alternate embodiments of the remote antenna unit 14 are contemplated. For example, embodiments described above in conjunction with FIGS. 1-3 or below in conjunction with FIGS. 5-19 may be applicable to the remote antenna unit 14 of FIG. 4.

Figure 5:
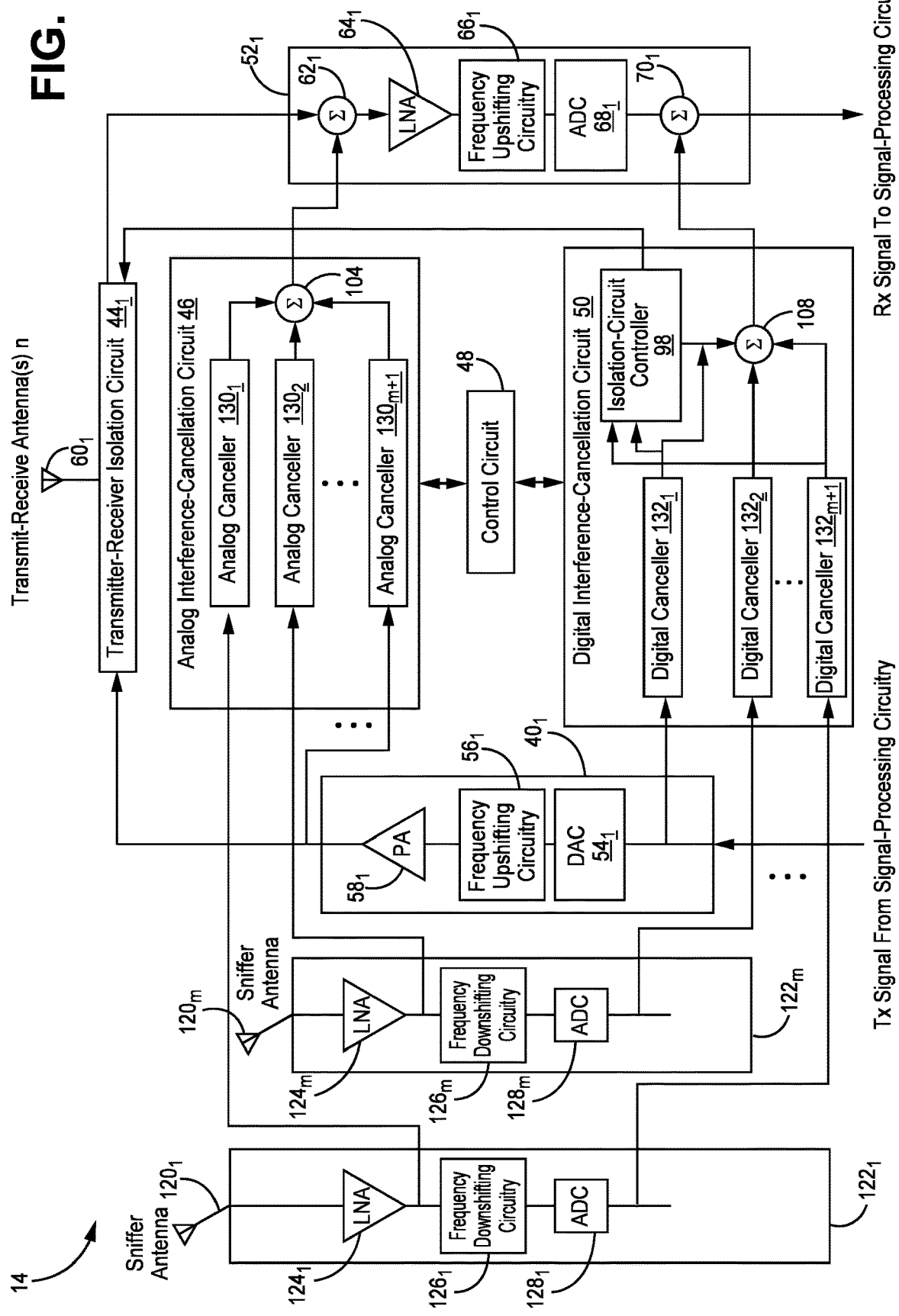
FIG. 5 is a diagram of a portion of a remote antenna unit of FIG. 1, where the portion includes circuitry configured to reduce, in a receive signal from an antenna, interference caused by a simultaneous transmit signal to the same antenna, and caused by one or more downlink signals from one or more other antennas on one or more different remote antenna units, according to an embodiment.

FIG. 5 is a diagram of the remote antenna unit 14 of FIG. 1, according to an embodiment in which the remote antenna unit is configured to reduce, in a receive signal generated by the antenna $60_1$ of the antenna array 42, transmit interference from one or more other antennas on one or more other remote antenna units. In FIG. 5, like numbers reference items common to FIGS. 1-5.

In addition to the transmitter circuit $40_1$ and the antenna $60_1$, the remote antenna unit 14 includes one or more "sniffer" antennas $120_1$-$120_m$ and one or more corresponding "sniffer" receiver circuits $122_1$-$122_m$. As described above in conjunction with FIG. 4, the remote antenna unit 14 may also include one or more other transmitter circuits $40_2$-$40_n$, one or more other transmitter-receiver isolation circuits $44_2$-$44_n$, one or more other receiver circuits $52_2$-$52_n$, and one or more other antennas $60_2$-$60_n$ (these other transmitter circuits, other transmitter-receiver isolation circuits, other receiver circuits, and other antennas are omitted from FIG. 5 for clarity).

If, while the antenna $60_1$ is receiving an uplink signal, each of one or more antennas on one or more other remote antenna units 14 (other remote antenna units 14 not shown in FIG. 5) is transmitting a respective downlink signal, because a downlink signal (even from another nearby remote antenna unit) is typically much more powerful than the uplink signal, the one or more downlink signals will "swamp" the uplink signal such that the receive signal generated by the antenna $60_1$ will include transmit interference that is much more powerful than the component of the receive signal corresponding to the received uplink signal.

Because the antennas 60 on remote antenna units 14 (not shown in FIG. 5) are typically directional at frequencies used in cellular wireless communications, each sniffer antenna $120_1$-$120_m$ can have a respective orientation that increases the effective gain of the sniffer antenna relative to a respective antenna 60 on another remote antenna unit 14. For example, an installer of the DAS 10 (FIG. 1) can orient each of the sniffer antennas $120_1$-$120_m$ in response to the location of a respective nearby other remote antenna unit 14 such that a main beam of the sniffer antenna $120_1$-$120_m$ is directed toward one or more antennas 60 on the other remote antenna unit 14.

Each sniffer antenna $120_1$-$120_m$ is configured to receive, from a respective other remote antenna unit 14 (other remote antenna units not shown in FIG. 5), one or more respective downlink signals that are interfering with the uplink signal being received by the antenna $60_1$, and to generate, in response to the received one or more downlink signals, a respective sniffer read signal.

Each sniffer receiver circuit $122_1$-$122_m$ is configured to convert the respective sniffer read signal into a corresponding amplified sniffer read signal suitable for input to the analog interference-cancellation circuit 46, and into a sniffer digital time-domain signal suitable for input to the digital interference-cancellation circuit 50. Each sniffer receiver circuit $122_1$-$122_m$ includes a respective LNA 124, a respective frequency downshifting circuit 126, and a respective ADC 128, which can be respectively similar to the LNA $64_1$, frequency downshifting circuit $66_1$, and ADC $68_1$ of the receiver circuit $52_1$; matching the LNAs $64_1$ and 124, the frequency downshifting circuits $66_1$ and 126, and the ADCs $68_1$ and 128 can increase the level of transmit-interference reduction that the digital interference-cancellation circuit 50 can provide. For example, such matching can be accomplished by locating the LNAs $64_1$ and 124, the frequency downshifting circuits $66_1$ and 126, and the ADCs $68_1$ and 128 on a same integrated-circuit die.

Therefore, the analog interference-cancellation circuit 46 is not only configured to reduce, in the receive signal from the antenna $60_1$, transmit interference from the transmit signal generated by the transmitter circuit $40_1$, but is also configured to reduce transmit interference from the one or more downlink signals transmitted by the one or more other antennas 60 on the one or more other remote antenna units 14 (other remote antenna units 14 not shown in FIG. 5). The analog interference-cancellation circuit 46, therefore, includes a respective analog canceller circuit $130_1$-$130_m$ for each sniffer receiver circuit $122_1$-$122_m$, in addition to including an analog canceller circuit $130_{m+1}$ for the transmitter circuit $40_1$. For example, each analog canceller circuit $130_1$-$130_{m+1}$ may be the same as the FIR filter 80 of FIG. 3. Each analog canceller circuit $130_1$-$130_{m+1}$ is configured to generate a respective component of the analog correction signal, and the signal combiner 104 is configured to generate the analog correction signal in response to these components. For example, if the signal combiner 104 is a summer, then the signal combiner 104 is configured to generate the analog correction signal equal to the sum of the component signals from the analog canceller circuits $130_1$-$130_{m+1}$.

Similarly, the digital interference-cancellation circuit 50 is not only configured to reduce, in the receive signal from the antenna $60_1$, transmit interference from the transmit signal generated by the transmitter circuit $40_1$, but is also configured to reduce transmit interference from the downlink signals transmitted by the one or more other antennas 60 on the one or more other remote antenna units 14 (other remote antenna units not shown in FIG. 5). The digital interference-cancellation circuit 50, therefore, includes a respective digital canceller circuit $132_1$-$132_m$ for each sniffer receiver circuit $122_1$-$122_m$, and a digital canceller circuit $132_{m+1}$ for the transmitter circuit $40_1$; for example, each digital canceller circuit $132_1$-$132_m$ may include a respective linear-distortion estimator circuit 92, a respective non-linear-distortion estimator circuit 94, and a respective signal combiner 96 arranged as shown in FIG. 3. Each digital canceller circuit $132_1$-$132_{m+1}$ is configured to generate a respective component of the digital correction signal, and the signal combiner 108 is configured to generate the digital correction signal in response to these components. For example, if the signal combiner 108 is a summer, then the signal combiner 108 is configured to generate the digital correction signal equal to the sum of the component signals from the digital canceller circuits $132_1$-$132_{m+1}$. Furthermore, the isolation-circuit controller 98 is configured to generate the control signal to the transmitter-receiver isolation circuit $44_1$ in response to either the component signals from the digital canceller circuits $132_1$-$132_{m+1}$, or from the signals output by the respective linear and non-linear-distortion estimator circuits 92 and 94 of each of the digital canceller circuits $132_1$-$132_{m+1}$.

Still referring to FIG. 5, operation of the remote antenna unit 14 while each of one or more antennas 60 on one or more other nearby remote antenna units 14 (other remote antenna units 14 not shown in FIG. 5) is radiating a respective downlink signal at the same time that the antenna $60_1$ is receiving an uplink signal is similar to the operation described above in conjunction with FIG. 2, and also can be similar to the operation described above in conjunction with FIGS. 3-4, but with the following operations in addition to the above-described operations, or in place of one or more of the above-described operations.

The analog interference-cancellation circuit 46 generates the analog correction signal in response to the transmit signal generated by the transmitter circuit $40_1$, and in response to each of the one or more amplified sniffer receive signals generated by a respective LNA 124 of each of one or more of the sniffer receiver circuits $122_1$-$122_m$.

The digital interference-cancellation circuit 50 generates the digital correction signal and the isolation control signal in response to the digital time-domain signal from the signal processing circuitry to the transmitter circuit $40_1$, and in response to each of one or more digital time-domain signals generated by a respective ADC 128 of each of one or more of the sniffer receiver circuits $122_1$-$122_m$.

Although not shown, in some examples, the analog interference-cancellation circuit 46 includes a respective set of analog canceller circuits 130 for each of the other receiver circuits $52_2$-$52_n$ (not shown in FIG. 5), where each set of analog canceller circuits can be similar in topology and operation to the set of analog canceller circuits $130_1$-$130_{m+1}$. In other examples, the analog correction signal from the signal combiner 104 can be provided to each respective receiver circuit 52.

Similarly, although not shown, the digital interference-cancellation circuit 50 includes a respective set of digital canceller circuits 132 for each of the other receiver circuits $52_2$-$52_n$ (not shown in FIG. 5) where each set of digital canceller circuits can be similar in topology and operation to the set of digital canceller circuits $132_1$-$132_{m+1}$. In other examples, the digital correction signal from the signal combiner 108 can be provided to each respective receiver circuit 52.

Although not shown, the digital interference-cancellation circuit 50 includes a respective isolation-circuit controller 98 for each of the other transmitter-receiver isolation circuits $44_2$-$44_n$ (not shown in FIG. 5), where each isolation-circuit controller is similar in topology and operation to the isolation-circuit controller 98 shown, and described above in conjunction with, FIG. 3. In other examples, the control signal from an isolation-circuit controller 98 can be provided to multiple transmitter-receiver isolation circuits 44.

Still referring to FIG. 5, in an alternate embodiment, instead of, or in addition to, reducing transmit-interference in the receive signal from the antenna $60_1$, the remote antenna unit 14 includes circuitry that is configured to detect that each of one or more of the sniffer receiver circuits $122_1$-$122_m$ is receiving a read signal from a respective one of the sniffer antennas $120_1$-$120_m$ while each of one or more of the receiver circuits $52_1$-$52_n$ is receiving a receive signal, and to take an action in response to such detection. Said another way, the remote antenna unit 14 includes circuitry that is configured to detect that each of one or more of the antennas 60 on one or more other nearby remote antenna units 14 (other remote antenna units 14 not shown in FIG. 5) is transmitting a respective downlink signal while at least one of the antennas $60_1$-$60_n$ onboard the remote antenna unit 14 is receiving an uplink signal, and to take an action in response to such detection. For example, the remote antenna unit 14 can be configured to notify one or more of the base stations 12 (FIG. 1) that the remote antenna unit 14 is experiencing simultaneous downlink transmit and uplink receive; in response to the notification, the one or more base stations 12 can coordinate transmissions of downlink signals by the other remote antenna units 14 with the reception of uplink signals by the remote antenna unit to reduce, or eliminate, simultaneous transmission and reception by multiple remote antenna units 14 in the same general location or "neighborhood." Or, the remote antenna unit 14 can cause each of one or more of the transmitter-receiver isolation circuits $44_1$-$44_n$ to uncouple the respective one of the receiver circuits $52_1$-$52_n$ from the respective one of the antennas $60_1$-$60_n$ while each of one or more of the antennas $60_1$-$60_n$ is receiving an uplink signal. Because this latter action could cause loss of uplink data from one or more of user equipment 22 (FIG. 1), the remote antenna unit 14 also could be configured to notify the one or more of the user equipment 22 of the uncoupled uplink signal(s) so that the one or more user equipment 22 can resend the blocked data to the remote antenna unit 14 (or to another remote antenna unit 14).

Still referring to FIG. 5, alternate embodiments of the remote antenna unit 14 are contemplated. For example, embodiments described above in conjunction with FIGS. 1-4 or below in conjunction with FIGS. 6-19 may be applicable to the remote antenna unit 14 of FIG. 5.

FIG. 6 is a diagram of the remote antenna unit 14 of FIG. 1, according to an embodiment in which the remote antenna unit 14 is configured to reduce, in a receive signal generated by the antenna $60_1$ of the antenna array 42, transmit interference from one or more other antennas $60_2$-$60_n$ of the antenna array, and transmit interference from one or more other antennas on one or more other remote antenna units 14 (other remote antenna units 14 not shown in FIG. 6). Therefore, in effect, the remote antenna unit 14 of FIG. 6 is a combination of the remote antenna units 14 of FIGS. 4 and 5. In FIG. 6, like numbers reference items common to FIGS. 1-6.

In addition to the transmitter circuit $40_1$, the remote antenna unit 14 includes one or more other transmitter circuits $40_2$-$40_n$ (only transmitter circuits $40_1$ and $40_n$ shown in FIG. 6), which are each coupled to a respective antenna $60_2$-$60_n$ (only antennas $60_1$ and $60_n$ shown in FIG. 6) of the antenna array 42, but which are otherwise similar to the transmitter circuit $40_1$.

Furthermore, in addition to the transmitter-receiver isolation circuit $44_1$, the remote antenna unit 14 includes one or more other transmitter-receiver isolation circuits $44_2$-$44_n$ (only transmitter-receiver isolation circuits $44_1$ and $44_n$ shown in FIG. 6), which are each coupled between a respective one of the transmitter circuits $40_2$-$40_n$ and a respective one of the antennas $60_2$-$60_n$, but which are otherwise similar to the transmitter-receiver isolation circuit $44_1$.

Moreover, the remote antenna unit 14 includes one or more "sniffer" antennas $120_1$-$120_m$ and one or more corresponding "sniffer" receiver circuits $122_1$-$122_m$ (only sniffer antenna $120_1$ and sniffer receiver circuit $122_1$ shown in FIG. 6).

And in addition to the receiver circuit $52_1$, the remote antenna unit 14 includes one or more other receiver circuits $52_2$-$52_n$ (not shown in FIG. 6), which are each coupled to a respective antenna $60_2$-$60_n$ of the antenna array 42, but which are otherwise similar to the receiver circuit $52_1$.

The analog interference-cancellation circuit 46 is not only configured to reduce, in the receive signal from the antenna $60_1$, transmit interference from the transmit signal generated by the transmitter circuit $40_1$, but is also configured to reduce transmit interference from the downlink signals simultaneously transmitted by the one or more other antennas $60_2$-$60_n$.

Furthermore, the analog interference-cancellation circuit 46 is configured to reduce transmit interference from the one or more downlink signals transmitted by the one or more other antennas 60 on one or more other remote antenna units 14 (other remote antenna units 14 not shown in FIG. 6).

The analog interference-cancellation circuit, therefore, includes a respective analog canceller circuit $140_1$-$140_{n+m}$ for each transmitter circuit $40_1$-$40_n$ and for each sniffer receiver circuit $122_1$-$122_m$. For example, each analog canceller circuit $140_1$-$140_{n+m}$ may be the same as the FIR filter 80 of FIG. 3. Each analog canceller circuit $140_1$-$140_{n+m}$ is configured to generate a respective component of the analog correction signal, and the signal combiner 104 is configured to generate the analog correction signal in response to the components. For example, if the signal combiner 104 is a summer, then the signal combiner 104 is configured to generates the analog correction signal equal to the sum of the component signals output from the analog canceller circuits $140_1$-$140_{m+n}$.

Similarly, the digital interference-cancellation circuit 50 is not only configured to reduce, in the receive signal from the antenna $60_1$, transmit interference from the transmit signal generated by the transmitter circuit $40_1$, but also is configured to reduce transmit interference from the one or more downlink signals simultaneously transmitted by the one or more other antennas $60_2$-$60_n$.

The digital interference-cancellation circuit 50 also is configured to reduce transmit interference from the one or more downlink signals transmitted by the one or more other antennas 60 on one or more other nearby remote antenna units 14 (other remote antenna units 14 not shown in FIG. 6).

The digital interference-cancellation circuit 50, therefore, includes a respective digital canceller circuit $142_1$-$142_{n+m}$ for each transmitter circuit $40_1$-$40_n$ and for each sniffer receiver circuit $122_1$-$122_m$; for example, each digital canceller circuit $142_1$-$142_{n+m}$ may include a respective linear-distortion estimator circuit 92, a respective non-linear-distortion estimator circuit 94, and a signal combiner 96 arranged as shown in FIG. 3. Each digital canceller circuit 142 is configured to generate a respective component of the digital correction signal, and the signal combiner 108 is configured to generate the digital correction signal in response to the components. For example, if the signal combiner 108 is a summer, then the signal combiner 108 is configured to generate the digital correction signal equal to the sum of the component signals from the digital canceller circuits $142_1$-$142_{n+m}$. Furthermore, the isolation-circuit controller 98 is configured to generate the control signal to the transmitter-receiver isolation circuit $44_1$ in response to either the component signals from the digital canceller circuits $142_1$-$142_{n+m}$, or from the respective linear and non-linear-distortion estimator circuits 92 and 94 from each of the digital canceller circuits $142_1$-$142_{n+m}$.

Still referring to FIG. 6, operation of the remote antenna unit 14 while each of one or more of the transmitter circuits $40_1$-$40_n$ generates a transmit signal, and while each of one or more of the antennas 60 on one or more other remote antenna units 14 radiates a respective downlink signal, at the same time that the antenna $60_1$ is receiving an uplink signal, is similar to the operation described above in conjunction with FIGS. 2-5, and further as described below.

The analog interference-cancellation circuit 46 generates the analog correction signal in response to each of the one or more transmit signals generated by a respective transmitter circuit $40_1$-$40_n$, and in response to each of the one or more sniffer receive signals generated by a respective one of the sniffer receiver circuits $122_1$-$122_m$.

The digital interference-cancellation circuit 50 generates the digital correction signal, and the isolation control signal, in response to each of the one or more digital time-domain signals that the signal-processing circuitry generates for a respective one of the transmitter circuits $40_1$-$40_n$, and in response to each of one or more digital time-domain signals generated by one or more of the ADCs $128_1$-$128_m$ of the sniffer receiver circuits $122_1$-$122_m$.

Although not shown, in some examples, the analog interference-cancellation circuit 46 includes a respective set of analog canceller circuits 140 for each of the other receiver circuits $52_2$-$52_n$ (not shown in FIG. 6) where each set of analog canceller circuits can be similar in topology and operation to the set of analog canceller circuits $140_1$-$140_{n+m}$. In other examples, the analog correction signal from the signal combiner 104 can be provided to each respective receiver circuit 52.

Similarly, although not shown, in some examples, the digital interference-cancellation circuit 50 includes a respective set of digital canceller circuits 142 for each of the other receiver circuits $52_2$-$52_n$ (not shown in FIG. 6) where each set of digital canceller circuits can be similar in topology and operation to the set of digital canceller circuits $142_1$-$142_{n+m}$.

In other examples, the digital correction signal from the signal combiner 108 can be provided to each respective receiver circuit 52.

Although not shown, in some examples, the digital interference-cancellation circuit 50 includes a respective isolation-circuit controller 98 for each of the other transmitter-receiver isolation circuits $44_2$-$44_n$, where each isolation-circuit controller is similar in topology and operation to the isolation-circuit controller 98 shown, and described in conjunction with, FIG. 3. In other examples, the control signal from an isolation-circuit controller 98 can be provided to multiple transmitter-receiver isolation circuits 44.

Still referring to FIG. 6, in an alternate embodiment, instead of, or in addition to, reducing transmit-interference in the receive signal from the antenna $60_1$, the remote antenna unit 14 includes circuitry that is configured to detect that each of one or more of the transmitter circuits $40_1$-$40_n$ is generating a respective transmit signal, and that each of one or more of the sniffer receiver circuits $122_1$-$122_m$ is receiving a read signal from a respective one of the sniffer antennas $120_1$-$120_m$, while each of one or more of the receiver circuits 52 is receiving a receive signal, and is configured to take an action in response to the detection; said another way, the remote antenna unit 14 includes circuitry that is configured to detect that each of one or more of the antennas $60_1$-$60_n$ is transmitting a respective downlink signal, and that each of one or more of the antennas 60 on one or more other remote antenna units 14 (other remote antenna units 14 not shown in FIG. 6) is transmitting a respective downlink signal, while at least one of the antennas $60_1$-$60_n$ onboard the remote antenna unit 14 is receiving an uplink signal. For example, the remote antenna unit 14 can be configured to send a notification to one or more of the base stations 12 (FIG. 1) that the remote antenna unit 14 is experiencing simultaneous downlink transmit and uplink receive; in response to the notification, the one or more base stations 12 can coordinate transmissions of downlink signals by the remote antenna unit 14 with reception of uplink signals by the remote antenna unit 14, and can coordinate transmissions of downlink signals by the other remote antenna units 14 with the reception of uplink signals by the remote antenna unit, to reduce, or to eliminate, simultaneous transmission and reception by the remote antenna unit 14 and by multiple remote antenna units 14 in the same "neighborhood." Or, the remote antenna unit 14 can cause each of one or more of the transmitter-receiver isolation circuits $44_1$-$44_n$ to uncouple the respective transmit signal from the respective one of the antennas $60_1$-$60_n$, or can cause each of one or more of the transmitter-receiver isolation circuits to uncouple the respective receiver circuits $52_1$-$52_n$ from the respective one of the antennas $60_1$-$60_n$, while each of one or more of the antennas is receiving an uplink signal. Because these latter actions could cause loss of data, the remote antenna unit 14 is also configured to notify the one or more base stations 12 of the uncoupled transmit signal(s) so that the one or more base stations 12 can resend the blocked, or otherwise lost, data for retransmission, and to notify the one or more of the user equipment 22 of the uncoupled uplink signal(s) so that the one or more user equipment 22 can resend the blocked, or otherwise lost, data to the remote antenna unit 14 (or to another remote antenna unit 14).

Still referring to FIG. 6, alternate embodiments of the remote antenna unit 14 are contemplated. For example, each antenna 60 can be configured for use by a respective operator or service provider (e.g., Verizon®, T-Mobile®, Sprint®, ATT®), which can coordinate transmission of downlink signals with reception of uplink signals to prevent simultaneous transmission and reception with a same antenna 60. Such coordination of transmission and reception can further increase the isolation between a transmitter circuit 40 and a receiver circuit 52 that share a same antenna 60, and, therefore, may allow omission of one or more of the transmitter-receiver isolation circuits 44 (and omission of the one or more isolation-circuit controllers 98). Furthermore, isolation between transmitter circuits 40 and receiver circuits 52 may be increased further by configuring all of the antennas 60 on a remote antenna unit 14 for use by a single operator or service provider, which can coordinate transmissions of downlink signals and reception of uplink signals such that no antenna transmits a downlink signal while the same or another antenna on the remote antenna unit 14 is receiving an uplink signal. Moreover, embodiments described above in conjunction with FIGS. 1-5 or below in conjunction with FIGS. 7-19 may be applicable to the remote antenna unit 14 of FIG. 6.

FIG. 7 is a diagram of the transmitter-receiver isolation circuit $44_1$ of FIGS. 2-6, according to an embodiment. It is understood that each of one or more other transmitter-receiver isolation circuits $44_2$-$44_n$ (FIG. 4) can be similar to the isolation circuit $44_1$.

The transmitter-receiver isolation circuit $44_1$ includes a single-pole-double-throw electronic switch 150.

In the coupling state shown in solid line, the switch 150 is configured to couple a respective transmitter circuit 40 to a corresponding antenna 60, and to uncouple the antenna 60 from a corresponding receiver circuit 52.

And in the coupling state shown in dashed line, the switch 150 is configured to couple a respective antenna 60 to a corresponding receiver circuit 52, and to uncouple the antenna 60 from a corresponding transmitter circuit 40.

In either of the described coupling states, the switch 150 is configured to reduce transmit interference in the receive signal that the antenna 60 generates and provides to the receiver circuit 52.

In operation, circuitry onboard the remote antenna unit 14 (FIGS. 1-6) controls the coupling state of the switch 150. For example, as described above in conjunction with FIGS. 3-6, in response to a command from one or more base stations 12 (FIG. 1), the circuitry causes the switch to uncouple a corresponding transmitter circuit 40 from the antenna 60, and to couple the antenna 60 to a corresponding receiver circuit 52, while the antenna 60 is receiving an uplink signal and converting the uplink signal to a receive signal for the receiver circuit 52. Or, in response to a command from one or more base stations 12 (FIG. 1), the circuitry causes the switch to uncouple the receiver circuit 52 from the antenna 60 while the antenna 60, or another antenna on the same, or on a different, remote antenna unit 14 is radiating a downlink signal. Alternatively, the isolation circuit controller 98 (FIGS. 3-6) controls the state of the switch 150 in response to one or more signals generated by the digital interference-cancellation circuit 50 (FIGS. 2-6).

Still referring to FIG. 7, alternate embodiments of the remote antenna unit 14 are contemplated. For example, embodiments described above in conjunction with FIGS. 1-6 or below in conjunction with FIGS. 8-19 may be applicable to the transmitter-receiver isolation circuit 44 of FIG. 7.

FIG. 8 is a diagram of the transmitter-receiver isolation circuit $44_1$ of FIGS. 2-6, according to an embodiment. It is understood that each of one or more of the other transmitter-receiver isolation circuits $44_2$-$44_n$ (FIG. 4) can be similar to the isolation circuit $44_1$.

The transmitter-receiver isolation circuit $44_1$ is configured to couple, to the antenna $60_1$ (FIGS. 2-6), a transmit signal from the transmitter circuit $40_1$ (FIGS. 2-6) and simultaneously to couple, to the receiver circuit $52_1$ (FIGS. 2-6), a receive signal from the same antenna $60_1$, while electrically isolating the receiver circuit $52_1$ from the transmitter circuit $40_1$. That is, the transmitter-receiver isolation circuit $44_1$ allows the antenna $60_1$ to radiate a downlink signal and to receive an uplink signal at the same time, while reducing, to a suitable level, interference in the receive signal caused by the transmit signal. Said another way, the transmitter-receiver isolation circuit $44_1$ is configured to isolate, electrically, the receiver circuit $52_1$ from the corresponding transmitter circuit $40_1$ while the transmitter circuit $40_1$ is providing a transmit signal to the antenna $60_1$ and the receiver circuit $52_1$ is simultaneously receiving a receive signal from the antenna $60_1$. For example, the level of such isolation that the transmitter-receiver isolation circuit $44_1$ is configured to provide can be approximately range of up to 20 dB or even more.

As described below, the transmitter-receiver isolation circuit $40_1$ is configured to provide such electrical isolation by splitting a transmit signal into multiple components, and by causing the components to constructively interfere at the antenna $60_1$, and by causing any leakage components of the transmit signal to destructively interfere at the receiver circuit $52_1$ such that ideally, no transmit-signal power is coupled to the receiver circuit $52_1$.

The transmitter-receiver isolation circuit $44_1$ includes a transmitter port 160, an antenna port 162, a receiver port 164, a first phase-shifting coupler 166, a transmitter termination impedance or load 168, a first circulator 170, a second circulator 172, a second phase-shifting coupler 174, an antenna termination impedance or load 176, a third phase-shifting coupler 178, and a receiver termination impedance or load 180.

The transmitter port 160 is configured for coupling to the transmitter circuit $40_1$ (FIGS. 2-6), the antenna port 162 is configured for coupling to the antenna $60_1$ (FIGS. 2-6), and the receiver port 164 is configured for coupling to the receiver circuit $52_1$ (FIGS. 2-6).

The first phase-shifting coupler 166 includes a first path 182 configured to shift a phase of a first component of the transmit signal input to the transmitter port 160 by a first amount (for example, −90°), a second path 184 configured to shift the phase of a second component of the transmit signal by a second amount (for example 0°), and a termination port 186 configured for coupling to the transmitter termination load 168, which can be any suitable resistive, reactive, or complex impedance circuit or device. Furthermore, the first and second paths 182 and 184 respectively generate the first and second components of the transmit signal each having approximately the same power level.

The first circulator 170 can be a conventional passive circulator, and has a first circulator port 188 coupled to the first path 182 of the first phase-shifting coupler 166, a second circulator port 190, and a third circulator port 192.

The second circulator 172 can be a conventional passive circulator or otherwise can be similar to the first circulator 170 and has a first circulator port 194 coupled to the second path 184 of the first phase-shifting coupler 166, a second circulator port 196, and a third circulator port 198.

For purposes of describing the structure and operation of the first and second circulators 170 and 172, it is assumed that the first and second circulators 170 and 172 impart, to signals, a similar attenuations and similar phase shifts such that in the operational description below, the attenuations and phase shifts imparted by the first and second circulators 170 and 172 are ignored. One way to realize, at least approximately, this assumption is to electrically match the first and second circulators 170 and 172 by, for example, forming the circulators 170 and 172 on a same integrated-circuit die.

The second phase-shifting coupler 174 includes a first path 200 configured to shift the phase of a first subcomponent of the first component of the transmit signal received from the circulator port 190 by a first amount (for example, −90°), a second path 202 configured to shift the phase of a second subcomponent of the first component of the transmit signal by a second amount (for example, 0°), and a termination port 204 configured for coupling the first path 200 to the antenna termination load 176, which can be any suitable resistive, reactive, or complex impedance circuit or device. For example, the first and second paths 200 and 202 are configured to generate the first and second subcomponents of the first component of the transmit signal such that the first subcomponent to the load 176 has little, if any, power, and the second subcomponent to the antenna port 162 has most, if not all, of the power of the first component of the transmit signal.

The second phase-shifting coupler 174 further includes a third path 206 coupled to the second circulator port 196 of the second circulator 172 and configured to shift the phase of a first subcomponent of the second component of the transmit signal by a third amount (for example, 0°), and a fourth path 208 configured to shift the phase of a second subcomponent of the second component of the transmit signal by a fourth amount (for example, −90°). For example, the third and fourth paths 206 and 208 are configured to generate the first and second subcomponents of the second component of the transmit signal such that the first subcomponent to the load 176 has little, if any, power, and the second subcomponent to the antenna port 162 has most, if not all, of the power of the second component of the transmit signal.

Moreover, the second path 202 of the second phase-shifting coupler 174 is also configured to shift a phase of a first component of the receive signal from the antenna port 162 by the second amount (for example, 0°), and the fourth path 208 is configured to shift a phase of a second component of the receive signal from the antenna port by the fourth amount (for example, −90°). Furthermore, the second and fourth paths 202 and 208 are configured to generate each of the first and second components of the receive signal having approximately a same power level.

The third phase-shifting coupler 178 includes a first path 210 coupled to the third circulator port 192 of the first circulator 170 and configured to shift the phase of a first subcomponent of the first component of the receive signal by a first amount (for example, −90°), a second path 212 configured to shift the phase of a second subcomponent of the first component of the receive signal by a second amount (for example, 0°), and a termination port 214 configured for coupling the second path 212 to the receive termination load 180, which can be any suitable resistive, reactive, or complex impedance circuit or device. Furthermore, the first and second paths 210 and 212 are configured to generate the first and second subcomponents of the first component of the receive signal such that the first subcomponent to the load 180 has little, if any, power, and the second subcomponent to the receiver port 164 has most, if not all, of the power of the first component of the receive signal.

The third phase-shifting coupler 178 further includes a third path 216 coupled to the third circulator port 198 of the second circulator 172 and configured to shift the phase of a first subcomponent of the second component of the receive signal by a third amount (for example, 0°), and a fourth path 218 configured to shift the phase of a second subcomponent of the second component of the receive signal by a fourth amount (for example, −90°). Furthermore, the third and fourth paths 216 and 218 are configured to generate the first and second subcomponents of the second component of the receive signal such that the first subcomponent to the load 180 has little, if any, power, and the second subcomponent to the receiver port 164 has most, if not all, of the power of the second component of the receive signal.

Ideally, there would be no leakage of the first component of the transmit signal from the third circulator port 192 of the first circulator 170 and no leakage of the second component of the transmit signal from the third circulator port 198 of the second circulator 172.

But in actuality such leakage may exist.

Therefore, the first path 210 of the third phase-shifting coupler 178 is configured to shift the phase of a leakage subcomponent of the first component of the transmit signal by the first amount (for example, −90°), and the third path 216 is configured to shift the phase of a leakage subcomponent of the second component of the transmit signal by the third amount (for example, 0°).

Still referring to FIG. 8, operation of the transmitter-receiver isolation circuit 44$_1$ is described according to an embodiment in which any leakage subcomponents of the transmit signal destructively interfere at the receiver port 164 to reduce, in the receive signal, interference caused by a simultaneous transmit signal to the antenna 60$_1$. Furthermore, in the following description, any losses imparted by the first, second, and third phase-shifting couplers 166, 174, and 178, and the first and second circulators 170 and 172, are ignored, any energy that the first, second, and third phase-shifting couplers 166, 174, and 178 couple to the termination loads 168, 176 and 180, respectively, is ignored, any phase shifts imparted by the circulators 170 and 172 to the signals propagating within the circulators are ignored, it is assumed that the phase-shifting couplers 166, 174, and 178 impart to signals only the phase shifts which they are configured to impart, it is assumed that the paths within the phase-shifting couplers 166, 174, and 178 divide signals input to multiple ones of the paths into signal components having equal power, and any receive-signal energy that propagates from the antenna port 162 to the transmitter port 160 is ignored.

A transmit signal of power T from the transmitter circuit 40$_1$ (FIGS. 2-6) propagates into the transmitter port 160 and to the first phase-shifting coupler 166.

A first component of the transmit signal having power T/2 propagates along the first path 182 of the first phase-shifting coupler 166, which shifts the phase of the first component by an amount such as −90°, and a second component of the transmit signal having power T/2 propagates along the second path 184, which shifts the phase of the second component by an amount such as 0°.

The first component of the transmit signal propagates from the first path 182 of the first phase-shifting coupler 166 to the first circulator port 188 of the first circulator 170, propagates from the first circulator port 188 to the second circulator port 190 of the first circulator 170, and propagates from the second circulator port 190 to the second path 202 of the second phase-shifting coupler 174.

The second component of the transmit signal propagates from the second path 184 of the first phase-shifting coupler 166 to the first circulator port 194 of the second circulator 172, propagates from the first circulator port 194 to the second circulator port 196 of the second circulator 172, and propagates from the second circulator port 196 to the third path 206 of the second phase-shifting coupler 174.

The second path 202 of the second phase-shifting coupler 174 couples a first subcomponent of the first component of the transmit signal to the antenna port 162 with a phase shift such as 0°, and the fourth path 208 of the second phase-shifting coupler 174 couples a second subcomponent of the second component of the transmit signal to the antenna port 162 with a phase shift such as −90°. The first subcomponent of the first component of the transmit signal and the second subcomponent of the second component of the transmit signal each have a signal power of approximately T/2 because the first path 200 and the third path 206 of the second phase-shifting coupler 174 each couple approximately zero energy to the termination load 176.

Because both the first subcomponent of the first component of the transmit signal and the second subcomponent of the second component of the transmit signal have approximately the same phase (for example, −90°) at the antenna port 162, these first and second subcomponents add constructively to "reconstruct," at the antenna port 162, a transmit signal having approximately a full transmit-signal power T.

In the above-described manner, the first phase-shifting coupler 166, the first and second circulators 170 and 172, and the second phase-shifting coupler 174 effectively provide, to the antenna $60_1$ (FIGS. 2-6), a reconstructed transmit signal having approximately the same power T as the transmit signal at the transmitter port 160. That is, the transmitter-receiver isolation circuit $44_1$ couples the transmit signal from the transmitter port 160 to the antenna port 162 with relatively low signal loss.

Ideally, the first circulator 170 couples no portion of the first component of the transmit signal from the first circulator port 188 to the third circulator port 192.

But in actual operation, the first circulator 170 may couple a leakage subcomponent of the first component of the transmit signal from first circulator port 188 to the third circulator port 192.

The first path 210 of the third phase-shifting coupler 178 couples the leakage subcomponent of the first component of the transmit signal to the receiver port 164 with a total phase shift such as −180° (for example, −90° from the first phase-shifting coupler 166 and another −90° from the third phase-shifting coupler 178).

Also ideally, the second circulator 172 couples no portion of the second component of the transmit signal from the first circulator port 194 to the third circulator port 198.

But in actual operation, the second circulator 172 may couple a leakage subcomponent of the second component of the transmit signal from first circulator port 194 to the third circulator port 198.

The third path 216 of the third phase-shifting coupler 178 couples the leakage subcomponent of the second component of the transmit signal to the receiver port 164 with a total phase shift such as 0° (for example, 0° from the first phase-shifting coupler 166 and another 0° from the third phase-shifting coupler 178).

Consequently, because the leakage subcomponents of the first and second components of the transmit signal have approximately opposite phases (for example, 0° and 180°) at the receiver port 164, the leakage components destructively interfere with one another such that, at least ideally, no leakage energy from the transmit signal is coupled to the receiver circuit $52_1$ (FIGS. 2-6) via the receiver port 164.

Further in operation of the transmit-receiver isolation circuit $44_1$, ideally the second phase-shifting coupler 174 receives, from the antenna $60_1$ (FIGS. 2-6) at the receiver port 162, an input receive signal having a power R.

The second path 202 of the second phase-shifting coupler 174 shifts a phase of a first component of the receive signal having a power R/2 an amount such as 0°, and the fourth path 208 of the second phase-shifting coupler 174 shifts a phase of a second component of the receive signal having a power of approximately R/2 an amount such as −90°.

The first component of the receive signal propagates from the second path 202 of the second phase-shifting coupler 174 to the second circulator port 190 of the first circulator 170, and the second component of the receive signal propagates from the fourth path 208 of the second phase-shifting coupler 174 to the second circulator port 196 of the second circulator 172.

The first component of the receive signal propagates from the second circulator port 190 to the third circulator port 192 of the first circulator 170, and from the third circulator port 192 to the first path 210 of the third phase-shifting coupler 178; the first path 210 of the third phase-shifting coupler 178 imparts, to the first component of the receive signal, a phase shift of an amount such as −90° such that at the receiver port 164, the first component of the receive signal has a total phase shift such as −90° (for example, 0° from the second phase-shifting coupler 174 and −90° from the third phase-shifting coupler 178).

The second component of the receive signal propagates from the second circulator port 196 to the third circulator port 198 of the second circulator 172, and from the third circulator port 198 to the third path 216 of the third phase-shifting coupler 178; the third path 216 imparts, to the second component of the receive signal, a phase shift of an amount such as −90° such that at the receiver port 164, the second component of the receive signal has a total phase shift such as approximately −90° (for example, −90° from the second phase-shifting coupler 174 and 0° from the third phase-shifting coupler 178).

Consequently, because both the first and second components of the receive input signal have approximately the same phase (for example, −90°) at the receiver port 164, they interfere constructively, and, therefore, effectively reconstruct the receive signal having approximately full power R, at the receiver port.

In summary, the transmitter-receiver isolation circuit $44_1$ effectively divides the transmit signal at the transmitter port 160 into multiple components that constructively interfere at the antenna port 162 such that the antenna $60_1$ radiates a reconstructed, approximately full power, transmit signal, and that destructively interfere at the receiver port 164 to reduce, in the receive signal, interference caused by a simultaneous transmit signal to the same antenna $60_1$.

Still referring to FIG. 8, alternate embodiments of the transmitter-receiver isolation circuit $44_1$ are contemplated. For example, although, in actuality, the isolation circuit $44_1$ may not be ideal, it is still able to couple the transmit signal from the transmitter circuit $40_1$ (FIGS. 2-6) to the antenna $60_1$ with a suitable level of attenuation and other distortion, and to reduce, to a suitable level, interference in the receive signal to the receiver circuit $52_1$ caused by the transmit signal. Furthermore, embodiments described above in conjunction with FIGS. 1-7 or below in conjunction with FIGS. 9-19 may be applicable to the transmitter-receiver isolation circuit $44_1$ of FIG. 8.

FIG. 9 is a plot 230 of a frequency response 232 of each circulator 170 and 172 of FIG. 8 from the first circulator port

188, 194 to the second circulator port 190, 196, according to an embodiment. Per the frequency response 232, the transmit insertion loss that a signal exhibits in the frequency band of 3.4 GHz-3.8 GHz as the signal propagates from the first circulator port 188, 194 to the second circulator port 190, 196 is less than 1 dB.

FIG. 10 is a plot 240 of a frequency response 242 of each circulator 170 and 172 of FIG. 8 from the second circulator port 190, 196 to the third circulator port 192, 198, according to an embodiment. Per the frequency response 242, the receive insertion loss that a signal exhibits in the frequency band of 3.4 GHz-3.8 GHz as the signal propagates from the second circulator port 190, 196 to the third circulator port 192, 198 is less than 1 dB.

FIG. 11 is a plot 250 of a frequency response 252 of each circulator 170 and 172 of FIG. 8 from the first circulator port 188, 194 to the third circulator port 192, 198, according to an embodiment. Per the frequency response 252, in the frequency band of 3.4 GHz-3.8 GHz, the isolation from the first circulator port 188, 194 to the third circulator port 192, 198 ranges from greater than 30 dB to greater than 50 dB.

FIG. 12 is a plot 260 of a frequency response 262 of each circulator 170 and 172 of FIG. 8 from the first circulator port 188, 194 to the second circulator port 190, 196 compared to a frequency response 264 of the transmitter-receiver isolation circuit 44$_1$ of FIG. 8 from the transmitter port 160 to the antenna port 162, and of a frequency response 266 of each circulator from the first circulator port 188, 194 to the third circulator port 192, 198 compared to a frequency response 268 of the transmitter-receiver isolation circuit 44$_1$ of FIG. 8 from the transmitter port 160 to the receiver port 164, according to an embodiment. Per the frequency responses 262, 264, 266, and 268, in the frequency band of 3.4 GHz-3.8 GHz, the transmitter-receiver isolation circuit 44$_1$ has approximately the same transmit insertion loss (less than 1 dB) between the transmitter port 160 and the antenna port 162 as a circulator 170, 172 would have, but provides a significantly higher level of isolation (greater than 30 dB) than a circulator (25 dB or less) would provide between the transmitter port 160 and the receiver port 164.

FIG. 13 is a diagram of the transmitter-receiver isolation circuit 44$_1$ of FIGS. 2-6, according to another embodiment. It is understood that each of one or more of the other transmitter-receiver isolation circuits 44$_2$-44$_n$ (FIG. 4) can be similar to the isolation circuit 44$_1$ of FIG. 13. Furthermore, items common to FIGS. 8 and 13 are labeled with same reference numbers.

The transmitter-receiver isolation circuit 44$_1$ of FIG. 13 is similar to the transmitter-receiver isolation circuit 44$_1$ of FIG. 8, but with the addition of two adjustable-phase couplers 280 and 282, which effectively allow pre-run-time, run-time, or dynamic adjustments of the phase shifts imparted by the first, second, and third phase-shifting couplers 166, 174, and 178. Such phase adjustments can increase the level of electrical isolation that the transmitter-receiver isolation circuit 44$_1$ provides between the transmitter circuit 40$_1$ (FIGS. 2-6) and the receiver circuit 52$_1$ (FIGS. 2-6).

The adjustable-phase coupler 280 includes a phase-shifting coupler 284, which can be similar to the phase-shifting couplers 166, 174, and 178, a phase-adjuster 286, which includes two electronically adjustable capacitors, such as varactors, 288 and 290, and at least one control line 292. The phase-shifting coupler 284 includes first, second, third, and fourth phase-shifting signal paths 294, 296, 298, and 300, an input node 302, and an output node 304. Furthermore, the adjustable-phase coupler 280 can include a single control line 292, which the capacitors 288 and 290 share, can include two control lines 292, one control line for each capacitor 288 and 290, or can include more than two control lines, with one or more control lines for each capacitor 288 and 290. Moreover, the at least one control line can be coupled to a respective isolation-circuit controller 98 (FIGS. 2-6), to the control circuit 48 (FIGS. 2-6), or to any other circuit on the remote antenna unit 14 (FIGS. 2-6).

Operation of the adjustable-phase coupler 280 is described, according to an embodiment in which the capacitances of the capacitors 288 and 290, and, therefore, the one or more phase shifts imparted by the adjustable-phase coupler 280, are controlled by one or more signals from the corresponding isolation-circuit controller 98 (FIGS. 2-6). Furthermore, for purposes of the below description, it is assumed that the adjustable-phase coupler 280 divides a signal at the input node 302 into two signal components of approximately equal power that respectively propagate along the first and second paths 294 and 296, and any losses introduced by the adjustable-phase coupler are ignored.

An input signal enters the input node 302, and a first component of the input signal having a power P/2 propagates along the path 294, which imparts a phase shift such as −90° to the first component.

The capacitor 288 imparts a second phase shift to the once-phase-shifted first component of the input signal, where the magnitude of the second phase shift is controlled by a signal from the isolation-circuit controller 98 (FIGS. 2-6). For example, the second phase shift can be in the approximate range of a fraction of a degree to 10°.

The capacitor 288 effectively redirects the twice-phase-shifted first component of the input signal to the third path 298, which imparts a third phase shift such as 0° to the first component such that the thrice-phase-shifted first component of the input signal is at the output node 304.

Similarly, a second component of the input signal having a power of approximately P/2 propagates along the second path 296, which imparts a phase shift such as 0° to the second component of the input signal.

The capacitor 290 imparts a second phase shift to the once-phase-shifted second component of the input signal, where the magnitude of the second phase shift is controlled by a signal from the isolation-circuit controller 98 (FIGS. 2-6). For example, the second phase shift can be in the approximate range of a fraction of a degree to 10°.

The capacitor 290 effectively redirects the twice-phase-shifted second component of the input signal to the fourth path 300, which imparts a third phase shift such as −90° to the second component such that the thrice-phase-shifted second component of the input signal is at the output node 304.

Assuming matched operation where the total of the phase shifts that the first path 294, first capacitor 288, and third path 298 impart to the first component of the input signal equals the total of the phase shifts that the second path 296, the second capacitor 290, and the third path 300 impart to the second component of the input signal, at the output node 304 the first and second components of the input signal constructively interfere to generate a phase-shifted version of the input signal having approximately the power P.

The phase shift that the capacitor 288 imparts to the first component of the input signal can be, but need not be, the same as the phase shift that the capacitor 290 imparts to the second component of the input signal. For example, in an unmatched operation where the total of the phase shifts that the first and third paths 294 and 298 impart to the first component of the input signal is −92°, and the total of the phase shifts that the second and fourth paths 296 and 300 impart to the second component of the input signal is −89°, then the capacitor 288 can be controlled to impart a phase shift that is offset by +3° relative to the phase shift that the capacitor 290 is controlled to impart such that at the output node 304, the first and second components of the input signal have the same phase.

The adjustable-phase coupler 282 can have a structure, configuration, and operation similar to the structure, configuration, and operation of the adjustable-phase coupler 280.

Still referring to FIG. 13, operation of the transmitter-receiver isolation circuit $44_1$ is described according to an embodiment in which any leakage subcomponents of the transmit signal destructively interfere at the receiver port 164 to reduce, in the receive signal, interference caused by a simultaneous transmit signal. Furthermore, in the following description, any losses imparted by the phase-shifting couplers 166, 174, 178 and adjustable-phase coupler 280 and 282, and the circulators 170 and 172, are ignored, any phase shifts imparted to signals propagating within the circulators are ignored, any signal energy that the phase-shifting couplers 166, 174, and 178 couple to the termination loads 168, 176 and 180, respectively, is ignored, it is assumed that the paths within the couplers divide signals fed into multiple ones of the paths into signal components having equal power, and any signal energy that propagates from the antenna port 162 to the transmitter port 160 is ignored.

A transmit signal of power T from the transmitter circuit $40_1$ (FIGS. 2-6) propagates into the transmitter port 160 of the first phase-shifting coupler 166.

A first component of the transmit signal having power T/2 propagates along the first path 182, which shifts the phase of the first component by an amount such as −90°, and a second component of the transmit signal having power T/2 propagates along the second path 184, which shifts the phase of the second component by an amount such as 0°.

The first component of the transmit signal propagates from the first path 182 of the first phase-shifting coupler 166 to the first circulator port 188 of the first circulator 170, propagates from the first circulator port 188 to the second circulator port 190 of the first circulator 170, and propagates from the second circulator port 190 to the second path 202 of the second phase-shifting coupler 174.

The second component of the transmit signal propagates from the second path 184 of the first phase-shifting coupler 166 to the first circulator port 194 of the second circulator 172, propagates from the first circulator port 194 to the second circulator port 196 of the second circulator 172, and propagates from the second circulator port 196 of the second circulator 172 to the third path 206 of the second phase-shifting coupler 174.

The second path 202 of the second phase-shifting coupler 174 couples a first subcomponent of the first component of the transmit signal to the antenna port 162 with a phase shift such as 0°, and the fourth path 208 of the second phase-shifting coupler 174 couples a second subcomponent of the second component of the transmit signal to the antenna port 162 with a phase shift such as −90°. The first subcomponent of the first component of the transmit signal and the second subcomponent of the second component of the transmit signal each have a signal power of approximately T/2 because the first path 200 and the third path 206 of the second phase-shifting coupler 174 each couple approximately zero energy to the termination load 176.

Because both the first subcomponent of the first component of the transmit signal and the second subcomponent of the second component of the transmit signal have approximately the same phase (for example, −90°) at the antenna port 162, these first and second subcomponents add constructively to "reconstruct," at the antenna port 162, the transmit signal having approximately a full transmit-signal power T.

In the above-described manner, the first phase-shifting coupler 166, the first and second circulators 170 and 172, and the second phase-shifting coupler 174 effectively provide, to the antenna $60_1$ (FIGS. 2-6), a reconstructed transmit signal having approximately the same power T as the transmit signal at the transmitter port 160. That is, the transmitter-receiver isolation circuit $44_1$ effectively couples the transmit signal from the transmitter port 160 to the antenna port 162 with relatively low insertion loss.

Ideally, the first circulator 170 couples no portion of the first component of the transmit signal from the first circulator port 188 to the third circulator port 192.

But in actual operation, the first circulator 170 may couple a leakage subcomponent of the first component of the transmit signal from first circulator port 188 to the third circulator port 192.

The adjustable-phase coupler 280, operating as described above, shifts the phase of the leakage subcomponent of the first component of the transmit signal from the circulator port 192 of the first circulator 170 by an amount such as $-90°+\theta_{cap1}$, which is the phase shift that one or more control signals on the one or more control lines 292 cause the capacitors 288 and 290 to impart to the leakage subcomponent of the first component of the transmit signal ($\theta_{cap1}$ can be positive or negative). For example, the isolation-circuit controller 98 (FIGS. 2-6) may generate the one or more control signals as part of a feedback control loop that acts to reduce, dynamically, in the receive signal output at the receiver port 164, the amount of interference caused by the transmit signal input to the transmitter port 160.

The first path 210 of the third phase-shifting coupler 178 couples the once-phase-shifted leakage subcomponent of the first component of the transmit signal to the receiver port 164 with a total phase shift such as $-270°+\theta_{cap1}$ (−90° from the first phase-shifting coupler 166, $-90°+\theta_{cap1}$ from the adjustable-phase coupler 280, and −90° from the third phase-shifting coupler 178).

Also ideally, the second circulator 172 couples no portion of the second component of the transmit signal from the first circulator port 194 to the third circulator port 198.

But in actual operation, the second circulator 172 may couple a leakage subcomponent of the second component of the transmit signal from first circulator port 194 to the third circulator port 198.

The adjustable-phase coupler 282, operating as described above for the adjustable-phase coupler 280, shifts the phase of the leakage subcomponent of the second component of the transmit signal from the third circulator port 198 of the second circulator 172 by an amount such as $-90°+\theta_{cap2}$, which is the phase shift that one or more control signals on one or more control lines 310 cause capacitors 312 and 314 to impart to the leakage subcomponent of the first component of the transmit signal ($\theta_{cap2}$ can be positive or negative). For example, the isolation-circuit controller 98 (FIGS. 2-6) may generate the one or more control signals as part of a feedback control loop that acts to reduce, in the receive signal output from the receiver port 164, the amount of interference caused by the transmit signal input to the transmitter port 160.

The third path 216 of the third phase-shifting coupler 178 couples the once-phase-shifted leakage subcomponent of the second component of the transmit signal to the receiver port 164 with a total phase shift such as $-90°+\theta_{cap2}$ (0° from the first phase-shifting coupler 166, $-90°+\theta_{cap2}$ from the adjustable-phase coupler 282, and another 0° from the third phase-shifting coupler 178).

Consequently, where $\theta_{cap1}=\theta_{cap2}$, or where $\theta_{cap1}$ is different than $\theta_{cap2}$ to compensate for phase differences in the paths over which the leakage subcomponents propagate, because the leakage subcomponents of the first and second components of the transmit signal have approximately opposite phases (for example, −90° and)−270° at the receiver port 164, the leakage components destructively interfere with one another such that, at least ideally, no leakage energy from the transmit signal is coupled to the receiver circuit $52_1$ (FIGS. 2-6) via the receiver port 164. Furthermore, the above-described control loop acts to dynamically vary $\theta_{cap1}$ and $\theta_{cap2}$ to maintain the transmit-signal leakage energy at the receiver port 164 at a lowest-achievable level.

Further, in operation of the transmit-receiver isolation circuit $44_1$, ideally the second phase-shifting coupler 174 receives, from the antenna $60_1$ (FIGS. 2-6) at the receiver port 162, an input receive signal having a power R.

The second path 202 of the second phase-shifting coupler 174 shifts a phase of a first component of the receive signal having power R/2 by an amount such as 0°, and the fourth path 208 of the second phase-shifting coupler 174 shifts a phase of a second component of the receive signal having a power of approximately R/2 by an amount such as −90°.

The first component of the receive signal propagates from the second path 202 of the second phase-shifting coupler 174 to the second circulator port 190 of the first circulator 170, and the second component of the receive signal propagates from the fourth path 208 of the second phase-shifting coupler 174 to the second circulator port 196 of the second circulator 172.

The first component of the receive signal propagates from the second circulator port 190 to the third circulator port 192 of the first circulator 170, and from the third circulator port 192 to the adjustable-phase coupler 280.

The adjustable-phase coupler 280, operating as described above, shifts the phase of the first component of the receive signal by an amount such as $-90°+\theta_{cap1}$, which is the phase shift that one or more control signals on the one or more control lines 292 cause the capacitors 288 and 290 to impart to the first component of the receive signal ($\theta_{cap1}$ can be positive or negative).

The first path 210 of the third phase-shifting coupler 178 imparts, to the twice-phase-shifted first component of the receive signal, a phase shift of an amount such as −90° such that at the receiver port 164, the first component of the receive signal has a total phase shift such as $-180°+\theta_{cap1}$ (0° from the second phase-shifting coupler 174, $-90°+\theta_{cap1}$ from the adjustable-phase coupler 280, and −90° from the third phase-shifting coupler 178).

The second component of the receive signal propagates from the second circulator port 196 to the third circulator port 198 of the second circulator 172, and from the third circulator port 198 to the adjustable-phase coupler 282.

The adjustable-phase coupler 282, operating as described above, shifts the phase of the second component of the receive signal by an amount such as $-90°+\theta_{cap2}$, which is the phase shift that one or more control signals on the one or more control lines 310 cause the capacitors 312 and 314 to impart to the second component of the receive signal ($\theta_{cap2}$ can be positive or negative).

The third path 216 of the third phase-shifting coupler 178 imparts, to the twice-phase-shifted second component of the receive signal, a phase shift of an amount such as −90° such that at the receiver port 164, the second component of the receive signal has a total phase shift such as approximately $-180°+\theta_{cap2}$ (−90° from the second phase-shifting coupler 174, $-90°+\theta_{cap2}$ from the adjustable-phase coupler 282, and 0° from the third phase-shifting coupler 178).

Consequently, because both the first and second components of the receive input signal have approximately the same phase (for example, −180°) at the receiver port 164, they interfere constructively, and, therefore, effectively reconstruct, at the receiver port, the receive signal having approximately full power R. This assumes either that $\theta_{cap1}=\theta_{cap2}$, or $\theta_{cap1}$ and $\theta_{cap2}$ are such that they equalize the total phase shifts experienced by the first and second components of the receive signal.

In summary, the transmitter-receiver isolation circuit $44_1$ effectively divides the transmit signal at the transmitter port 160 into multiple components that constructively interfere at the antenna port 162 such that the antenna $60_1$ radiates a reconstructed, approximately full power, transmit signal, and that destructively interfere at the receiver port 164 to reduce, in the receive signal from the antenna $60_1$, interference caused by a simultaneous transmit signal to the same antenna $60_1$.

Still referring to FIG. 13, alternate embodiments of the transmitter-receiver isolation circuit $44_1$ are contemplated. For example, because the components of the transmit and receive signals traverse different paths, values of $\theta_{cap1}$ and $\theta_{cap2}$ that are best for transmit-interference cancellation may not be best for reconstructing the receive signal at the receiver port 164, and vice-versa. Therefore, the isolation-circuit controller 98 (FIGS. 2-6), and one or more control loops that include the isolation-circuit controller 98, can be weighted to favor cancelling transmit interference over reconstructing the receive signal, or vice-versa. Furthermore, instead of being controlled by the isolation-circuit controller 98, the adjustable-phase couplers 280 and 282 can have their phase shifts set to fixed values during manufacture or assembly of the remote antenna unit 14 (FIGS. 2-6), or set to calibrated values during a calibration procedure that is performed once or periodically. Moreover, embodiments described above in conjunction with FIGS. 1-12 or below in conjunction with FIGS. 14-19 may be applicable to the transmitter-receiver isolation circuit $44_1$ of FIG. 13.

FIG. 14 is a plot 330 of a frequency response 332 between the transmitter port 160 and the antenna port 162 of the transmitter-receiver isolation circuit $44_1$ of FIG. 13, a frequency response 334 between the antenna port 162 and the receiver port 164, and a frequency response 336 between the transmitter port 160 and the receiver port 164, according to an embodiment. Per the frequency responses 332, 334, and 336, in the frequency band of 3.4 GHz-3.8 GHz, the transmitter-receiver isolation circuit $44_1$ has relatively low (for example, approximately 0.5 dB-1.0 dB) transmit insertion loss between the transmitter and antenna ports 160 and 162 and relatively low receive insertion loss between the antenna and receiver ports 162 and 164, but provides a relatively high level (for example, approximately 38 dB or greater) of electrical isolation between the transmitter and receiver ports.

FIG. 15 is a plot 340 of a frequency response 342 of each circulator 170 and 172 of FIG. 13 from the first circulator port 188, 194 to the second circulator port 190, 196 compared to a frequency response 344 of the transmitter-receiver isolation circuit $44_1$ of FIG. 13 from the transmitter port 160 to the antenna port 162, and of a frequency response 346 of each circulator 170 and 172 from the first circulator port 188, 194 to the third circulator port 192, 198 compared to a frequency response 348 of the transmitter-receiver isolation circuit $44_1$ of FIG. 13 from the transmitter port 160 to the receiver port 164, according to an embodiment. Per the frequency responses 342, 344, 346, and 348, in the frequency band of 3.4 GHz-3.8 GHz, the transmitter-receiver isolation circuit $44_1$ of FIG. 13 has approximately the same transmit insertion loss (for example, less than 1 dB) as a circulator 170, 172 would have, but provides a significantly higher level of isolation (for example, greater than 38 dB) than a circulator (for example, 25 dB or less) would between the transmitter port 160 and the receiver port 164.

FIG. 16 is a diagram of the transmitter-receiver isolation circuit $44_1$ of FIGS. 2-6, according to yet another embodiment. It is understood that one or more of the other transmitter-receiver isolation circuits $44_2$-$44_n$ can be similar to the transmitter-receiver isolation circuit $44_1$.

The isolation circuit $44_1$ includes a transmitter port 360, an antenna port 362, a receiver port 364, a circulator 366, a balun 368, a filter circuit 370, a signal combiner 372, and a receive-signal-strength-indicator (RSSI) circuit 374.

The transmitter port 360 is configured for coupling to the transmitter circuit $40_1$ (FIGS. 2-6), the antenna port 362 is configured for coupling to the antenna $60_1$ (FIGS. 2-6), and the receiver port 364 is configured for coupling to the receiver circuit $52_1$ (FIGS. 2-6).

The circulator 366 can be similar to the circulators 170 and 172 of FIGS. 8 and 13.

The balun 368 can be a conventional balun and is configured to generate a reference signal in response to a transmit signal at the transmitter port 360; for example, the reference signal can be a lower-power replica of the transmit signal.

The filter circuit 370 is, for example, an FIR filter, where one or more coefficients of which are controllable by the RSSI circuit 374. The filter circuit 370 may be an analog or digital filter circuit (if the latter, then the filter circuit 370 can include an ADC to convert the reference signal from the analog to the digital domain, and can include a DAC to convert the filtered reference signal from the digital domain to the analog domain).

The signal combiner 372 is configured to combine the filtered reference signal with a receive signal from the antenna $60_1$ (FIGS. 2-6) via the circulator 366 to generate a transmit-interference-cancelled receive signal at the receiver port 364. For example, the signal combiner 372 may be a summer circuit.

The RSSI circuit 374 is configured to determine a strength of the transmit-interference-cancelled receive signal and to control, in response to the determined strength, the parameters of the filtering algorithm with which the filter circuit 370 filters the reference signal. For example, as described above, the RSSI circuit 374 is configured to control one or more coefficients of an FIR filter implemented by the filter circuit 370.

Still referring to FIG. 16, operation of the transmitter-receiver isolation circuit $44_1$ is described, according to an embodiment.

The transmitter circuit $40_1$ (FIGS. 2-6) generates, at the transmitter port 360, a transmit signal that propagates through the balun 368, to a circulator port 376 of the circulator 366, through the circulator 366 to another circulator port 378, and to the antenna $60_1$ (FIGS. 2-6), which radiates a downlink signal in response to the transmit signal.

The balun 368 generates the reference signal in response to the transmit signal, and the filter circuit 370 filters the reference signal with an algorithm having one or more coefficients, or one or more other parameters, set by a feedback signal from the RSSI circuit 374.

While radiating the downlink signal, the antenna $60_1$ (FIGS. 2-6) receives an uplink signal, and generates, in response to the uplink signal, a receive signal at the circulator port 378 of the circulator 366.

The receive signal propagates from the circulator port 378 to a circulator port 380 of the circulator 366.

Because the circulator 366 is non-ideal, a component of the transmit signal leaks into, for example, interferes with, the receive signal.

Therefore, at the circulator port 380, the receive signal includes transmit-signal interference, which distorts the receive signal.

The distorted receive signal propagates from the circulator port 380 to the signal combiner 372, which combines the filtered reference signal with the distorted receive signal to yield an undistorted (for example, interference-cancelled) receive signal at the receiver port 364. Although the undistorted receive signal may still include some transmit interference, the transmitter-receiver isolation circuit $44_1$ reduces, in the receive signal, the transmit interference to a level lower than the level of transmit interference in the receive signal at the circulator port 380.

The transmitter-receiver isolation circuit $44_1$ operates on a principle that conditioning the distorted receive signal to have the lowest achievable strength, or power, at the receiver port 364 provides the highest achievable cancellation of the transmit interference from the receive signal.

Consequently, the feedback loop that includes the filter circuit 370, signal combiner 372, and RSSI circuit 374 acts to maintain, at a minimum achievable level, the power of the receive signal output from the signal combiner 372.

If the transmit circuit $40_1$ (FIGS. 2-6) is not generating a transmit signal, then the reference signal is approximately zero such that the receive signal is substantially unchanged as it propagates through the combiner 372.

Still referring to FIG. 16, alternate embodiments of the transmitter-receiver isolation circuit $44_1$ are contemplated. For example, the filter circuit 370 may be, or may implement, a suitable filter other than an FIR filter. Furthermore, the balun 368 may be replaced with another suitable circuit, such as a high-frequency buffer or current mirror. Moreover, embodiments described above in conjunction with FIGS. 1-15 or below in conjunction with FIGS. 17-19 may be applicable to the transmitter-receiver isolation circuit $44_1$ of FIG. 16.

FIG. 17 is a diagram of a remote antenna unit 14 of FIG. 1, the remote antenna unit being similar in structure and operation to the remote antenna unit of FIG. 2 but for including, in place of the analog interference-cancellation circuit 46 of FIG. 2, an optical analog interference-cancellation circuit 390, according to an embodiment. Furthermore, like numbers reference components common to FIGS. 2-6 and 17-19.

The analog interference-cancellation circuit 390 can include electrical and optical circuitry similar to the electrical and optical circuitry disclosed in U.S. Publication 2017/0170903 to Jain et al., which is incorporated by reference. For example, the analog interference-cancellation circuit 390 includes an electro-optic converter 392 configured to convert the transmit signal from the transmitter circuit $40_1$ from the electrical domain to the optical domain, and includes an opto-electric converter 394 configured to convert the analog cancellation signal from the optical domain to the electrical domain. In some examples, the analog interference-cancellation circuit further includes an optical filter (not shown) between the electro-optic converter 392 and the opto-electric converter 394.

Still referring to FIG. 17, alternate embodiments of the transmitter-receiver isolation circuit $44_1$ are contemplated. For example, the analog interference-cancellation circuit 390 can supplement, instead of replace, the analog interference-cancellation circuit 46 of FIG. 2. Furthermore, the analog interference-cancellation circuit 390 can supplement or replace the analog interference-cancellation circuit 46 of any one or more of FIGS. 3-6. Moreover, embodiments described above in conjunction with FIGS. 1-16 and below in conjunction with FIGS. 18-19 may be applicable to the transmitter-receiver isolation circuit $44_1$ of FIG. 17.

FIG. 18 is a diagram of the remote antenna unit 14 of FIG. 1, according to an embodiment in which the remote antenna unit 14 is similar to the remote antenna unit 14 of FIG. 6 but with separate (for example, unshared) transmit and receive antennas 60, according to an embodiment. That is, each antenna 60 is dedicated either to transmitting a downlink signal or a component thereof, or to receiving an uplink signal. Being configured with separate transmit and receive antennas 60 increases total isolation between the transmit and the receive antennas and, therefore, allows one to omit the transmitter-receiver isolation circuits 44 from the remote antenna unit 14. Omitting the transmitter-receiver isolation circuits 44 allows one to omit the isolation-circuit controller(s) 98 from the digital interference-cancellation circuit 50. In FIG. 18, like numbers reference items common to FIGS. 1-6 and 17-18.

Except for changes in operation due to the lack of the transmitter-receiver isolation circuits 44 and the isolation-circuit controller(s) 98, the circuitry of the remote antenna unit 14 can operate in a manner similar to that described above in conjunction with FIG. 6.

Still referring to FIG. 18, alternate embodiments of the remote antenna unit 14 are contemplated. For example, embodiments described above in conjunction with FIGS. 1-17 and below in conjunction with FIG. 19 may be applicable to the remote antenna unit 14 of FIG. 18.

FIG. 19 is a diagram of the remote antenna unit 14 of FIG. 1, according to an embodiment in which the remote antenna unit 14 is similar to the remote antenna unit 14 of FIG. 6 but with a respective shared transmit-and-receive antenna 60, and with a respective transmitter circuit 40 and a respective receiver circuit 52, for each operator, according to an embodiment. That is, each antenna 60, is dedicated to a respective operator, and is configured for both transmitting a downlink signal or a component thereof, and receiving an uplink signal, in a coordinated, synchronized fashion with respect to the operator. That is, the operator synchronizes the transmission of downlink signals and the reception of uplink signals on the respective antenna 60 so that such transmission and reception do not overlap in time. A switch 400, which can be similar to the switch 150 of FIG. 7, is configured to provide isolation between the respective receiver circuit 52 and the respective antenna 60 while the remote antenna unit 14 is transmitting a downlink signal, and is configured to provide isolation between the respective transmitter circuit 40 and the respective antenna while the remote antenna unit is receiving an uplink signal. In FIG. 19, like numbers reference items common to FIGS. 1-6 and 17-19.

Still referring to FIG. 19, alternate embodiments of the remote antenna unit 14 are contemplated. For example, embodiments described above in conjunction with FIGS. 1-18 may be applicable to the remote antenna unit 14 of FIG. 19.

The methods and techniques described herein may be implemented in analog electronic circuitry, digital electronic circuitry, or with a programmable processor (for example, a special-purpose processor, a general-purpose processor such as a computer, a microprocessor, or microcontroller) or other circuit (for example, an FPGA), firmware, software, or in combinations of them. Apparatuses embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially designed application-specific integrated circuits (ASICs).

Example Embodiments

Example 1 includes a remote antenna unit, comprising: a first transmitter configured to generate at least one first transmit signal; a first receiver configured to process at least one receive signal; a first antenna array including one or more first antennas each coupled to at least one of the first transmitter and the receiver, each of at least one of the first antennas configured to radiate a respective downlink signal in response to a respective one of the at least one first transmit signal, and each of at least one of the first antennas configured to generate a respective one of the at least one receive signal in response to an uplink signal; and first and second interference circuits each coupled to the first transmitter and the receiver and each configured to reduce, in each of the at least one receive signal, interference caused by one or more of the at least one first transmit signal, at least one downlink signal radiated by one of the one or more first antennas, and at least one interfering downlink signal radiated by one of one or more other antennas.

Example 2 includes the remote antenna unit of Example 1, further comprising: a second transmitter; a second receiver; and wherein the antenna array includes a multiple-input-multiple-output antenna array having at least two antennas respectively coupled to the first and second transmitters and to the first and second receivers.

Example 3 includes the remote antenna unit of any of Examples 1-2 wherein the antenna array includes a single antenna.

Example 4 includes the remote antenna unit of any of Examples 1-3 wherein one of the first and second interference circuits includes an isolation circuit configured to electrically isolate the receiver from the transmitter.

Example 5 includes the remote antenna unit of any of Examples 1-4 wherein: one of the first and second interference circuits includes an analog interference-cancellation circuit configured to generate, for each receive signal, a corresponding correction signal; and the receiver is configured to generate, for each receive signal, a respective interference-cancelled receive signal in response to the receive signal and the corresponding correction signal.

Example 6 includes the remote antenna unit of any of Examples 1-5 wherein: one of the first and second interference circuits includes an analog interference-cancellation circuit configured to generate, for each receive signal, a corresponding correction signal; and the receiver includes, for each receive signal, a respective signal combiner configured to generate an interference-cancelled receive signal in response to the receive signal and the corresponding correction signal.

Example 7 includes the remote antenna unit of any of Examples 5-6 wherein the analog interference-cancellation circuit includes a finite-impulse-response filter.

Example 8 includes the remote antenna unit of any of Examples 5-7 wherein the analog interference-cancellation circuit includes: an electro-optic converter configured to generate an optical transmit signal in response to the transmit signal; an optical filter configured to configured to generate, in response to the optical transmit signal for each receive signal, a corresponding optical correction signal; and an opto-electric converter configured to generate each corresponding correction signal in response to a corresponding optical correction signal.

Example 9 includes the remote antenna unit of any of Examples 1-8 wherein: one of the first and second interference circuits includes a digital interference-cancellation circuit configured to generate, for each receive signal, a corresponding correction signal; and the receiver includes, for each receive signal, an analog-to-digital converter configured to generate a respective digital receive signal in response to the receive signal; and the receiver is configured, for each receive signal, to generate a respective interference-cancelled receive signal in response to the respective digital receive signal and the corresponding correction signal.

Example 10 includes the remote antenna unit of any of Examples 1-9 wherein: one of the first and second interference circuits includes a digital interference-cancellation circuit configured to generate, for each receive signal, a corresponding correction signal; and the receiver includes, for each receive signal, an analog-to-digital converter configured to generate a respective digital receive signal in response to the receive signal, and a respective signal combiner configured to generate an interference-cancelled receive signal in response to the respective digital receive signal and the corresponding correction signal.

Example 11 includes the remote antenna unit of any of Examples 1-10, further comprising: an interference receiver configured to process at least one interfering receive signal; an interference antenna array including one or more interference antennas each coupled to the interference receiver and each configured to generate a respective one of the at least one interfering receive signal in response to one or more of the at least one interfering downlink signal; and wherein each of at least one of the first and second interference circuits is coupled to the interference receiver and is configured to reduce, in each of the at least one receive signal, interference caused by one or more of the at least one interfering downlink signal.

Example 12 includes the remote antenna unit of any of Examples 1-11, further comprising: a second transmitter configured to generate at least one second transmit signal; a second antenna array including one or more second antennas each coupled to the second transmitter and configured to radiate a respective second downlink signal in response to a respective one of the at one second transmit signal; and wherein each of at least one of the first and second interference circuits is coupled to the second transmitter and is configured to reduce, in each of the at least one receive signal, interference caused by one or more second downlink signals.

Example 13 includes the remote antenna unit of any of Examples 1-12 wherein the at least one transmit signal and the at least one receive signal are in a same frequency band.

Example 14 includes the remote antenna unit of any of Examples 1-13 wherein the at least one transmit signal and the at least one receive signal include at least one same frequency.

Example 15 includes the remote antenna unit of any of Examples 1-14 wherein each respective downlink signal and the uplink signal are in a same frequency band.

Example 16 includes the remote antenna unit of any of Examples 1-15 wherein each respective downlink signal and the uplink signal include at least one same frequency.

Example 17 includes the remote antenna unit of any of Examples 1-16 wherein the downlink signal radiated by one of one or more other antennas and the uplink signal are in a same frequency band.

Example 18 includes a distributed antenna system, comprising: a master unit; and at least one remote antenna unit coupled to the master unit, each of the at least one remote antenna unit including a respective transmitter configured to generate at least one transmit signal; a respective receiver configured to process at least one receive signal; a respective antenna array including one or more antennas each coupled to at least one of the transmitter and the receiver, each of at least one of the antennas configured to radiate a respective downlink signal in response to a respective one of the at least one transmit signal, and each of at least one of the antennas configured to generate a respective one of the at least one receive signal in response to an uplink signal; and first and second interference circuits each coupled to the transmitter and the receiver and each configured to reduce, in each of the at least one receive signal, interference caused by one or more of the at least one transmit signal, at least one downlink signal radiated by one of the one or more antennas, and at least one interfering downlink signal radiated by one of one or more other antennas.

Example 19 includes the distributed antenna system of Example 18, further comprising: at least one base station coupled to the master unit and each configured to generate one or more respective downlink data signals, and to receive one or more respective uplink data signals; wherein each transmitter is configured to generate the respective at least one transmit signal in response to a respective one of the one or more downlink data signals; and wherein each receiver is configured to generate a respective one of the one or more uplink data signals in response to the respective at least one received signal.

Example 20 includes the distributed antenna system of Example 19 wherein at least one of the at least one base station is configured to cause each transmitter of at least one of the at least one remote antenna unit to generate a transmit signal only while the receiver of a same remote antenna unit is not processing a receive signal.

Example 21 includes the distributed antenna system of any of Examples 18-20 wherein one of the at least one remote antenna units includes: an interference receiver configured to process at least one interfering receive signal; an interference antenna array including one or more interference antennas each coupled to the interference receiver and each configured to generate a respective one of the at least one interfering receive signal in response to one or more of the at least one interfering downlink signal from another one of the remote antenna units; and wherein each of at least one of the first and second interference circuits is coupled to the interference receiver and is configured to reduce, in each of the at least one receive signal, interference caused by one or more of the at least one interfering downlink signal from the other one of the remote antenna units.

Example 22 includes a method, comprising: reducing, with a first interference circuit, interference in a receive signal caused by at least one of a transmit signal generated by a remote antenna unit and a downlink signal radiated by a remote antenna unit; and further reducing, with a second interference circuit, interference in the receive signal caused by at least one of the transmit signal and the downlink signal.

Example 23 includes the method of Example 22, further comprising: generating the receive signal with an antenna in response to an uplink signal; and coupling the transmit signal to the antenna while generating the receive signal with the antenna.

Example 24 includes the method of any of Examples 22-23, further comprising: generating the receive signal with an antenna; and radiating the downlink signal with another antenna while generating the receive signal with the antenna.

Example 25 includes the method of any of Examples 22-24 wherein reducing, with the first interference circuit, interference in the receive signal includes electrically isolating the receive signal from the transmit signal with the first interference circuit.

Example 26 includes the method of any of Examples 22-25, further comprising: generating the downlink signal in response to a different transmit signal; and wherein reducing interference in the receive signal includes generating a cancelling signal in response to the different transmit signal, and generating a corrected receive signal in response to the receive signal and the cancelling signal.

Example 27 includes the method of any of Examples 22-26 wherein reducing interference in the receive signal includes: generating a cancelling signal in response to the downlink signal, and generating a corrected receive signal in response to the receive signal and the cancelling signal.

Example 28 includes the method of any of Examples 22-27, further comprising: generating the downlink signal in response to a different transmit signal; and wherein further reducing interference in the receive signal includes generating a cancelling signal in response to the different transmit signal, and generating a corrected receive signal in response to the receive signal and the cancelling signal.

Example 29 includes the method of any of Examples 22-28 wherein further reducing interference in the receive signal includes: generating a cancelling signal in response to the downlink signal, and generating a corrected receive signal in response to the receive signal and the cancelling signal.

Example 30 includes a transmitter-receiver isolation circuit, comprising: a transmitter port configured to receive a transmit signal; an antenna port configured for coupling to an antenna; a receiver port configured to receive a receive signal; a first signal path between the transmitter port and the antenna port and configured to impart a first phase shift to a first transmit portion of the transmit signal; a second signal path between the transmitter port and the antenna port and configured to impart approximately the first phase shift to a second transmit portion of the transmit signal; a first leakage path between the transmitter port and the receiver port and configured to impart a second phase shift to a first leakage portion of the transmit signal; and a second leakage path between the transmitter port and the receiver port and configured to impart to a second leakage portion of the transmit signal a third phase shift that is approximately opposite to the second phase shift.

Example 31 includes the transmitter-receiver isolation circuit of Example 30 wherein: the first signal path includes a first phase shifter configured to impart the first phase shift to the first transmit portion of the transmit signal; a second phase shifter configured to impart to approximately zero phase shift to the first transmit portion of the transmit signal; and a first circulator coupled between the first and second phase shifters; and the second signal path includes a third phase shifter configured to impart approximately zero phase shift to the second transmit portion of the transmit signal; a fourth phase shifter configured to impart to approximately the first phase shift to the second transmit portion of the transmit signal; and a second circulator coupled between the third and fourth phase shifters.

Example 32 includes the transmitter-receiver isolation circuit of Example 31, further comprising: a first coupling circuit that includes the first phase shifter and the third phase shifter; and a second coupling circuit that includes the second phase shifter and the fourth phase shifter.

Example 33 includes the transmitter-receiver isolation circuit of any of Examples 31-32 wherein the first, second, third, and fourth phase shifters are configured to cause the first and second transmit portions of the transmit signal to have approximately a same signal power at the antenna port.

Example 34 includes the transmitter-receiver isolation circuit of any of Examples 31-33, further comprising: a first coupling circuit that includes the first phase shifter and the third phase shifter; a second coupling circuit that includes the second phase shifter and the fourth phase shifter; and wherein the first and second coupling circuits are configured to cause the first and second transmit portions of the transmit signal to have approximately a same signal power at the antenna port.

Example 35 includes the transmitter-receiver isolation circuit of any of Examples 30-34 wherein: the first signal path includes a first phase shifter configured to impart the first phase shift to the first transmit portion of the transmit signal; a second phase shifter configured to impart to approximately zero phase shift to the first transmit portion of the transmit signal; and a first circulator having a first port coupled to the first phase shifter, a second port coupled to the second phase shifter, and a third port coupled to the receiver port; and the second signal path includes a third phase shifter configured to impart approximately zero phase shift to the second transmit portion of the transmit signal; a fourth phase shifter configured to impart to approximately the first phase shift to the second transmit portion of the transmit signal; and a second circulator having a first port coupled to the third phase shifter, a second port coupled to the fourth phase shifter, and a third port coupled to the receiver port.

Example 36 includes the transmitter-receiver isolation circuit of any of Examples 30-35 wherein: the first leakage path includes a first phase shifter configured to impart a first portion of the second phase shift to the first leakage portion of the transmit signal; a second phase shifter configured to impart to a second portion of the second phase shift to the first leakage portion of the transmit signal; and a first circulator coupled between the first and second phase shifters; and the second leakage path includes a third phase shifter configured to impart a first portion of the third phase shift to the second leakage portion of the transmit signal; a fourth phase shifter configured to impart a second portion of the third phase shift to the second leakage portion of the transmit signal; and a second circulator coupled between the third and fourth phase shifters.

Example 37 includes the transmitter-receiver isolation circuit of Example 36, further comprising: a first coupling circuit that includes the first phase shifter and the third phase shifter; and a second coupling circuit that includes the second phase shifter and the fourth phase shifter.

Example 38 includes the transmitter-receiver isolation circuit of any of Examples 36-37 wherein the first, second, third, and fourth phase shifters are configured to cause the first and second leakage portions of the transmit signal to have approximately a same signal power at the receiver port.

Example 39 includes the transmitter-receiver isolation circuit of any of Examples 36-38, further comprising: a first coupling circuit that includes the first phase shifter and the third phase shifter; a second coupling circuit that includes the second phase shifter and the fourth phase shifter; and wherein the first and second coupling circuits are configured to cause the first and second leakage portions of the transmit signal to have approximately a same signal power at the receiver port.

Example 40 includes the transmitter-receiver isolation circuit of any of Examples 30-39 wherein: the first leakage path includes a first phase shifter configured to impart approximately 90° of phase shift to the first leakage portion of the transmit signal; a second phase shifter configured to impart approximately 90° of phase shift to the first leakage portion of the transmit signal; and a first circulator having a first port coupled to the first phase shifter, a second port coupled to the antenna port, and a third port coupled to the second phase shifter; and the second leakage path includes a third phase shifter configured to impart approximately zero phase shift to the second leakage portion of the transmit signal; a fourth phase shifter configured to impart to approximately zero phase shift to the second leakage portion of the transmit signal; and a second circulator having a first port coupled to the third phase shifter, a second port coupled to the antenna port, and a third port coupled to the fourth phase shifter.

Example 41 includes the transmitter-receiver isolation circuit of any of Examples 30-40 wherein: the first signal path includes a first phase shifter configured to impart the first phase shift to the first transmit portion of the transmit signal; a second phase shifter configured to impart to approximately zero phase shift to the first transmit portion of the transmit signal; and a first circulator having a first port coupled to the first phase shifter, a second port coupled to the second phase shifter, and a third port; and the second signal path includes a third phase shifter configured to impart approximately zero phase shift to the second transmit portion of the transmit signal; a fourth phase shifter configured to impart to approximately the first phase shift to the second transmit portion of the transmit signal; and a second circulator having a first port coupled to the third phase shifter, a second port coupled to the fourth phase shifter, and a third port; the first leakage path includes the first phase shifter configured to impart the first phase shift to the first leakage portion of the transmit signal; a fifth phase shifter coupled to the third port of the first circulator and configured to impart approximately the first phase shift to the first leakage portion of the transmit signal; and the second leakage path includes the third phase shifter configured to impart approximately zero phase shift to the second leakage portion of the transmit signal; and a sixth phase shifter coupled to the third port of the second circulator and configured to impart to approximately zero phase shift to the second leakage portion of the transmit signal.

Example 42 includes the transmitter-receiver isolation circuit of any of any of Examples 30-41 wherein: the first leakage path includes a first phase shifter configured to impart a first portion of the second phase shift to the first leakage portion of the transmit signal; a second phase shifter configured to impart to a second portion of the second phase shift to the first leakage portion of the transmit signal; a third phase shifter configured to impart a third portion of the second phase shift to the first leakage portion of the transmit signal; and a first circulator coupled between the first and second phase shifters; and the second leakage path includes a fourth phase shifter configured to impart a first portion of the third phase shift to the second leakage portion of the transmit signal; a fifth phase shifter configured to impart a second portion of the third phase shift to the second leakage portion of the transmit signal; a sixth phase shifter configured to impart a third portion of the third phase shift to the second leakage portion of the transmit signal; and a second circulator coupled between the fourth and fifth phase shifters.

Example 43 includes the transmitter-receiver isolation circuit of Example 42 wherein: the second phase shifter is configured to alter the second portion of the second phase shift in response to a first control signal; and the fifth phase shifter is configured to alter the second portion of the third phase shift in response to a second control signal.

Example 44 includes the transmitter-receiver isolation circuit of any of Examples 42-43 wherein the first, second, third, fourth, fifth, and sixth phase shifters are configured to cause the first and second leakage portions of the transmit signal to have approximately a same signal power at the receiver port.

Example 45 includes the transmitter-receiver isolation circuit of any of Examples 30-44 wherein: the first leakage path includes a first phase shifter configured to impart approximately 90° of phase shift to the first leakage portion of the transmit signal; a second electronically adjustable phase shifter configured to impart approximately 90° of phase shift to the first leakage portion of the transmit signal; a third phase shifter configurable to impart approximately 90° of phase shift to the first leakage portion of the transmit signal; and a first circulator having a first port coupled to the first phase shifter, a second port coupled to the antenna port, and a third port coupled to the second phase shifter; and the second leakage path includes a fourth phase shifter configured to impart approximately zero phase shift to the second leakage portion of the transmit signal; a fifth electronically adjustable phase shifter configured to impart to approximately 90° phase shift to the second leakage portion of the transmit signal; a sixth phase shifter configured to impart approximately zero phase shift to the second leakage portion of the transmit signal; and a second circulator having a first port coupled to the fourth phase shifter, a second port coupled to the antenna port, and a third port coupled to the fifth phase shifter.

Example 46 includes the transmitter-receiver isolation circuit of any of Examples 30-45 wherein: the first signal path includes a first phase shifter configured to impart the first phase shift to the first transmit portion of the transmit signal; a second phase shifter configured to impart to approximately zero phase shift to the first transmit portion of the transmit signal; and a first circulator having a first port coupled to the first phase shifter, a second port coupled to the second phase shifter, and a third port; and the second signal path includes a third phase shifter configured to impart approximately zero phase shift to the second transmit portion of the transmit signal; a fourth phase shifter configured to impart to approximately the first phase shift to the second transmit portion of the transmit signal; and a second circulator having a first port coupled to the third phase shifter, a second port coupled to the fourth phase shifter, and a third port; the first leakage path includes the first phase shifter configured to impart the first phase shift to the first leakage portion of the transmit signal; a fifth electronically adjustable phase shifter coupled to the third port of the first circulator and configured to impart approximately the first phase shift to the first leakage portion of the transmit signal; and a sixth phase shifter configurable to impart approximately the first phase shift to the first leakage portion of the transmit signal; and the second leakage path includes the third phase shifter configured to impart approximately zero phase shift to the second leakage portion of the transmit signal; a seventh electronically adjustable phase shifter coupled to the third port of the second circulator and configured to impart to approximately the first phase shift to the second leakage portion of the transmit signal; and an eighth phase shifter configured to impart approximately zero phase shift to the second leakage portion of the transmit signal.

Example 47 includes a remote antenna unit, comprising: a transmitter configured to generate a transmit signal; a receiver configured to process a receive signal; an antenna array including one or more antennas each coupled to the transmitter and the receiver and each configured to radiate a respective downlink signal in response to a respective one of the at least one transmit signal, and to generate a respective one of the at least one receive signal in response to an uplink signal; and a transmitter-receiver isolation circuit coupled to one of the one or more antennas, the, transmitter, and the receiver, the transmitter-receiver isolation circuit including a first signal path between the transmitter and the antenna and configured to impart a first phase shift to a first transmit portion of the transmit signal; a second signal path between the transmitter and the antenna and configured to impart approximately the first phase shift to a second transmit portion of the transmit signal; a first leakage path between the transmitter and the receiver and configured to impart a second phase shift to a first leakage portion of the transmit signal; and a second leakage path between the transmitter and the receiver and configured to impart to a second leakage portion of the transmit signal a third phase shift that is approximately opposite to the second phase shift.

Example 48 includes a distributed antenna system, comprising: a master unit; and at least one remote antenna unit coupled to the master unit, each of the at least one remote antenna unit including a respective transmitter configured to generate a transmit signal; a respective receiver configured to process a receive signal; a respective antenna array including one or more antennas each coupled to the transmitter and the receiver and each configured to radiate a respective downlink signal in response to a respective one of the at least one transmit signal, and to generate a respective one of the at least one receive signal in response to an uplink signal; and a respective transmitter-receiver isolation circuit coupled to one of the one or more antennas, the, transmitter, and the receiver, the transmitter-receiver isolation circuit including a first signal path between the transmitter and the antenna and configured to impart a first phase shift to a first transmit portion of the transmit signal; a second signal path between the transmitter and the antenna and configured to impart approximately the first phase shift to a second transmit portion of the transmit signal; a first leakage path between the transmitter and the receiver and configured to impart a second phase shift to a first leakage portion of the transmit signal; and a second leakage path between the transmitter and the receiver and configured to impart to a second leakage portion of the transmit signal a third phase shift that is approximately opposite to the second phase shift.

Example 49 includes the distributed antenna system of Example 48, further comprising: at least one base station coupled to the master unit and each configured to generate one or more respective downlink data signals, and to receive one or more respective uplink data signals; wherein each transmitter is configured to generate the respective transmit signal in response to a respective one of the one or more downlink data signals; and wherein each receiver is configured to generate a respective one of the one or more uplink data signals in response to the respective received signal.

Example 50 includes a method, comprising: imparting a first phase shift to a first transmit portion of a transmit signal propagating from a transmitter to an antenna on a first transmit path; imparting approximately the first phase shift to a second transmit portion of the transmit signal propagating from the transmitter to the antenna on a second transmit path; imparting a second phase shift to a first leakage portion of the transmit signal propagating from the transmitter to the receiver on a first leakage path; and imparting a third phase shift that is approximately opposite to the second phase shift to a second leakage portion of the transmit signal propagating from the transmitter to the receiver on a second leakage path.

Example 51 includes the method of Example 50, further comprising: causing the first and second transmit portions of the transmit signal to have approximately a same signal power at the antenna; and causing the first and second leakage portions of the transmit signal have approximately a same signal power at the receiver.

Example 52 includes the method of any of Examples 50-51, further comprising electronically controlling the phase shift imparted to one of the first and second transmit portions of the transmit signal.

Example 53 includes the method of any of Examples 50-52, further comprising electronically controlling the phase shift imparted to one of the first and second leakage portions of the transmit signal.

Example 54 includes the method of any of Examples 50-53 wherein the first phase shift is approximately 90°.

Example 55 includes the method of any of Examples 50-54 wherein: the second phase shift is approximately 180°; and the third phase shift is approximately 0°.

Example 56 includes the method of any of Examples 50-55 wherein: the second phase shift is approximately 270°; and the third phase shift is approximately 90°.

Example 57 includes a method, comprising: generating multiple leakage components of a transmit signal; and causing the leakage components to destructively interfere to reduce interference in a receive signal.

Example 58 includes a transmitter-receiver isolation circuit, comprising: a transmit port configured to receive a transmit signal; a receive port configured to provide a receive signal; a first interference path disposed between the transmit port and the receive port and configured to carry a first component of a transmit signal; and a second interference path disposed between the transmit port and the receiver port and configured to carry a second component of the transmit signal and to condition the second component such that at the receiver port, the first and second components of the transmit signal destructively interfere with one another.

Example 59 includes the transmitter-receiver isolation circuit of Example 58 wherein: the first interference path is configured to condition the first component of the transmit signal by imparting a first phase shift to the first component of the transmit signal; and the second interference path is configured to condition the second component of the transmit signal by imparting, to the second component of the transmit signal, a second phase shift that is approximately opposite to the first phase shift.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A remote antenna unit, comprising:
 a first transmitter configured to generate at least one first transmit signal;
 a first receiver configured to process at least one receive signal;
 a first antenna array including one or more first antennas each coupled to at least one of the first transmitter and the first receiver,
  each of at least one of the first antennas configured to radiate a respective downlink signal in response to a respective one of the at least one first transmit signal, and
  each of at least one of the first antennas configured to generate a respective one of the at least one receive signal in response to an uplink signal; and
 first and second interference circuits each coupled to the first transmitter and the first receiver and each configured to reduce, in each of the at least one receive signal, interference caused by one or more of the at least one first transmit signal, at least one downlink signal radiated by one of the one or more first antennas, and at least one interfering downlink signal radiated by one of one or more other antennas;
 wherein at least one of the first and second interference circuits is configured to receive an analog signal from the first transmitter.

2. The remote antenna unit of claim 1, further comprising:
 a second transmitter;
 a second receiver; and
 wherein the first antenna array includes a multiple-input-multiple-output antenna array having at least two antennas respectively coupled to the first and second transmitters and to the first and second receivers.

3. The remote antenna unit of claim 1, wherein the first antenna array includes a single antenna.

4. The remote antenna unit of claim 1, wherein one of the first and second interference circuits includes an isolation circuit configured to electrically isolate the first receiver from the first transmitter.

5. The remote antenna unit of claim 1, wherein:
 one of the first and second interference circuits includes an analog interference-cancellation circuit configured to generate, for each receive signal, a corresponding correction signal; and
 the first receiver is configured to generate, for each receive signal, a respective interference-cancelled receive signal in response to the receive signal and the corresponding correction signal.

6. The remote antenna unit of claim 5, wherein the analog interference-cancellation circuit includes a finite-impulse-response filter.

7. The remote antenna unit of claim 5, wherein the analog interference-cancellation circuit includes:
 an electro-optic converter configured to generate an optical transmit signal in response to the at least one first transmit signal;
 an optical filter configured to configured to generate, in response to the optical transmit signal for each receive signal, a corresponding optical correction signal; and
 an opto-electric converter configured to generate each corresponding correction signal in response to a corresponding optical correction signal.

8. The remote antenna unit of claim 1, wherein:
 one of the first and second interference circuits includes an analog interference-cancellation circuit configured to generate, for each receive signal, a corresponding correction signal; and
 the first receiver includes, for each receive signal, a respective signal combiner configured to generate an interference-cancelled receive signal in response to the receive signal and the corresponding correction signal.

9. The remote antenna unit of claim 1, wherein:
 one of the first and second interference circuits includes a digital interference-cancellation circuit configured to generate, for each receive signal, a corresponding correction signal;
 the first receiver includes, for each receive signal, an analog-to-digital converter configured to generate a respective digital receive signal in response to the receive signal; and
 the first receiver is configured, for each receive signal, to generate a respective interference-cancelled receive signal in response to the respective digital receive signal and the corresponding correction signal.

10. The remote antenna unit of claim 1, wherein:
 one of the first and second interference circuits includes a digital interference-cancellation circuit configured to generate, for each receive signal, a corresponding correction signal; and
 the first receiver includes, for each receive signal,
  an analog-to-digital converter configured to generate a respective digital receive signal in response to the receive signal, and
  a respective signal combiner configured to generate an interference-cancelled receive signal in response to the respective digital receive signal and the corresponding correction signal.

11. The remote antenna unit of claim 1, further comprising:
 an interference receiver configured to process at least one interfering receive signal;
 an interference antenna array including one or more interference antennas each coupled to the interference receiver and each configured to generate a respective one of the at least one interfering receive signal in response to one or more of the at least one interfering downlink signal; and
 wherein each of at least one of the first and second interference circuits is coupled to the interference receiver and is configured to reduce, in each of the at least one receive signal, interference caused by one or more of the at least one interfering downlink signal.

12. The remote antenna unit of claim 1, further comprising:
  a second transmitter configured to generate at least one second transmit signal;
  a second antenna array including one or more second antennas each coupled to the second transmitter and configured to radiate a respective second downlink signal in response to a respective one of the at one second transmit signal; and
  wherein each of at least one of the first and second interference circuits is coupled to the second transmitter and is configured to reduce, in each of the at least one receive signal, interference caused by the respective second downlink signals.

13. The remote antenna unit of claim 1, wherein the at least one transmit signal and the at least one receive signal are in a same frequency band.

14. The remote antenna unit of claim 1, wherein the at least one transmit signal and the at least one receive signal include at least one same frequency.

15. The remote antenna unit of claim 1, wherein each respective downlink signal and the uplink signal are in a same frequency band.

16. The remote antenna unit of claim 1, wherein each respective downlink signal and the uplink signal include at least one same frequency.

17. The remote antenna unit of claim 1, wherein the downlink signal radiated by one of one or more other antennas and the uplink signal are in a same frequency band.

18. A distributed antenna system, comprising:
  a master unit; and
  at least one remote antenna unit coupled to the master unit, each of the at least one remote antenna unit including
    a respective transmitter configured to generate at least one transmit signal;
    a respective receiver configured to process at least one receive signal;
    a respective antenna array including one or more antennas each coupled to at least one of the transmitter and the receiver,
      each of at least one of the antennas configured to radiate a respective downlink signal in response to a respective one of the at least one transmit signal, and
      each of at least one of the antennas configured to generate a respective one of the at least one receive signal in response to an uplink signal; and
    first and second interference circuits each coupled to the transmitter and the receiver and each configured to reduce, in each of the at least one receive signal, interference caused by one or more of the at least one transmit signal, at least one downlink signal radiated by one of the one or more antennas, and at least one interfering downlink signal radiated by one of one or more other antennas;
    wherein at least one of the first and second interference circuits is configured to receive an analog signal from the transmitter.

19. The distributed antenna system of claim 18, further comprising:
  at least one base station coupled to the master unit and each configured
    to generate one or more respective downlink data signals, and
    to receive one or more respective uplink data signals;
  wherein each transmitter is configured to generate the respective at least one transmit signal in response to a respective one of the one or more downlink data signals; and
  wherein each receiver is configured to generate a respective one of the one or more uplink data signals in response to the respective at least one received signal.

20. The distributed antenna system of claim 19, wherein at least one of the at least one base station is configured to cause each transmitter of at least one of the at least one remote antenna unit to generate a transmit signal only while the receiver of a same remote antenna unit is not processing a receive signal.

21. The distributed antenna system of claim 18, wherein one of the at least one remote antenna unit includes:
  an interference receiver configured to process at least one interfering receive signal;
  an interference antenna array including one or more interference antennas each coupled to the interference receiver and each configured to generate a respective one of the at least one interfering receive signal in response to one or more of the at least one interfering downlink signal from another one of the remote antenna units; and
  wherein each of at least one of the first and second interference circuits is coupled to the interference receiver and is configured to reduce, in each of the at least one receive signal, interference caused by one or more of the at least one interfering downlink signal from the other one of the remote antenna units.

22. A method, comprising:
  reducing, with a first interference circuit, interference in a receive signal caused by at least one of a transmit signal generated by a remote antenna unit and a downlink signal radiated by the remote antenna unit, wherein the first interference circuit is coupled to a transmitter and configured to receive an analog signal from the transmitter; and
  further reducing, with a second interference circuit, interference in the receive signal caused by at least one of the transmit signal and the downlink signal, wherein the second interference circuit is coupled to the transmitter.

23. The method of claim 22, further comprising:
  generating the receive signal with an antenna in response to an uplink signal; and
  coupling the transmit signal to the antenna while generating the receive signal with the antenna.

24. The method of claim 22, further comprising:
  generating the receive signal with an antenna; and
  radiating the downlink signal with another antenna while generating the receive signal with the antenna.

25. The method of claim 22, wherein reducing, with the first interference circuit, interference in the receive signal includes electrically isolating the receive signal from the transmit signal with the first interference circuit.

26. The method of claim 22, further comprising:
  generating the downlink signal in response to a different transmit signal; and
  wherein reducing, with the first interference circuit, interference in the receive signal includes
    generating a cancelling signal in response to the different transmit signal, and
    generating a corrected receive signal in response to the receive signal and the cancelling signal.

27. The method of claim 22, wherein reducing, with the first interference circuit, interference in the receive signal includes:
- generating a cancelling signal in response to the downlink signal, and
- generating a corrected receive signal in response to the receive signal and the cancelling signal.

28. The method of claim 22, further comprising:
- generating the downlink signal in response to a different transmit signal; and
- wherein further reducing, with the second interference circuit, interference in the receive signal includes
    - generating a cancelling signal in response to the different transmit signal, and
    - generating a corrected receive signal in response to the receive signal and the cancelling signal.

29. The method of claim 22, wherein further reducing, with the second interference circuit, interference in the receive signal includes:
- generating a cancelling signal in response to the downlink signal, and
- generating a corrected receive signal in response to the receive signal and the cancelling signal.

\* \* \* \* \*